July 12, 1960 H. F. MARTIN 2,944,734

TEST SCORING MACHINE

Filed Feb. 27, 1957 27 Sheets-Sheet 1

July 12, 1960 H. F. MARTIN 2,944,734

TEST SCORING MACHINE

Filed Feb. 27, 1957 27 Sheets-Sheet 3

INVENTOR.
HAROLD F. MARTIN
BY John B. Clark
ATTORNEY

July 12, 1960 H. F. MARTIN 2,944,734

TEST SCORING MACHINE

Filed Feb. 27, 1957 27 Sheets-Sheet 4

July 12, 1960 H. F. MARTIN 2,944,734

TEST SCORING MACHINE

Filed Feb. 27, 1957 27 Sheets-Sheet 5

July 12, 1960 H. F. MARTIN 2,944,734

TEST SCORING MACHINE

Filed Feb. 27, 1957 27 Sheets-Sheet 6

July 12, 1960 H. F. MARTIN 2,944,734

TEST SCORING MACHINE

Filed Feb. 27, 1957 27 Sheets-Sheet 7

July 12, 1960 H. F. MARTIN 2,944,734

TEST SCORING MACHINE

Filed Feb. 27, 1957 27 Sheets-Sheet 8

July 12, 1960 H. F. MARTIN 2,944,734

TEST SCORING MACHINE

Filed Feb. 27, 1957 27 Sheets-Sheet 10

July 12, 1960 H. F. MARTIN 2,944,734

TEST SCORING MACHINE

Filed Feb. 27, 1957 27 Sheets-Sheet 11

July 12, 1960 H. F. MARTIN 2,944,734

TEST SCORING MACHINE

Filed Feb. 27, 1957 27 Sheets-Sheet 12

July 12, 1960 H. F. MARTIN 2,944,734

TEST SCORING MACHINE

Filed Feb. 27, 1957 27 Sheets-Sheet 13

July 12, 1960 H. F. MARTIN 2,944,734

TEST SCORING MACHINE

Filed Feb. 27, 1957 27 Sheets-Sheet 18

July 12, 1960 H. F. MARTIN 2,944,734

TEST SCORING MACHINE

Filed Feb. 27, 1957 27 Sheets-Sheet 20

July 12, 1960 H. F. MARTIN 2,944,734

TEST SCORING MACHINE

Filed Feb. 27, 1957 27 Sheets-Sheet 21

July 12, 1960 H. F. MARTIN 2,944,734

TEST SCORING MACHINE

Filed Feb. 27, 1957 27 Sheets-Sheet 23

July 12, 1960 H. F. MARTIN 2,944,734

TEST SCORING MACHINE

Filed Feb. 27, 1957 27 Sheets-Sheet 27

United States Patent Office 2,944,734

Patented July 12, 1960

2,944,734

TEST SCORING MACHINE

Harold F. Martin, San Jose, Calif., assignor to International Business Machines Corporation, New York, N.Y., a corporation of New York Filed Feb. 27, 1957, Ser. No. 642,747

13 Claims. (Cl. 235—61.7)

The present invention pertains generally to test scoring machines and relates more particularly to machines for scoring answer forms selectively marked by the examinee.

Test scoring machines presently in use have various disadvantages and drawbacks, and a principal object of the invention is, therefore, to provide an improved test scoring machine.

Very often present machines are incapable of distinguishing between intended marks and unintended marks or erasures. This leads to inaccurate and misleading scoring in that several marks may be processed when only one is intended by the examinee.

Thus, another object of this invention is to provide a test scoring machine which can discriminate between marks.

Another object is to provide a test scoring machine for selecting one of several marks for processing in the scoring operation.

Unintended marks or erasures are generally of poorer quality than intended marks, and another object is to provide a machine for distinguishing between marks on the basis of quality.

A further object is to provide a machine for selecting one of several marks on the basis of quality, wherein only selected marks are processed within the machine.

Still another object is to provide a machine of the type described for determining the quality of marks being scored.

Generally, the machine of the invention is arranged to scan selected mark positions optically in serial fashion for determining the presence of marks. Light sources are provided for sequentially illuminating the selected positions and a photosensitive device is utilized to sense the intensity of light reflected from these positions for generating signals corresponding to changes in intensity. The presence of a mark in an illuminated position varies the intensity of reflected light reaching the photosensitive device and a signal corresponding to the mark is generated. Thus, a still further object of the invention is to maintain the intensity of light sensed by the photosensitive device constant in the absence of a mark in an illuminated position.

Another object is to provide a test scoring machine arranged to scan selected positions serially for marks wherein the selected positions are sequentially illuminated and variations in light reflected from the positions indicate marks.

A further object is to provide a machine for scanning a test record and a master record in timed relation for scoring the test record in accordance with the master record, wherein selected portions of each record are scanned according to selected programs.

Still another object is to provide a test scoring machine arranged to score marked records and to accumulate selectively the number of right, wrong or omitted marks according to indicia on a master record.

It is often desirable in examinations to request responses by examinees wherein the results are to be indicated for inspection by the examiner but are not to be scored. Thus, another object is to indicate such responses but to prohibit the scoring thereof.

Still another object is to provide a test scoring machine for indicating responses by the examinee but arranged to prohibit the scoring thereof in the absence of signals indicative of correct responses.

Other objects of the invention will be pointed out in the following description and claims and illustrated in the accompanying drawings, which disclose, by way of example, the principle of the invention and the best mode which has been contemplated of applying that principle.

Figure 6:
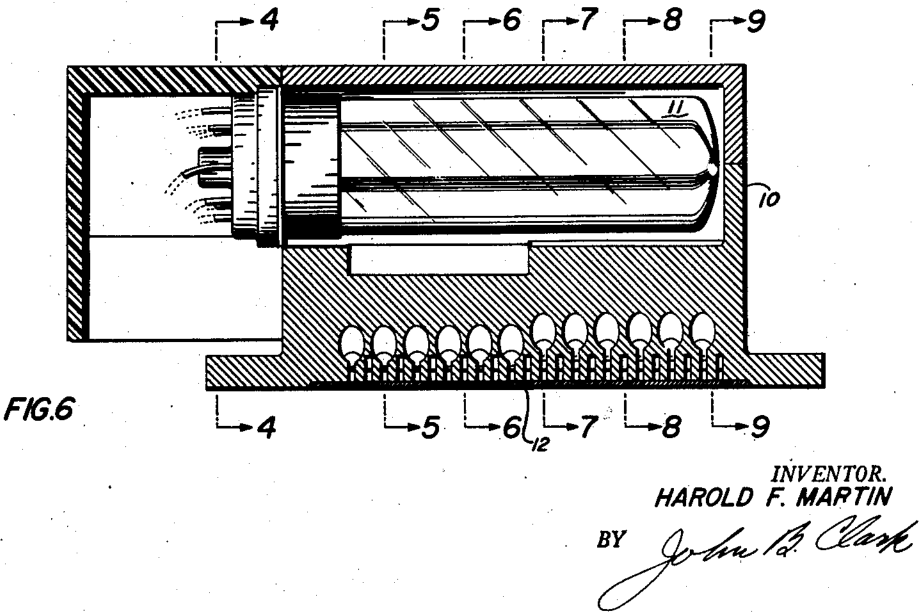
Fig. 6 is a section of the scanning head shown in Fig. 5 taken along the line 6—6 thereof.

Figs. 8 through 13 are vertical sections taken along lines 4—4 through 9—9, respectively, of Fig. 6.

Figure 14:
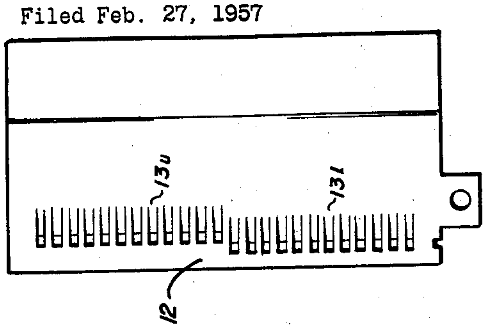
Figure 7:
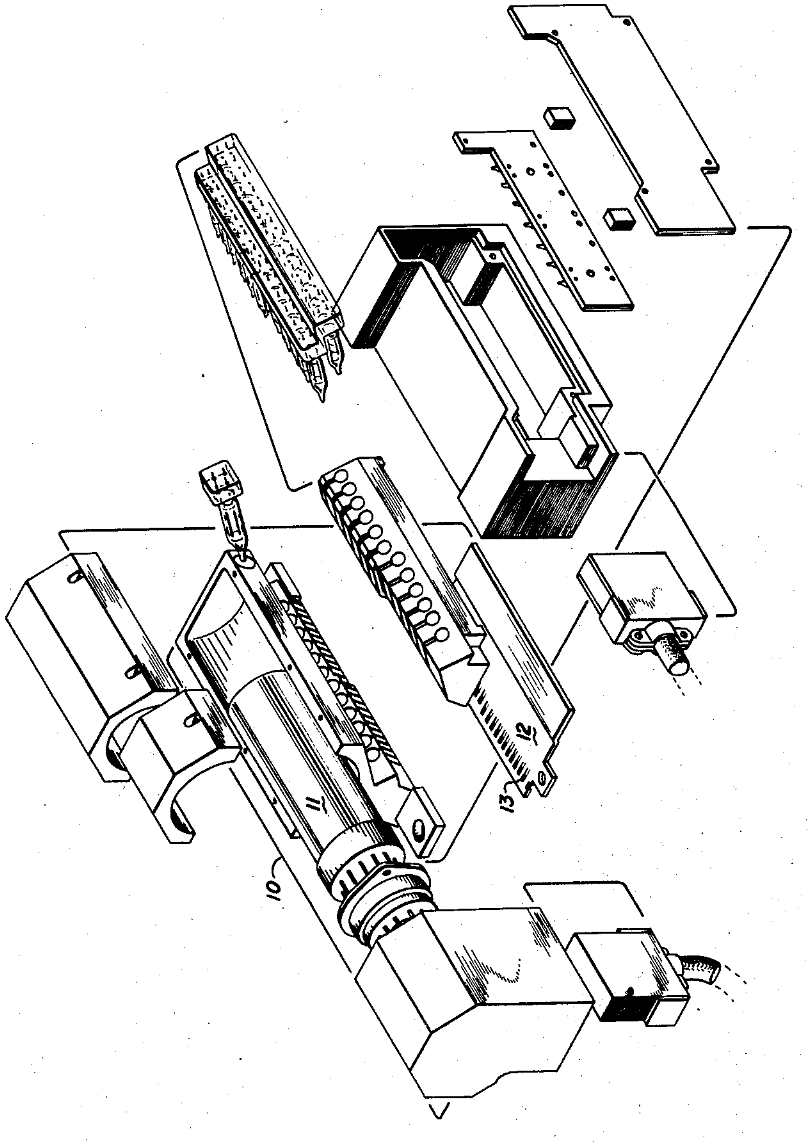
Fig. 7 is an exploded view of the scanning head of the invention.
Figure 10:
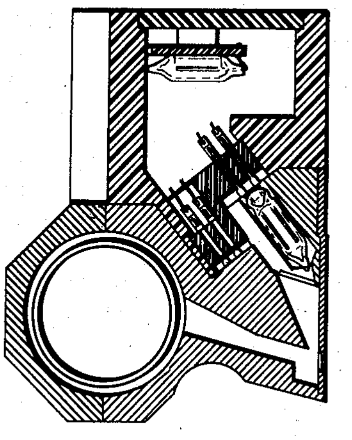
Figure 13:
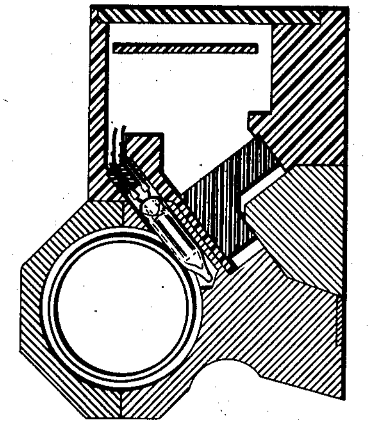
Figure 9:
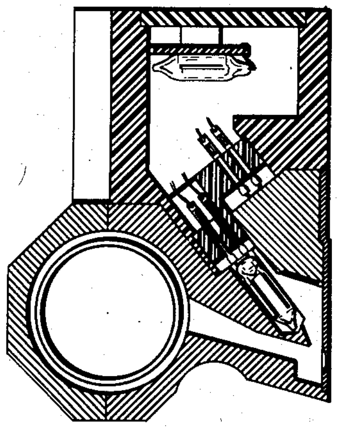
Figure 12:
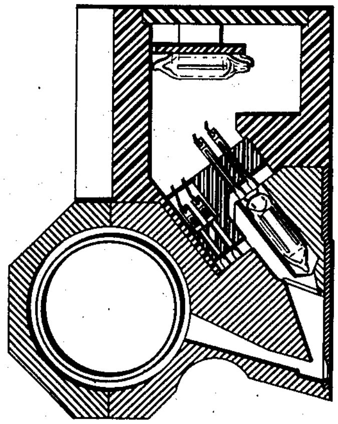
Figure 8:
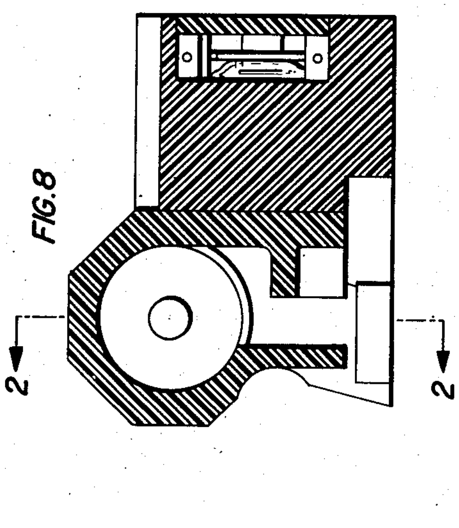
Figure 11:
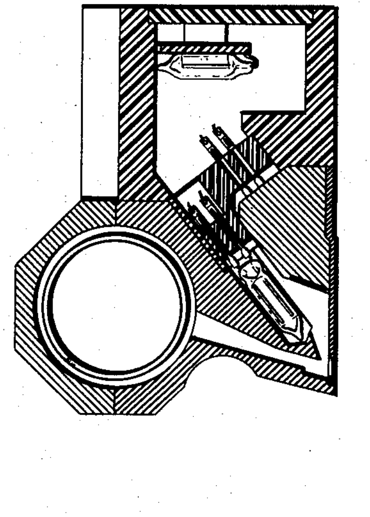

Fig. 14 is a plan view of a plate utilized with the scanning head.

Figure 15A:
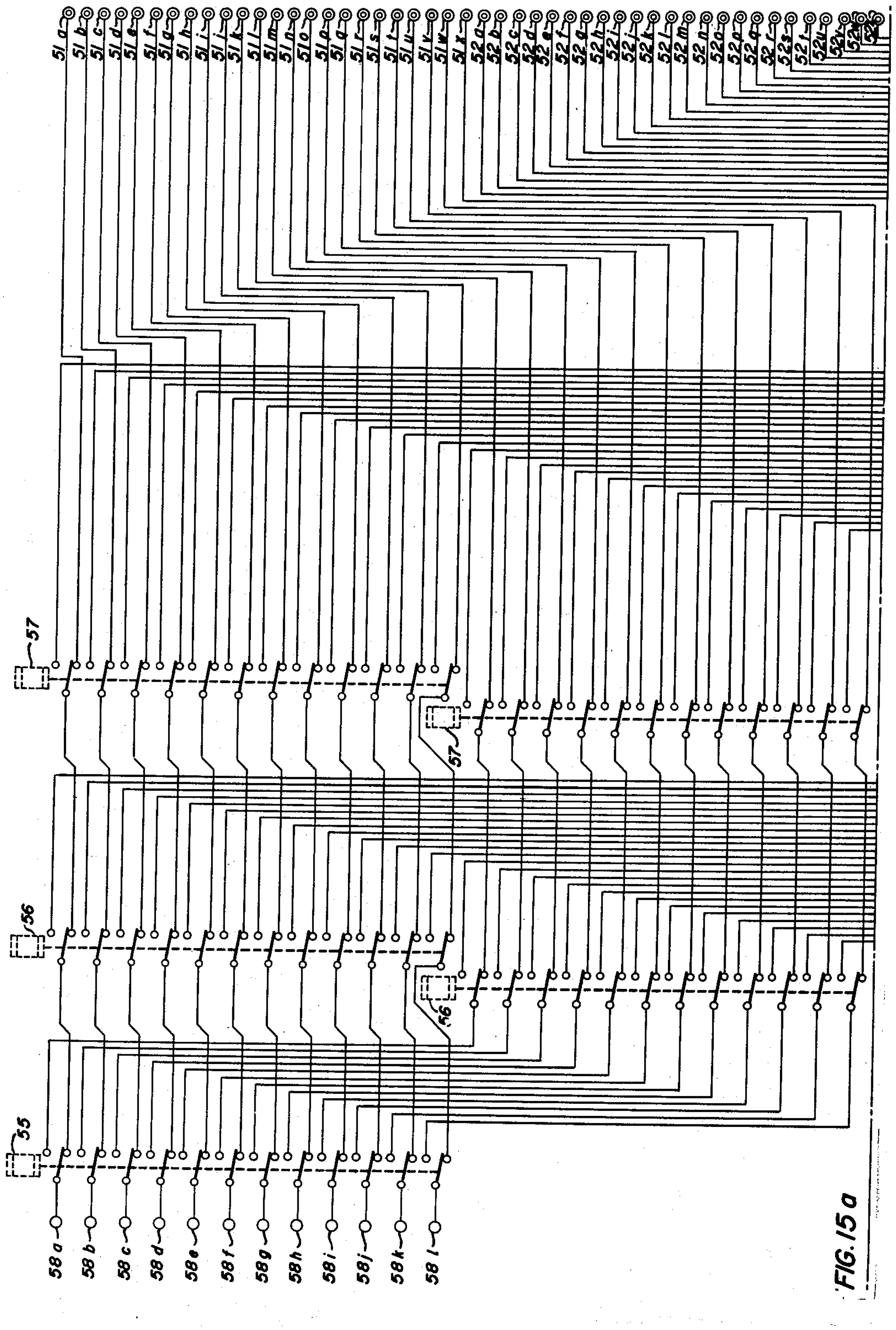
Figure 15B:
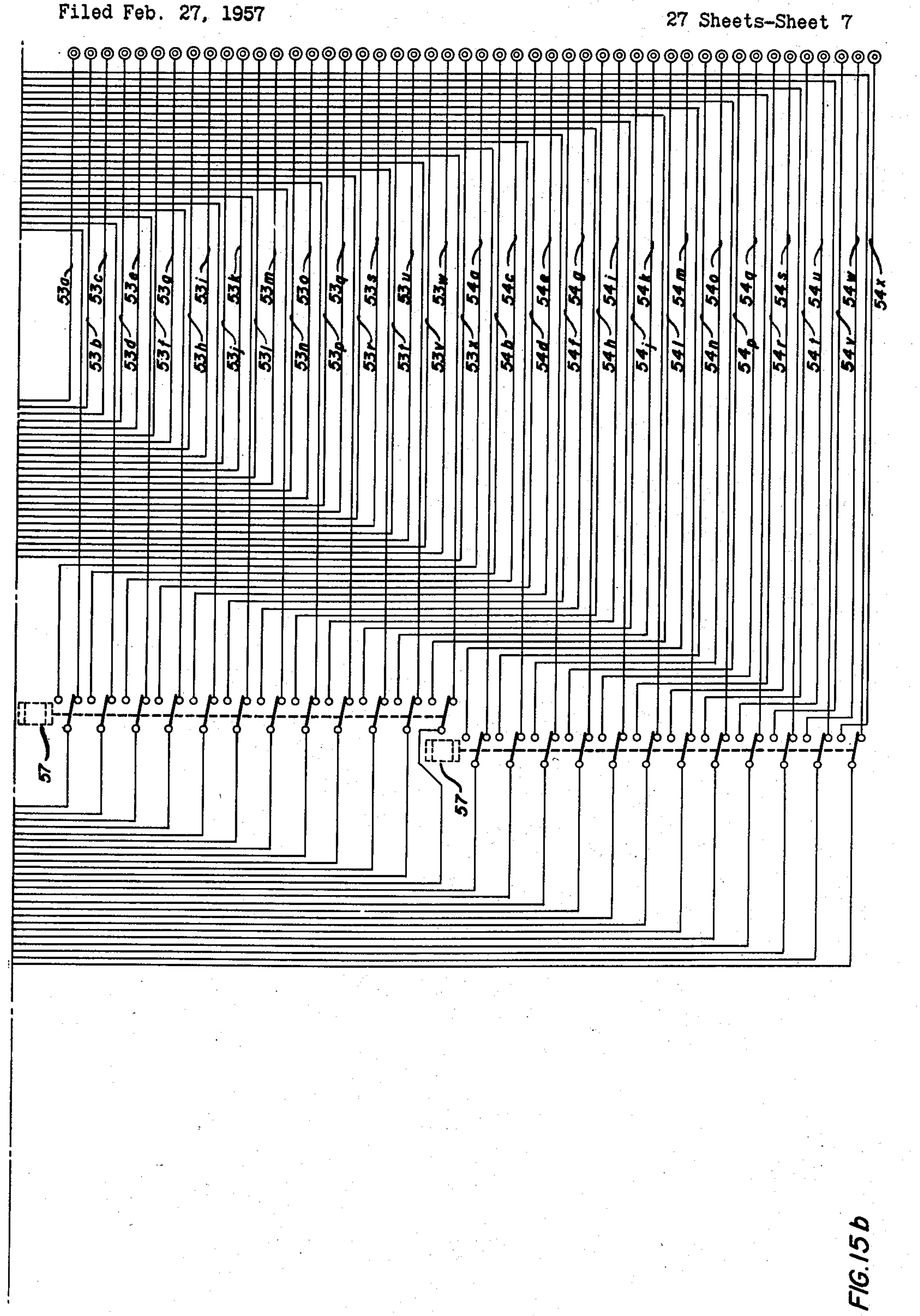

Figs. 15*a* and 15*b* comprise schematic wiring diagrams of the program switching circuits.

Figure 16:
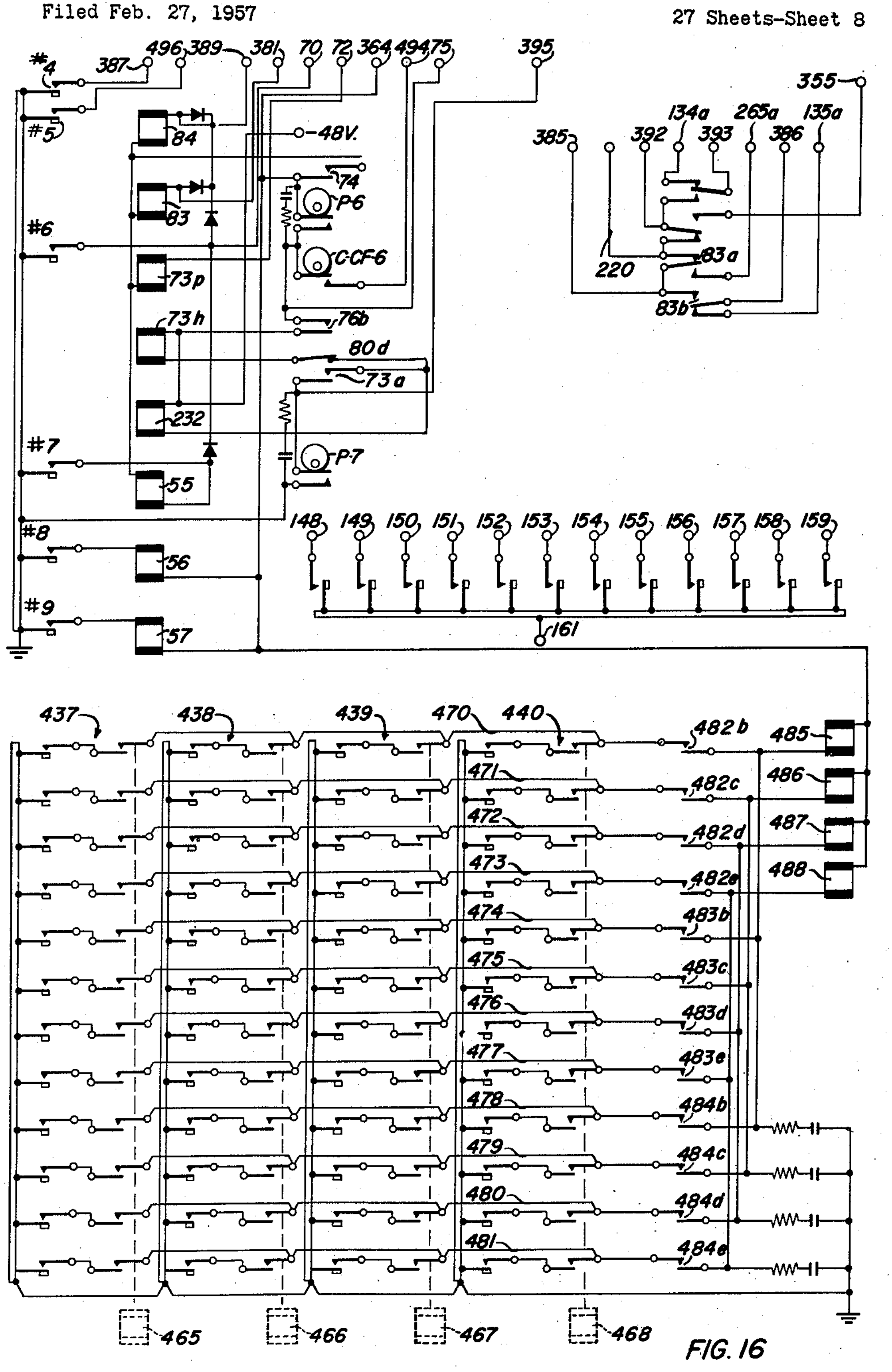

Fig. 16 includes schematic diagrams of portions of the score conversion and programming circuitry of the invention.

Figure 17:
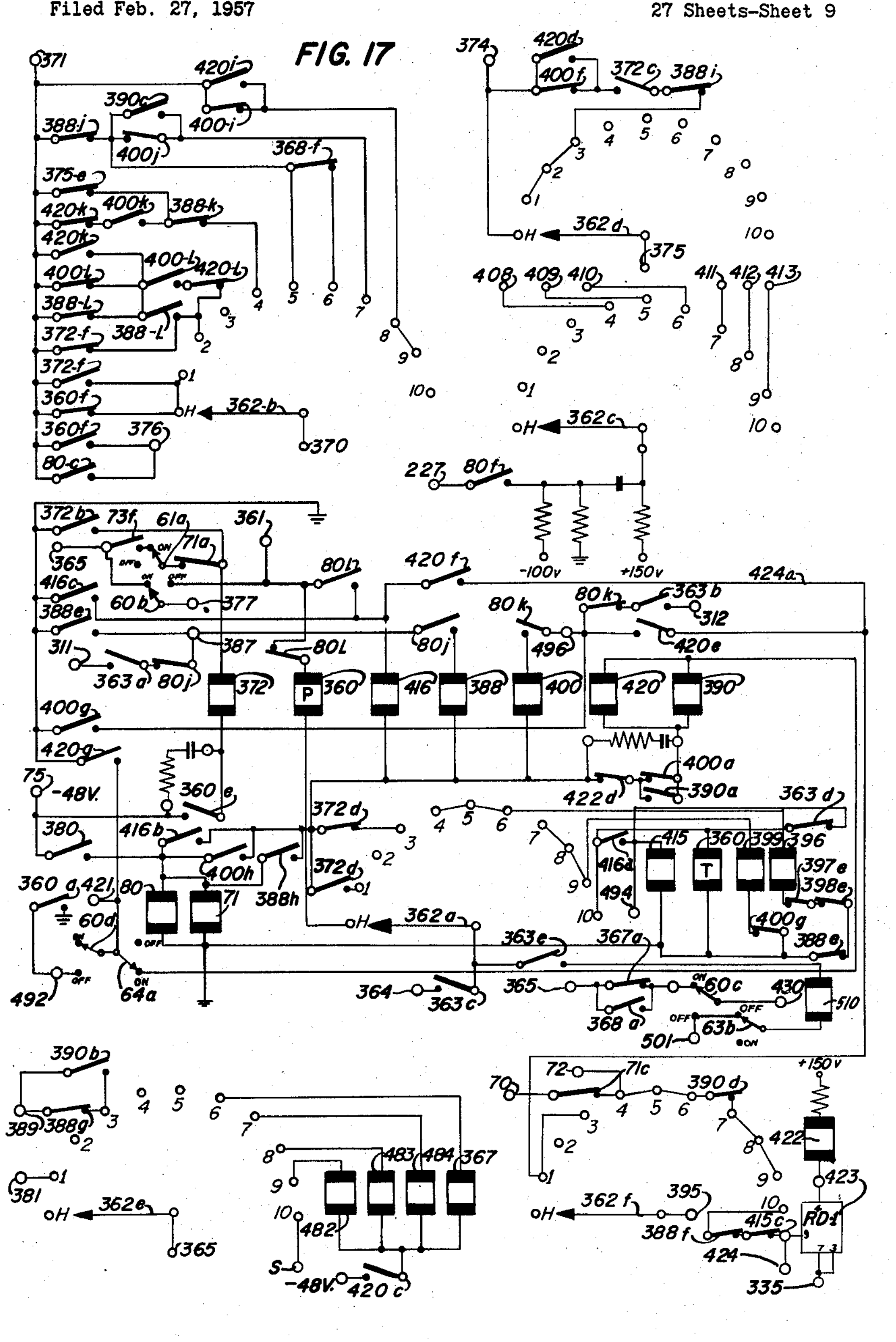

Fig. 17 is a schematic diagram of portions of the circuitry of the invention associated with read-out.

Figure 18A:
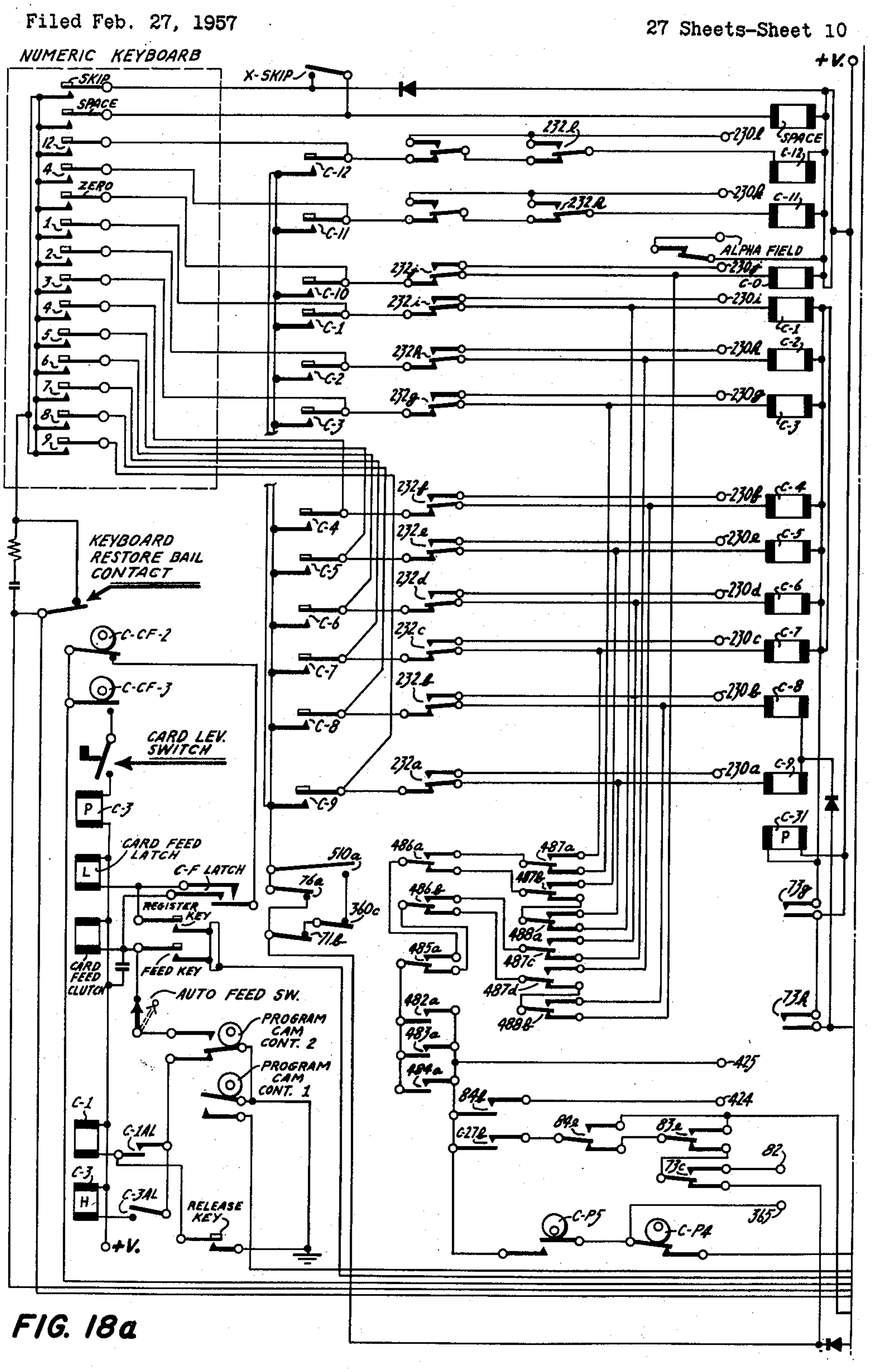
Figure 18B:
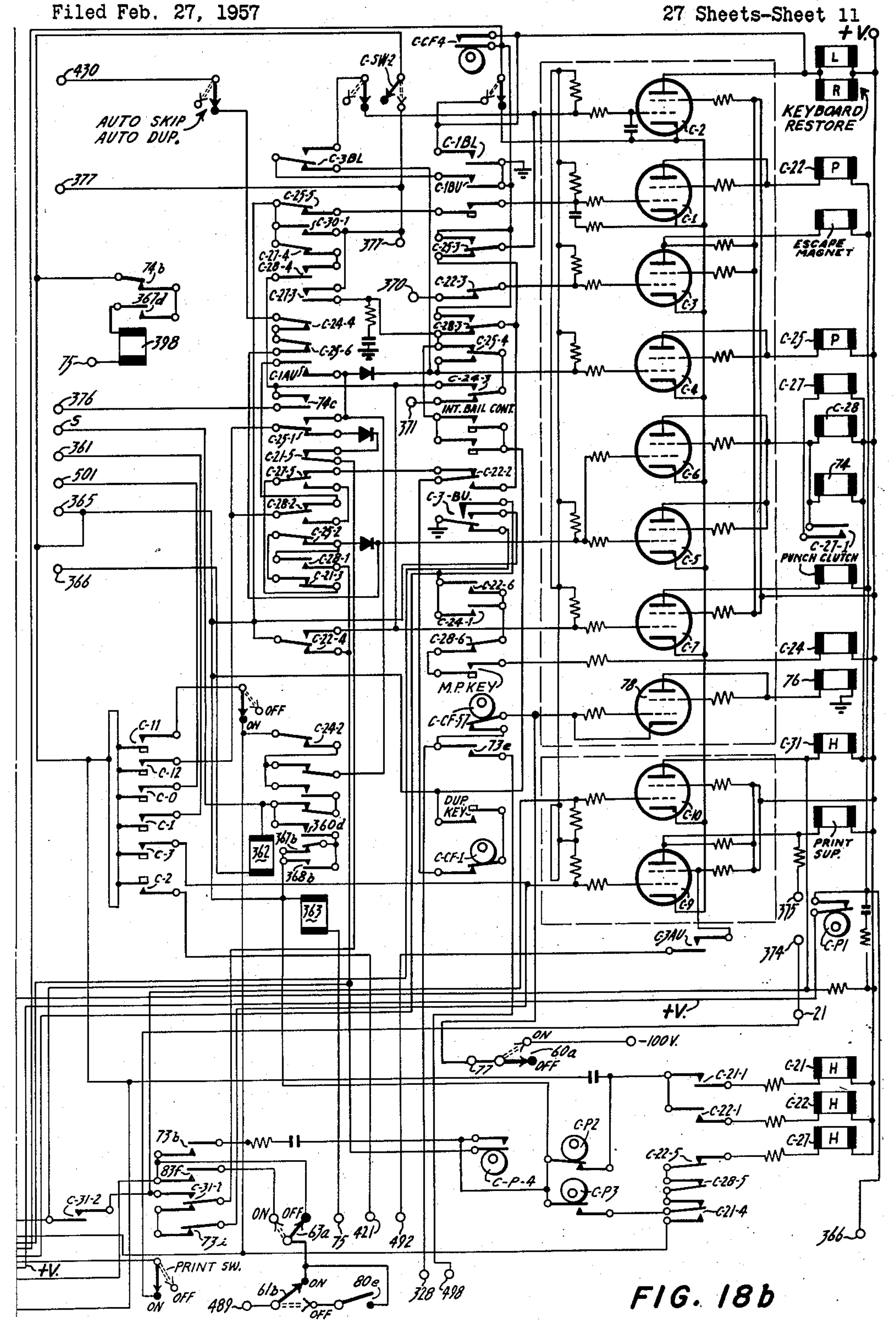
Figure 19A:
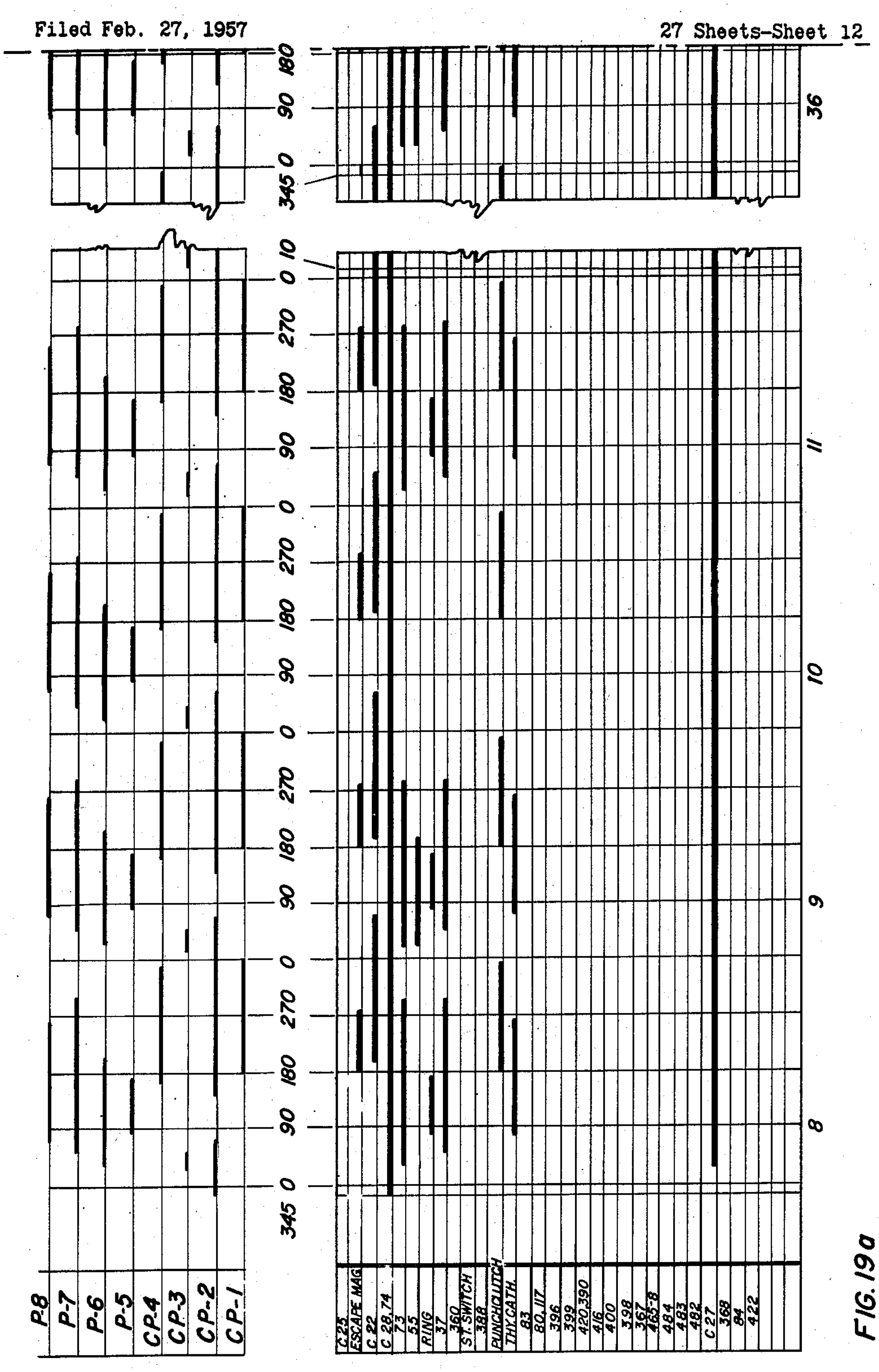
Figure 19B:
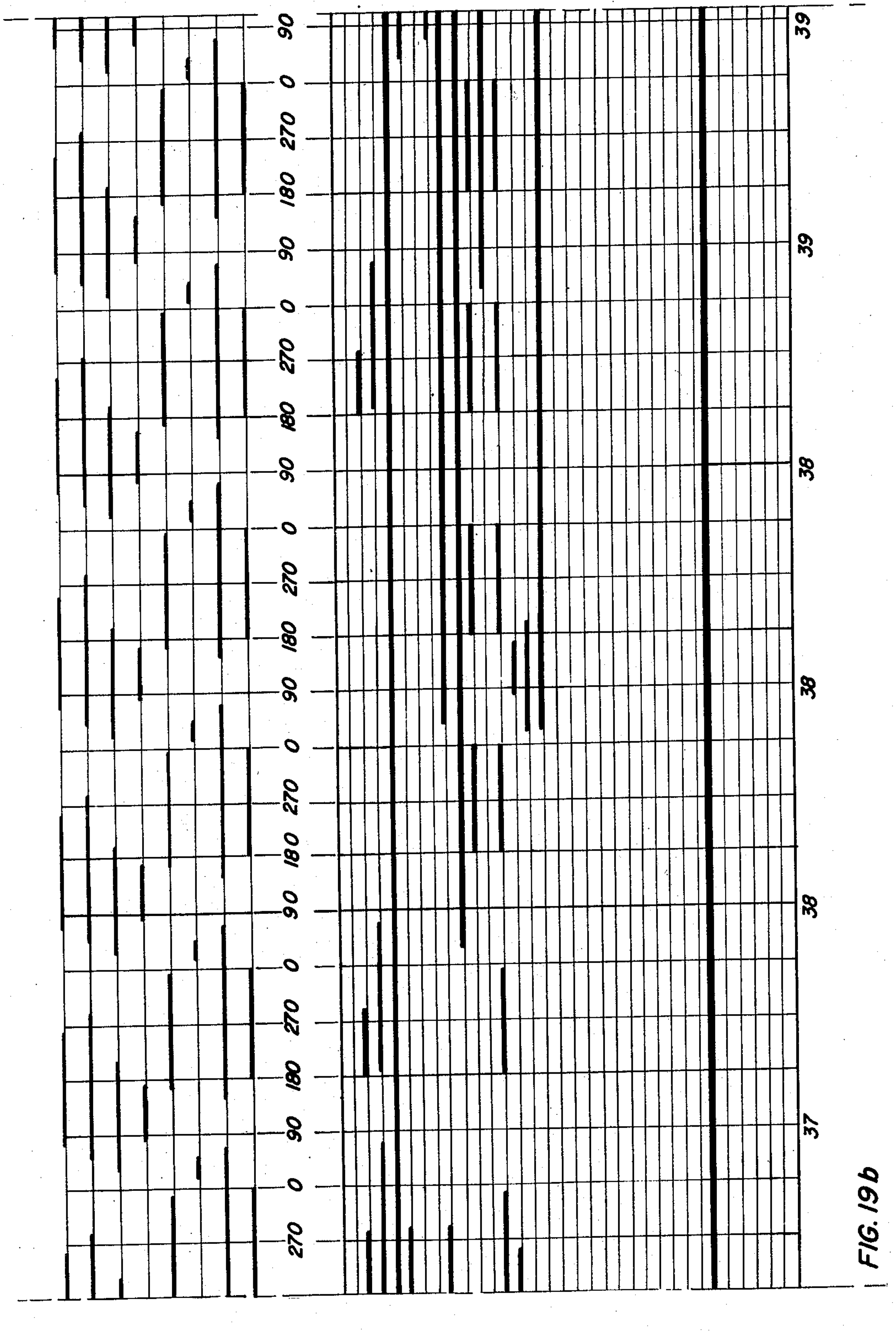
Figure 19C:
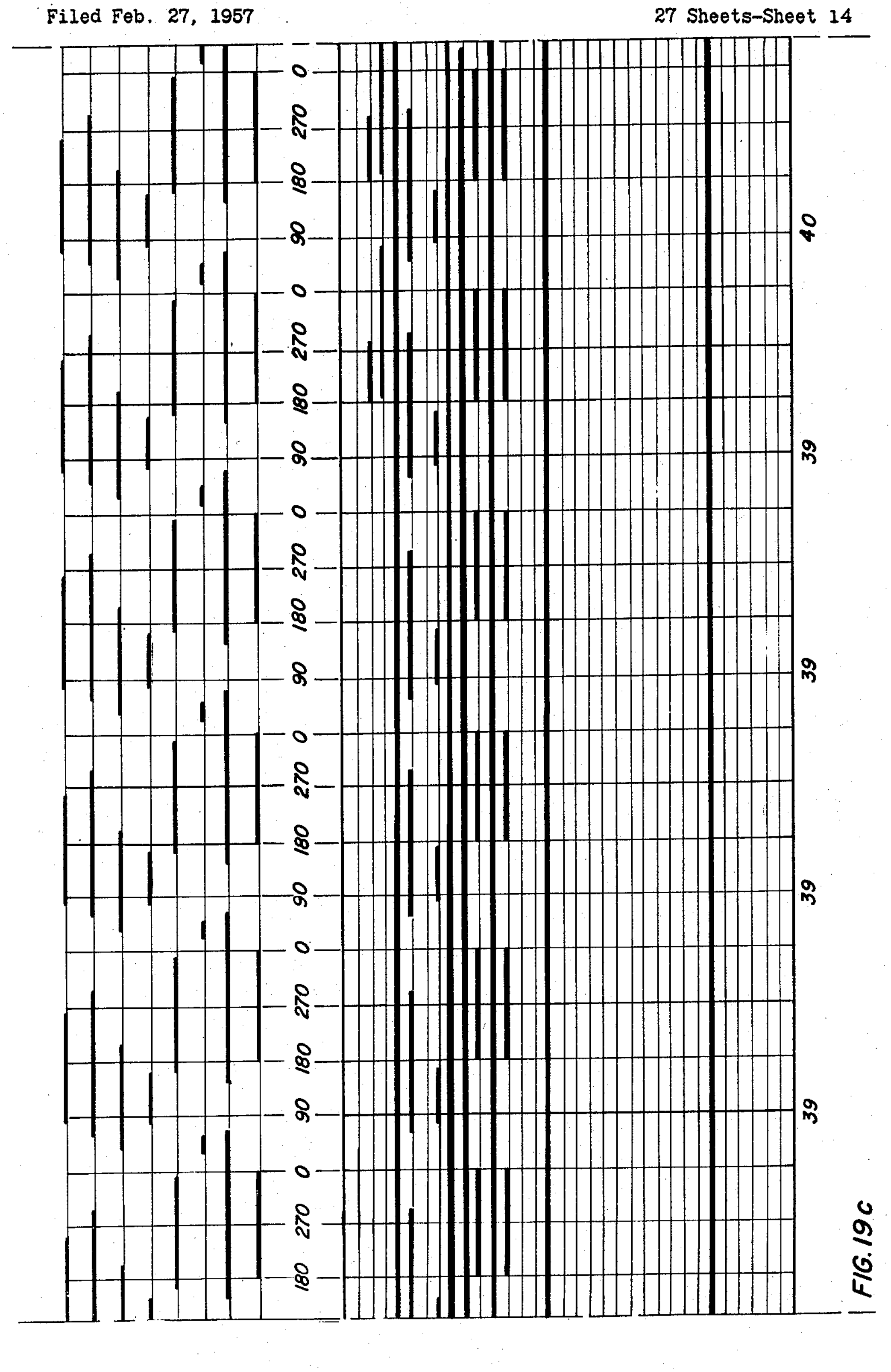
Figure 19D:
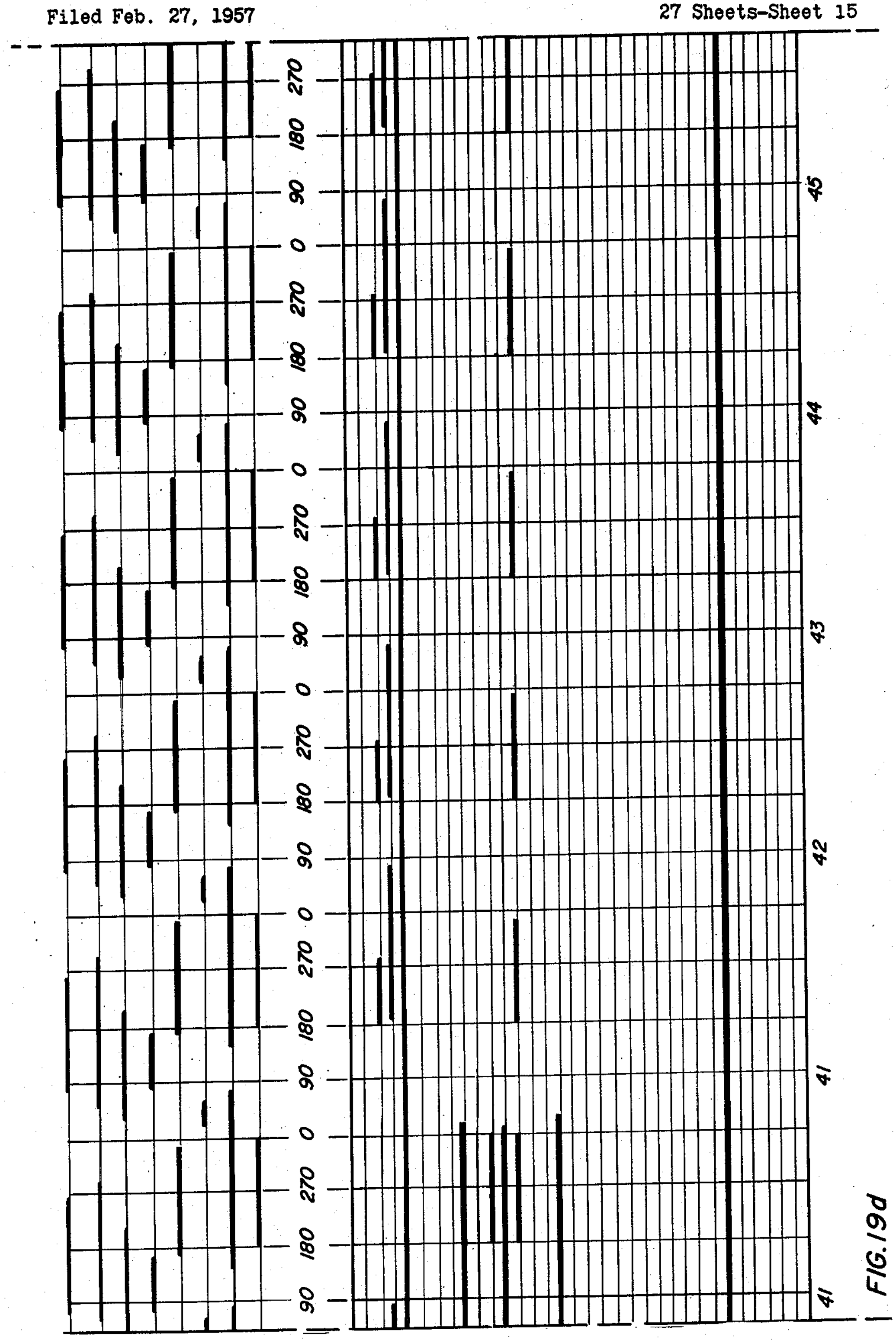
Figure 19E:
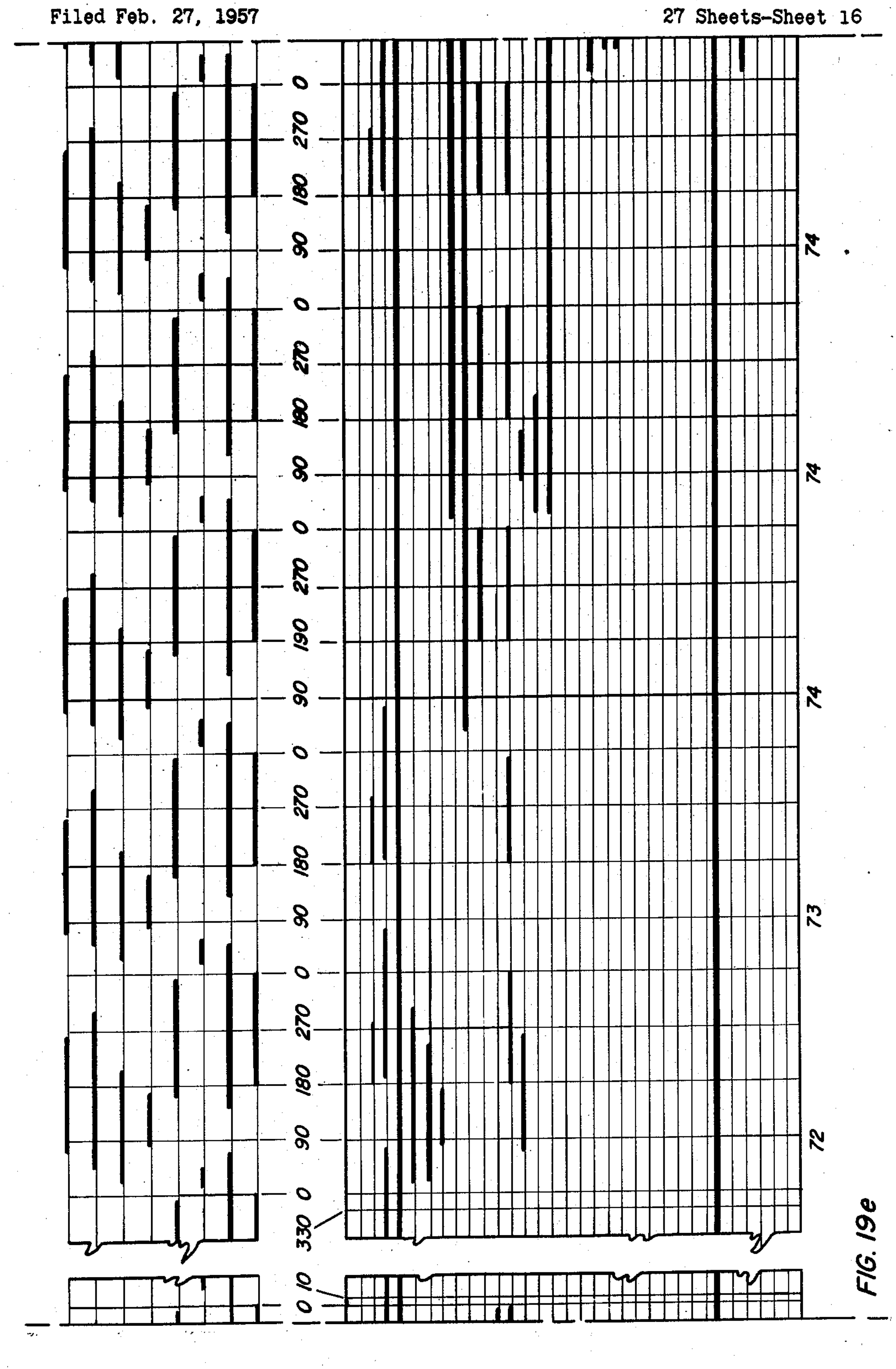
Figure 19F:
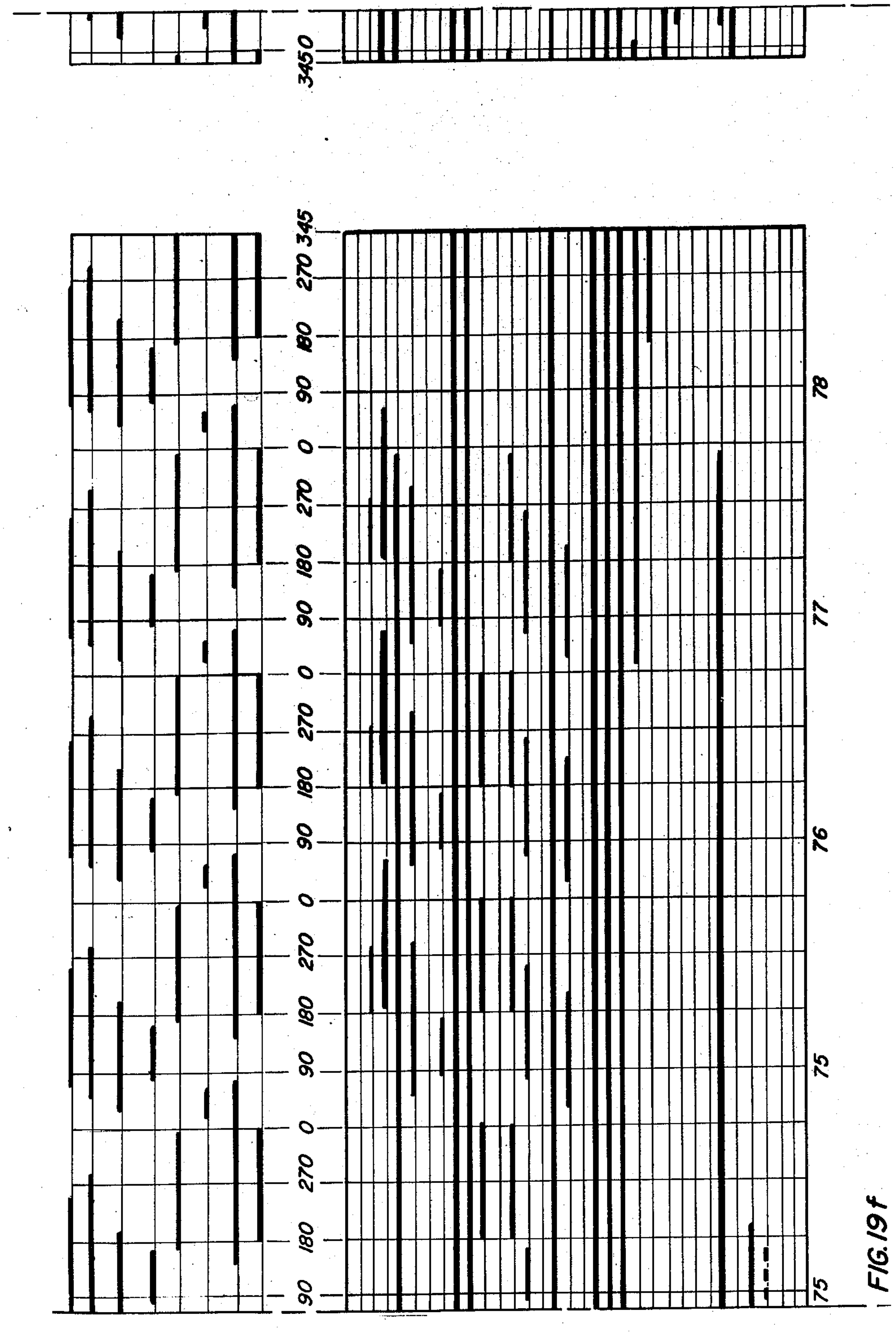
Figure 19G:
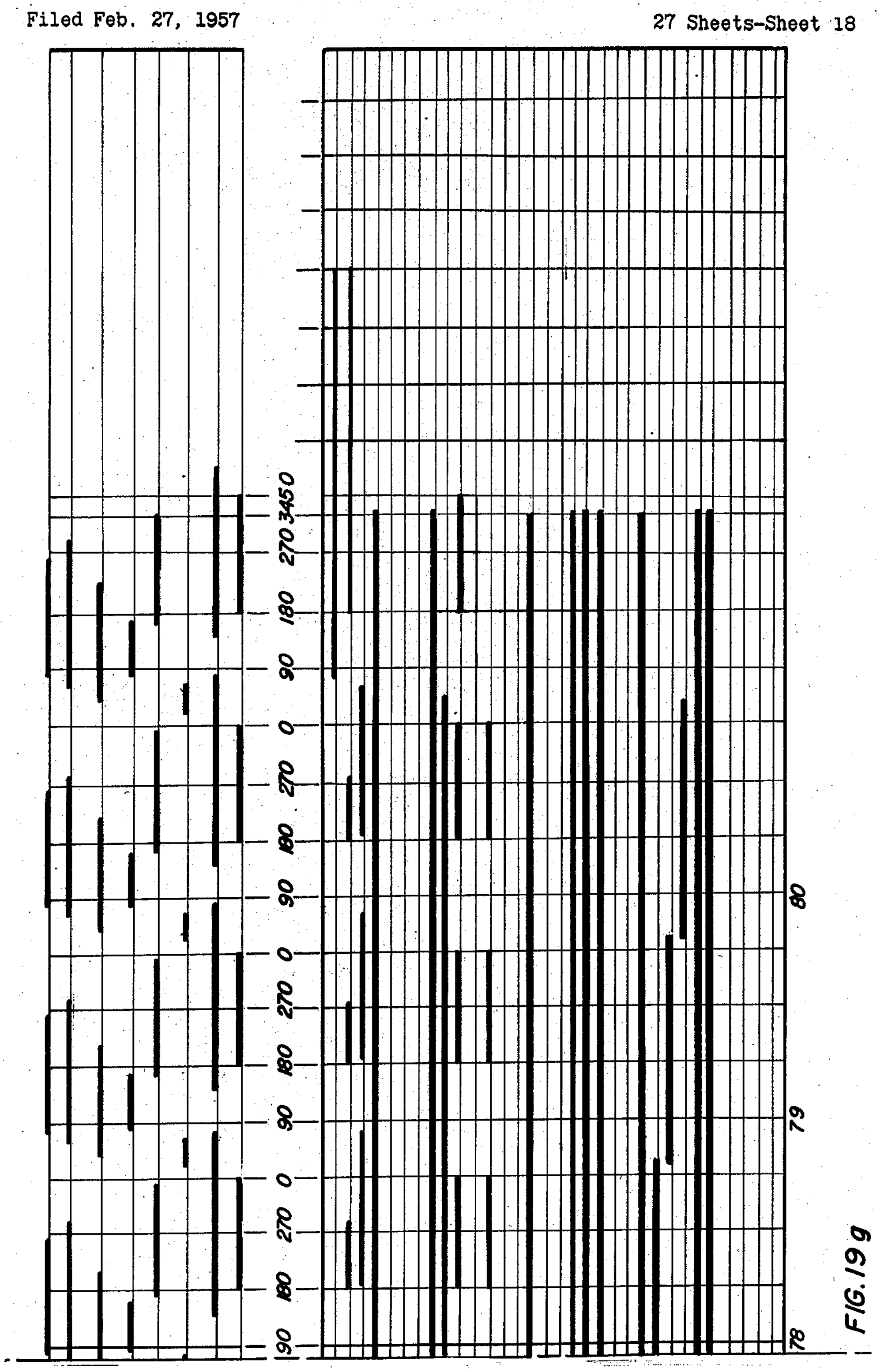

Figs. 18*a* and 18*b* comprise schematic diagrams of the circuitry utilized for controlling the punching, printing and escapement operations during the test scoring operation.

Figure 3:
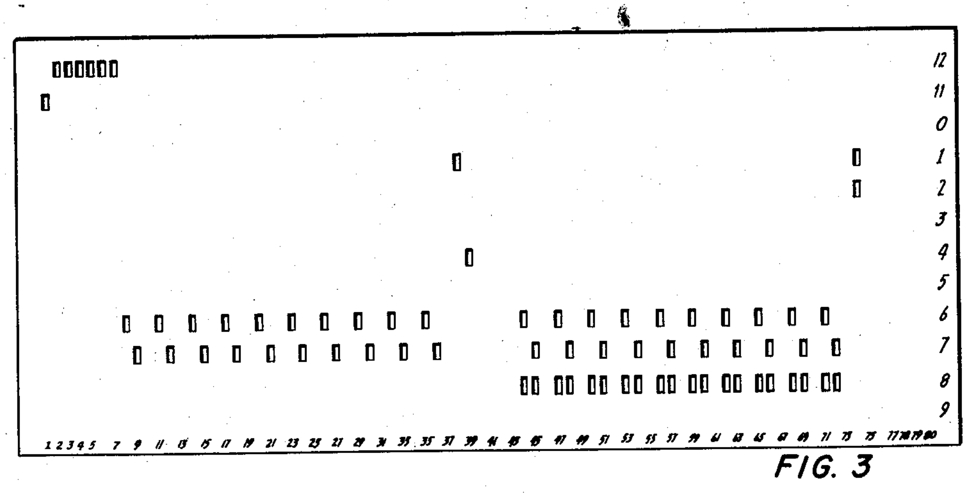
Fig. 3 is a reproduction of a sample program card.

Figs. 19*a* through 19*g* comprise timing diagrams of the operation of the machine of the invention under control of the program card shown in Fig. 3.

Figure 20A:
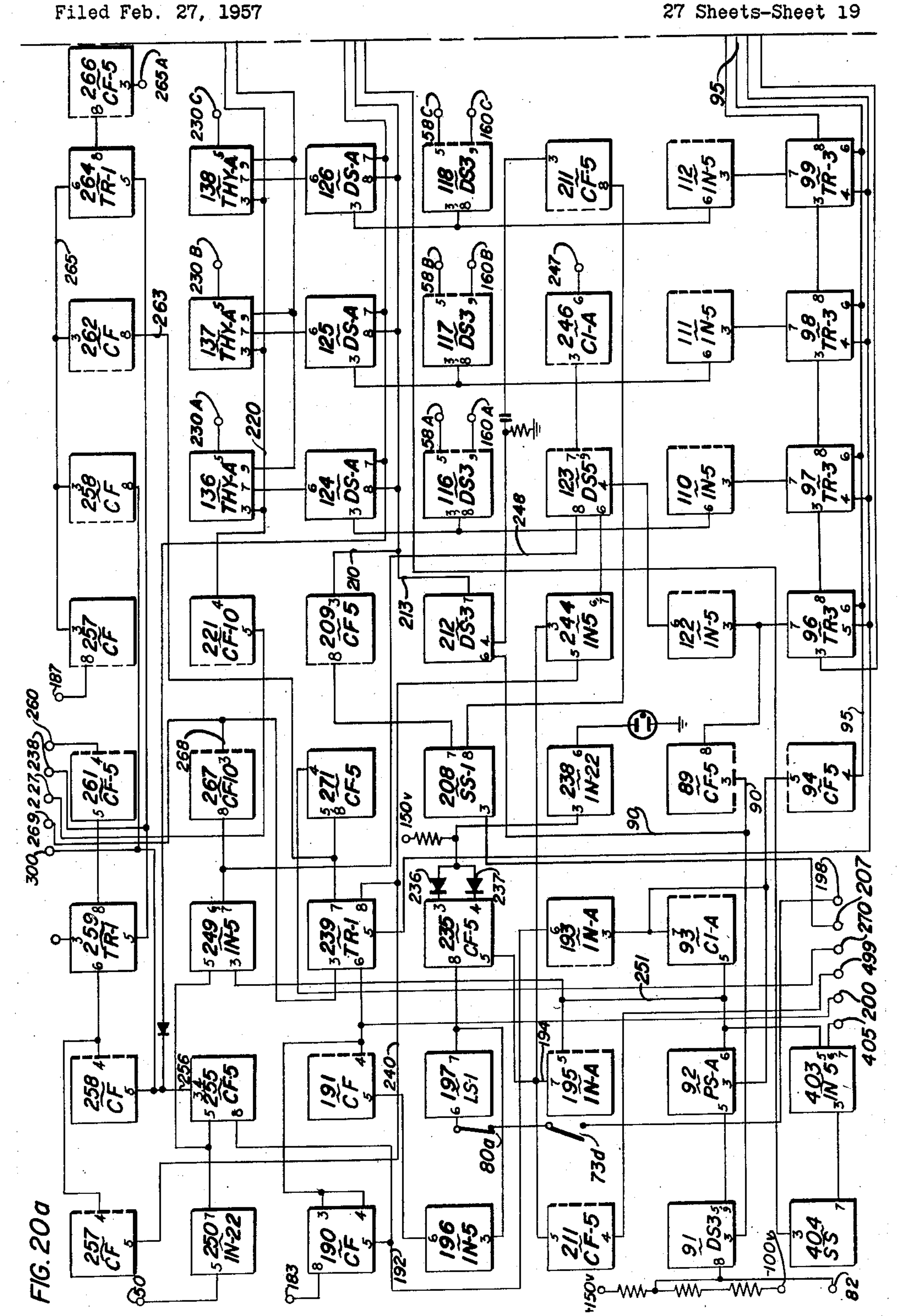
Figure 20B:
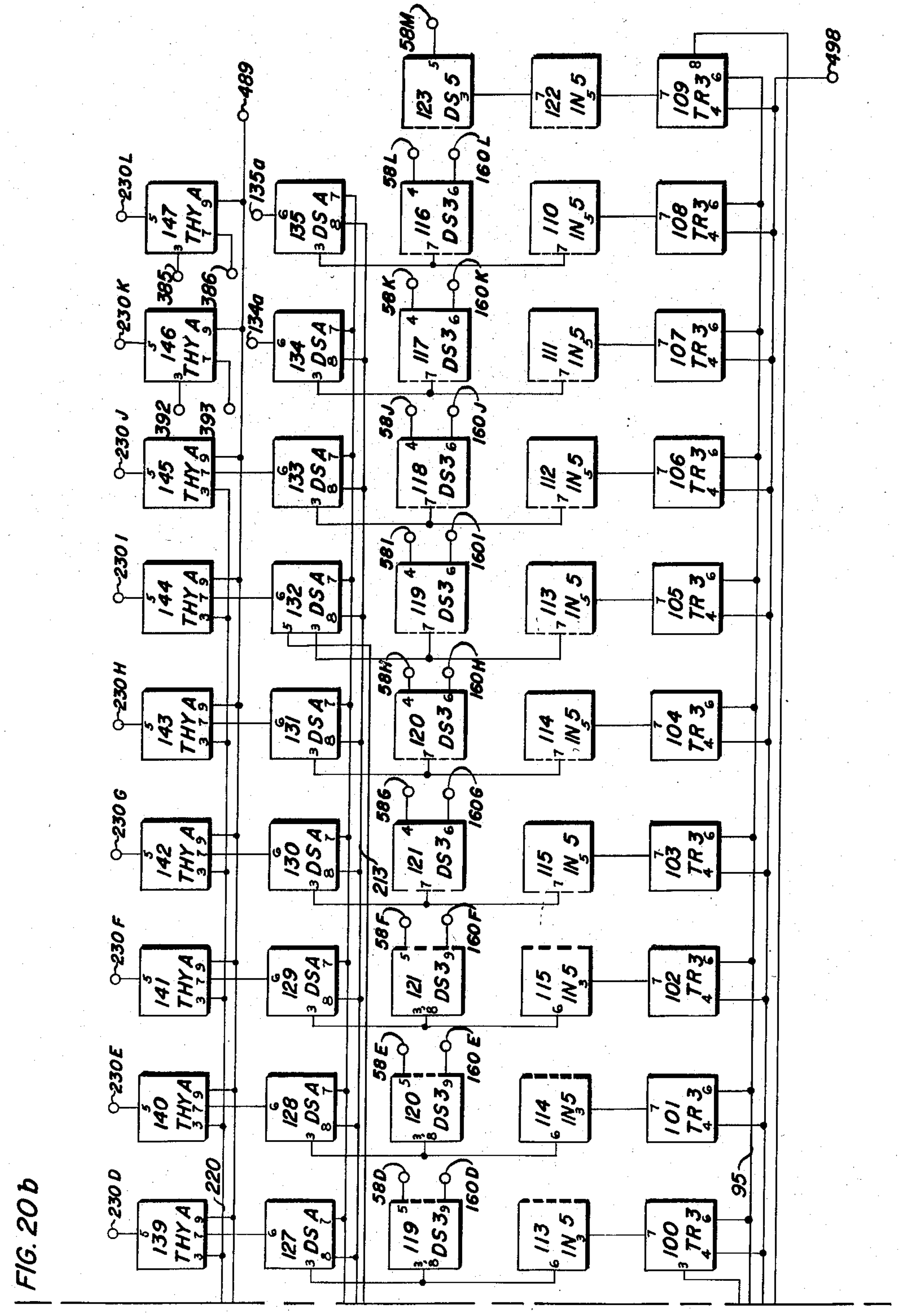

Figs. 20*a* and 20*b* comprise schematic diagrams of the mark converting portions of the circuitry of the invention.

Figure 21:
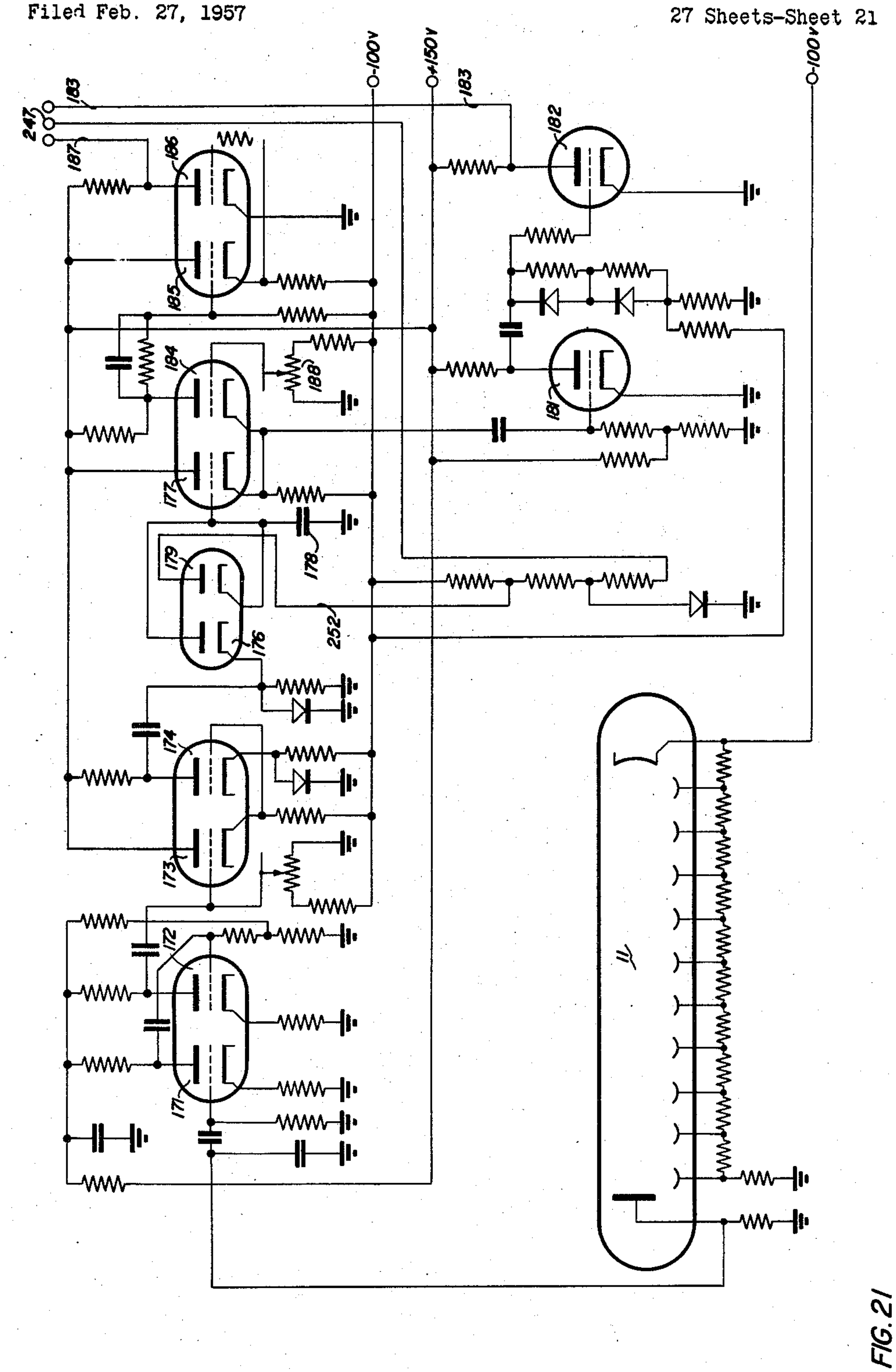

Fig. 21 is a schematic diagram of the mark sensing circuitry of the invention.

Figure 22A:
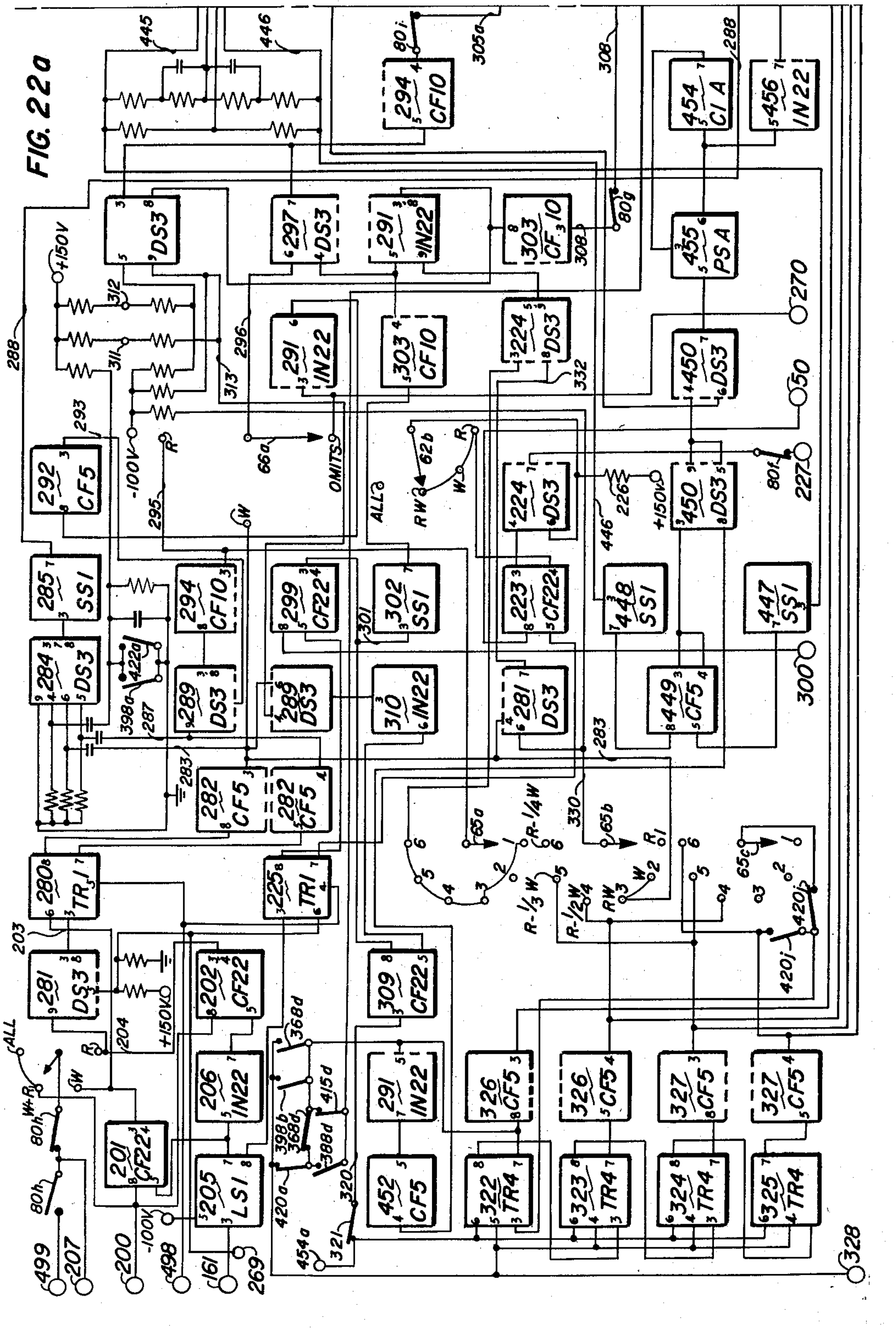
Figure 22B:
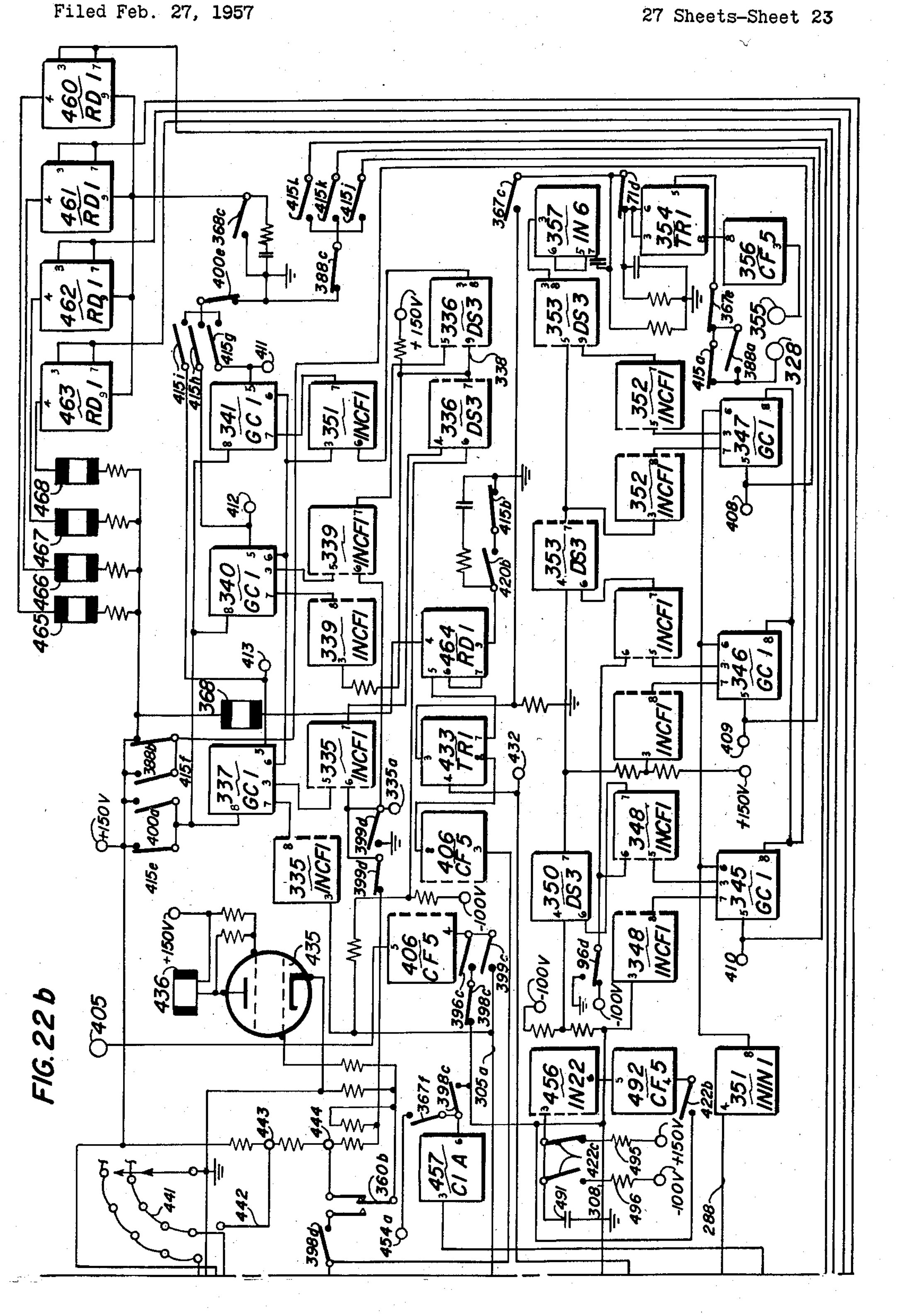
Figure 23:
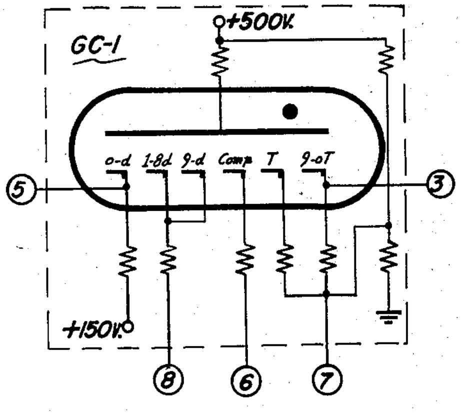
Figure 24:
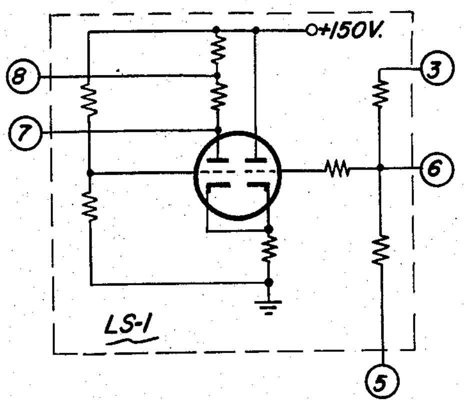

Figs. 22*a* and 22*b* comprise schematic diagrams of the test scoring circuits of the invention.

Figs. 23 through 43 comprise detailed schematic diagrams of the various electronic components utilized in the machine of the invention.

Referring now to the drawings, the test scoring machine of the invention is described and disclosed in connection with a record card punching machine similar to that described in U.S. Letters Patent 2,647,581. More precisely, the invention is disclosed as being adapted to a modified Type 26 printing card punch of the type fully described in the Customer Engineering Manual of Instruction entitled Card Punch, Type 24, Printing Card Punch, Type 26, copyrights 1950, 1953 by International Business Machines Corporation, 590 Madison Avenue, New York, New York, copies of which may be found in the Library of Congress. For convenience, this publication will be referred to hereinafter as "the manual."

To permit a ready understanding of the adaptation of the novel test scoring circuits to be described to the aforementioned printing card punch, drawings similar to those found in the aforementioned manual are utilized herein, these drawings having been modified to the extent necessary to provide the desired modes of operation. The machine described in the manual is discussed in the present description only to the extent necessary to provide an understanding of the invention, and for more comprehensive information the manual may be referred to. It is to be noted that structure disclosed herein which is similar to that shown in the manual will be identified by similar reference numerals preceded by a "C" to permit ready reference to the manual while allowing the modifications and new structure to be easily distinguished.

Figure 1:
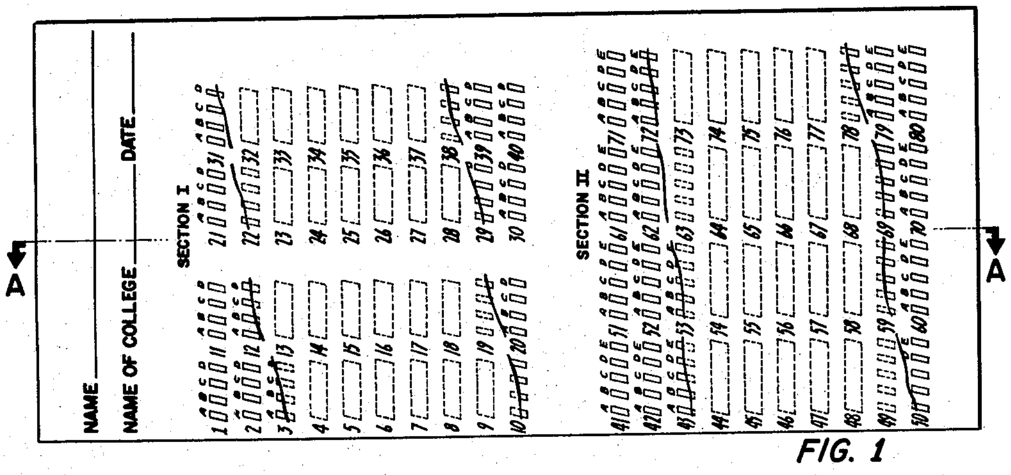
Fig. 1 is a partial reproduction of a sample answer card.

The machine of the invention is arranged to score answer cards such as that shown in Fig. 1, wherein answers to a test (not shown) are marked in positions selected by the examinee. The marked positions are compared with a master card (Fig. 2) which has been prepared by the examiner in accordance with the answers known to be correct. In the present embodiment correct answers are punched in a record card, referred to herein as the master card, which is processed in timed relation with the answer card. The answer card is also in the form of a record card, and when entered into the machine the answer card is compared, column by column, with the master card. Means to be described are provided for accumulating the number of right answers, the number of wrong answers, the number of right answers minus the number of wrong answers, etc., and for printing and/or punching the results in the answer card.

The machine is under the control of a program card (Fig. 3) punched according to the operations desired and of a control panel (Fig. 4) which is wired according to the format of the answer card. To facilitate a comprehensive understanding of the machine, it will be described functionally in connection with its operation under control of the documents shown in Figs. 1, 2 and 3 as well as the control panel illustrated in Fig. 4. It will be understod, however, that the machine is not limited to these specific operations, as will become obvious.

Referring to Fig. 1, the answer card marked by the examinee is illustrated. It will be noted that section 1 of the test includes spaces for 40 four-part multiple-choice answers whereas section 2 includes spaces for 40 five-part multiple-choice answers. There are 24 possible answer positions across the card and the machine is arranged to scan positions determined by the card format. Thus, with the answer card above the machine must be programmed differently for scanning the two sections. As mentioned above, such programming is under control of the program card and control panel. The control panel is wired according to the various formats of the answer card and the program card controls the selection of these formats.

The machine is provided with a scanning head 10 (Figs. 5 through 13) arranged to sense optically marks entered by the examinee. The head 10 forms no part of the present invention and a detailed description thereof will not be given herein; however, sufficient information will be given in this regard to permit a full understanding of the invention. A photomultiplier tube 11 (Fig. 6) is provided to coact optically with answer cards for detecting marks thereon. The head 10 is arranged to detect marks disposed in one or more of the 24 mark positions. These positions are defined by a plate 12 beneath which answer cards being scored are passed one column at a time according to the escapement mechanism of the machine. For convenience, that portion of the answer card lying below the dotted line A—A (Fig. 1) is referred to as the lower portion, the remainder of the card lying above the line A—A being referred to as the upper portion.

The upper and lower portions of each line of answers are scanned separately, the 12 marking positions in the lower portion being scanned first. Since recorded marks may be punched (this operation is referred to herein as response punching) in the card and since only 12 punching positions are available across the card for punching a possible 24 answers on a line, it is necessary to space punches corresponding to the upper and lower portions of the card. To this end the holes 13 provided in the plate 12 are staggered in such a way that the 12 holes which cooperate with the 12 marking positions in the lower portion of the card are one column in front of 12 holes which cooperates with the 12 marking positions associated with the upper portion. Referring to Fig. 14, the holes 13L (the holes which cooperate with the lower portion of the card) are disposed one card column in front of the holes 13U in the direction from which the card is being advanced. Thus, when the holes 13L are registered on a given line of answers. the holes 13U are displaced one card column therefrom, and it is necessary to escape one column after reading the lower portion of the card to register the holes 13U for reading the upper portion.

Twenty-four neon bulbs 15 through 38 (Fig. 4) are provided for selectively and sequentially illuminating the 24 marking positions across the card and each bulb is arranged to cooperate exclusively with the corresponding hole 13 (Fig. 14) for illuminating only that portion of the answer card associated therewith. Additionally, a reference neon 39 (Fig. 7) is provided which is ignited, as will be described, whenever no neon 15 through 38 is ignited. The light reaching the photomultiplier tube from the reference neon is adjusted to equal the reflected light which reaches the photomultiplier tube from one of the neons 15 through 38 when no mark is present in the corresponding mark position. Thus, unless a mark is present in a given mark position, the photomulitplier signal remains substantially constant and it is only when the reflected light reaching the tube 11 decreases due to the presence of a mark that an output signal is generated.

Figure 4:
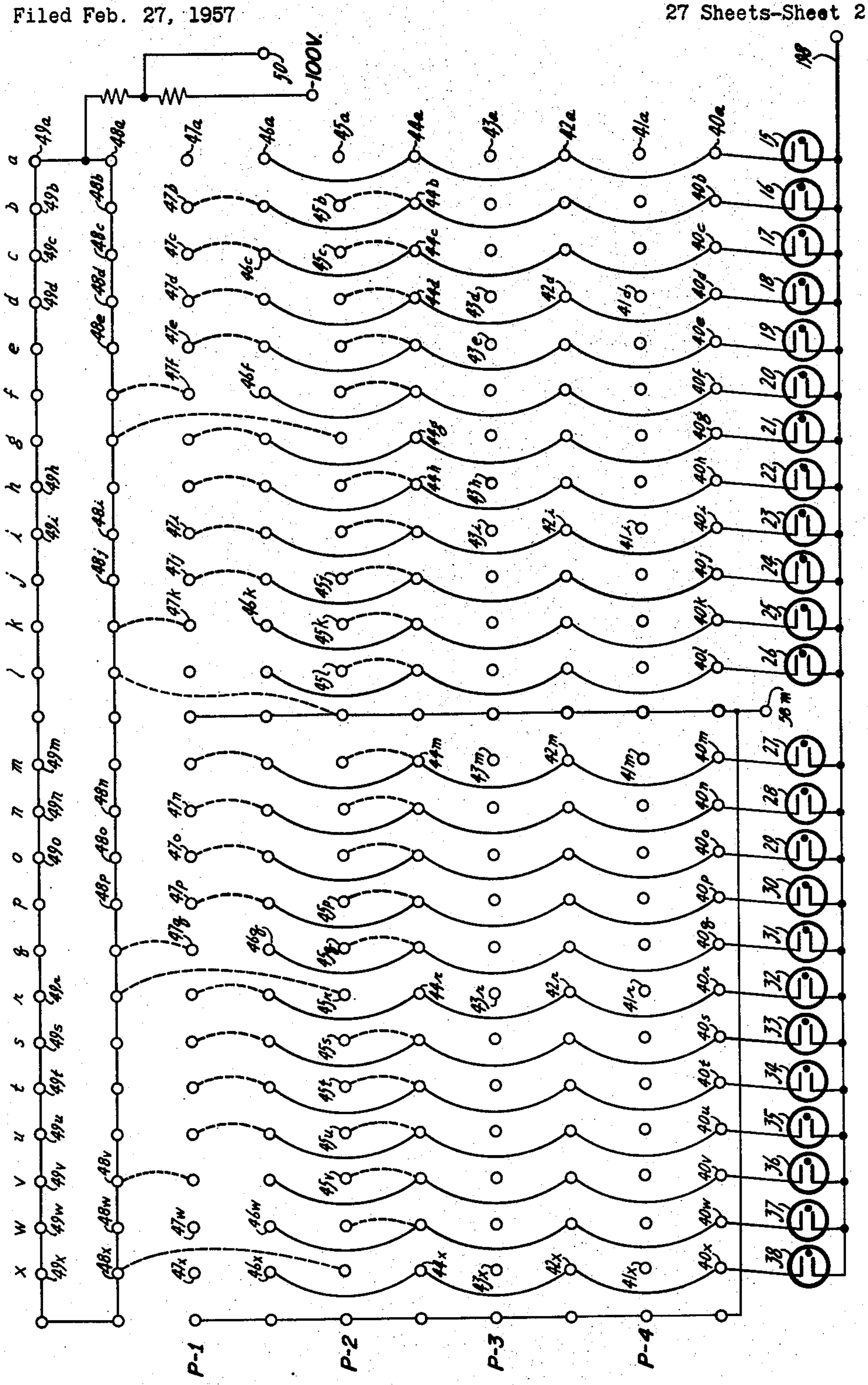
Fig. 4 is a schematic diagram of the control panel of the invention.
Figure 5:
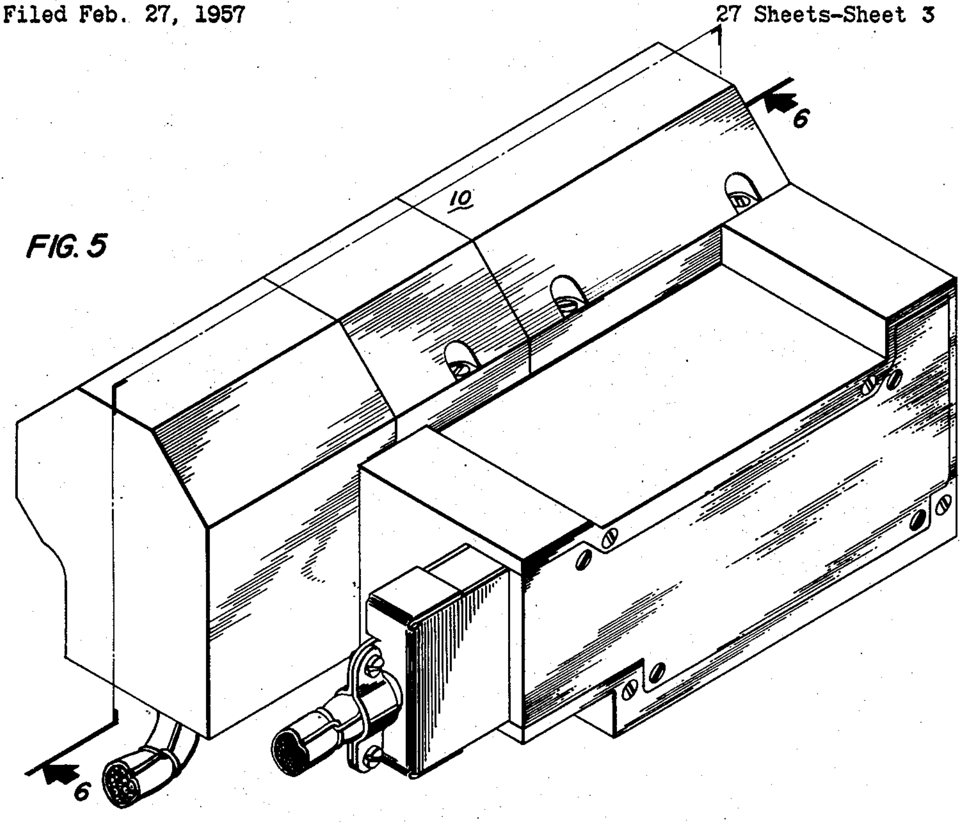
Fig. 5 is a perspective view of the scanning head of the invention.

One side of each of the neons 15 through 38 is common, the other sides of these neons being connected to corresponding hubs of a row of hubs 40 of the control panel (Fig. 4). In addition to the row of hubs 40 the control panel is provided with nine rows of hubs 41 through 49. The corresponding hubs of the rows 40, 42, 44 and 46 are connected together as shown in full lines, and the various hubs of the rows 48 and 49 are connected to a common terminal 50.

The hubs 47–*a* through 47–*x* of the row 47, termed the program 1 hubs, are electrically connected by means not shown to corresponding hubs 51–*a* through 51–*x* (Fig. 15). Similarly, the hubs of the rows 45, 43 and 41 (Fig. 4), designated the 2, 3 and 4 program hubs respectively, are connected to corresponding hubs 52, 53 and 54 respectively (Fig. 15). As will become clear, the hubs 51 through 54 are selectively connected through various points of several relays 55, 56 and 57 to 12 lines 58. The relays 56 and 57 determine program selection in that they determine which group of hubs 41, 43, 45 or 47 of the control panel (Fig. 4) is utilized. The relay 55 (Fig. 15) determines the connection of the 12 lines 58 to the neons associated with either the upper or lower portion of the answer card, depending upon which is to be scanned.

The relays 56 and 57 are thus arranged for selecting one of four programs, program 1 being selected when neither relay 56 nor 57 is energized; similarly, program 2 is selected when relay 56 alone is energized; program 3 is selected when relay 57 alone is energized; and program 4 is selected when both relays 56 and 57 are energized. When neither relay 56 nor 57 is energized, therefore, 12 of the hubs 47–*a* through 47–*x* are connected to the corresponding lines 58–*a* through 58–*l* depending upon the condition of the relay 55. When the relay 55 is in the condition shown, the lines 58–*a* through 58–*l* are connected to the hubs 47–*a* through 47–*l*, the lines 58–*a*, through 58–*l* being connected to the hubs 47–*m* through 47–*x* when relay 55 is energized. The lines 58 are sequentially raised in potential by means to be described for sequentially igniting the neon bulbs of the head according to the wiring of the control panel and under control of the relay 55.

In the present example the control panel shown in Fig. 4 is wired according to the format required by the answer card (Fig. 1), two different programs being required. Program selection is under control of the program card (Fig. 3) as will be described. Section 1 of the answer card is set up for four-part multiple-choice questions and it is necessary to render the marking positions associated with neons 15 through 18, 20 through 23, 27 through 30 and 31 through 34 active when scoring this section. This is accomplished by wiring the hubs 47–*b*, 47–*c*, 47–*d*, etc., of the control panel (Fig. 4) to the corresponding hubs 46–*b*, 46–*c*, 46–*d*, etc., as shown in dotted lines in Fig. 4. The hubs 47–*f*, 47–*k*, 47–*q* and 47–*v* are wired to any of the hubs in the rows 48 or 49 as may be convenient. Thus, the terminal 50 is pulsed after or at the end of each question, and this pulse is referred to herein as the EOQ pulse (end of question pulse). The control panel is also wired, as shown in Fig. 4, to operate the neons according to the format of section 2 of the answer card, the questions in this case calling for five-part multiple-choice answers.

Before proceeding with the functional description of the machine, it is felt that the identification of several control switches is necessary. A switch 60, called the test score on-off switch, determines the operativeness of the test scoring circuits. When this switch is in the "off" position, the machine operates as a normal record card punch in the manner described in the aforementioned manual, and the remainder of the test scoring switches to be described are inoperative. When the switch 60 is in the "on" position, however, scoring and mark converting circuits are active and answer cards placed in the hopper are fed automatically through the punch-read station.

A response punch on-off switch 61 is provided which, when on, controls the conversion of sensed marks to punched holes in the card. Additionally, a switch 62 determines whether response punching is to take place for right answers, wrong answers, or all answers.

Under certain conditions it is desired to scan an answer card without scoring it to determine the quality of marks made by the examinee, and for this reason a pre-scan switch 63 is provided. When this switch is in the "on" position, the card escapes according to the regular program; however, no punching in the card takes place during the response punching, score read-out, or duplication fields except during a substandard mark indication time, at which time a 12 punch is actuated to indicate that a mark is below standard. It should be noted in this connection that an automatic quality indication is given, by means of a 12 punch, during test scoring and immediately prior to each score read-out.

In addition to the normal test scoring circuits, means are provided for converting scores accumulated by the machine according to a predetermined table to be described. This feature is referred to as score converting, and when scores are to be converted a switch 64, referred to as the score converting switch, is placed in the "on" position. These circuits are inoperative when the switch 64 is in the "off" position.

Two counters for accumulating scores are provided, each being controlled by a suitable switch. Counter 1 is controlled by a six-position switch 65 which determines the basis for score accumulation into counter 1. The score may be accumulated under control of this switch in any one of the following six forms: (*a*) right answers only, (*b*) wrong answers only, (*c*) right answers minus wrong answers, (*d*) right answers minus ½ wrong answers, (*e*) right answers minus ⅓ wrong answers, (*f*) right answers minus ¼ wrong answers. The counter 2 switch 66 is a three-position switch which determines whether the basis for score accumulation into counter 2 will be that of (*a*) right answers only, (*b*) wrong answers only, (*c*) omitted answers only.

As mentioned previously, the machine is under the control of the program card shown in Fig. 3. Referring to the manual, it will be seen that a punch in the program card is sensed by star wheels and that punches sensed by certain star wheels are arranged to cause certain predetermined operations. The machine of the present invention utilizes 12 star wheels which cooperate with each of the 12 punch positions of the program card, and the operations initiated by these punch positions are listed below:

12 punch: Defines field for autoskip only.

11 punch: Initiates autoskip.

0 punch: Calls for duplication from pin sense contacts. A 0 punch must appear in every column where duplication is desired.

1 punch: Calls for score read-out. Unless further control is initiated by a 4 and/or a 5 punch, read-out will be a subtotal of both counters preceded by a substandard mark indication and a sign indication for counter 1. A second 1 punch in the next adjacent column causes the counters which have been read out to be reset.

2 punch: If the score converter switch 64 is off, a 2 punch controls zero printing as in the Type 26 machine. When the switch 64 is on, a 2 punch calls for a converted score if read-out is programmed (1 punch). The 2 punch must be in the same column as the 1 punch.

3 punch: Controls print suppression as in the Type 26 machine.

4 punch: During card read this punch suppresses accumulation into counter 1. If the punch follows a 1 punch, it suppresses read-out and reset instructions to this counter.

5 punch: During card reading this punch suppresses accumulation into counter 2. If the punch follows a 1 punch, it suppresses read-out and reset instructions to this counter.

6 punch: Controls the machine to read and score the lower portion of the column positioned at the read station.

7 punch: Controls the machine to read and score the upper portion of the column positioned at the read station.

8 punch: Activates the program 2 hubs.

9 punch: Activates the program 3 hubs.

8 and 9 punches: Together activate the program 4 hubs.

It should be noted in connection with the above table that the 12, 11, 0, 1, 2 and 3 punches operate the machine in the manner described in the aforementioned manual when the test scoring switch 60 is in the "off" position.

A score read-out normally consists of a mark quality indication (12 punch), first counter sign indication (11 punch), and the six digits of the two counters. If both counters are suppressed from read-out only mark quality indication is given. The number of columns that are used in read-out depends upon punching in rows 1, 4 and 5 of the program card, and assuming a read-out is requested at column 40, i.e., assuming that a 1 punch appears in column 40 of the program card, the next column that may be used for a 6, 7 or 0 punch is as follows:

| | |
|---|---|
| Both counters read-out | column 48 |
| First counter read-out only | column 45 |
| Second counter read-out only | column 44 |
| Mark indication only | column 42 |

The reading station is disposed 7½ columns behind the punching station, i.e., when the 0 column of the answer card is registered at the punching station, column 7½ of the answer card is registered at the reading station. Referring to Fig. 1, it will be noted that the first row of answers to be scanned is located at column 14½ of the answer card. Thus, it is necessary to cause the card to escape 7 columns prior to initiating the scanning operation. It should also be noted that when column 0 of the answer card is registered at the punching station, column 1 of the program card is registered with the star wheels. To cause the aforementioned escapement, therefore, it is necessary to provide an 11 punch in column 1 of the program card and 12 punches in columns 2 through 7 to thereby cause the answer card to escape to the position where column 14½ is at the reading station. The program card is then provided with a 6 punch in column 8, which causes the lower portion of column 14½ of the answer card to be scanned. A 7 punch in column 9 of the program card causes the upper portion of column 14½ of the answer card to be scanned. The remaining columns of section 1 of the answer card are scanned in a similar manner under control of 6 and 7 punches provided at suitable locations in the program card.

Figure 2:
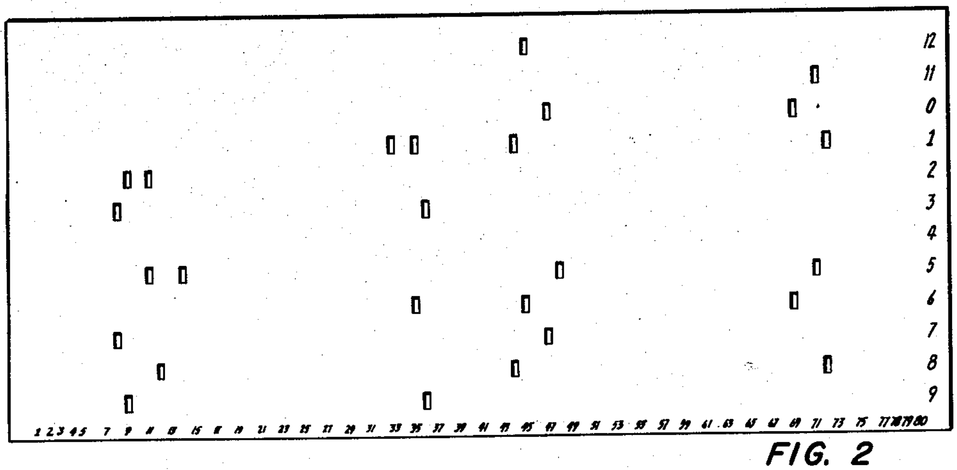
Fig. 2 is a partial reproduction of a sample master card containing indicia of correct answers corresponding to the answer card shown in Fig. 1.

In the example shown in Figs. 1 through 3, counter 2 is to be read from after the scoring of section 1 has been completed and the answer taken from counter 2 is to be punched and printed in columns 37 through 40 of the answer card. Thus, a 1 punch is provided in column 38 of the program card and a 4 punch is provided in column 39. This will result in a quality punch being provided in column 37 of the answer card and the three digits taken from counter 2 being recorded in columns 38, 39 and 40 of the answer card. Section 2 of the answer card is scanned in a similar manner; however, upon completion of scoring section 2, counter 1 together with the converted score is punched in the answer card. In this instance, therefore, both a 1 and a 2 punch will appear in column 74 of the program card. This will result in punching a quality indication in column 73, a sign indication in column 74, the three digits read from counter 1 in columns 75, 76 and 77 and the converted score in columns 78, 79 and 80 of the answer card.

Throughout the description it will be assumed that the test scoring switch 60 is in the "on" position, the response punch switch 61 is in the "on" position, the punch selector switch 62 is in the condition which causes all answers to be response punched, the pre-scan switch 63 is in the "off" position, the score converting switch 64 is in the "on" position, the counter 1 control switch 65 is in a condition for recording right answers only, and the counter 2 control switch 66 is in a position to control counter 2 to accumulate only omitted answers.

Assuming that the answer card is registered with its 0 column at the punching station, operation of the "autodup" key causes the card to escape to column 7, at which time the #6 star wheel (Fig. 16) drops into the 6 punch provided in column 8 of the program card. When this occurs, a terminal 70 is connected to ground, which terminal is connected through the n/c *c* points (Fig. 17) of a relay 71 to a terminal 72. The terminal 72 (Fig. 16) is connected to one side of a relay 73, the other side of which is connected through the n/o *a* points of a relay 74, which relay is connected in parallel with the relay C28 (Fig. 18*b*), to one side of a circuit breaker operated by a cam P6 (Fig. 16). The other side of this circuit breaker connects to a terminal 75 which is connected through the n/o *b* contacts of a relay 76 to −48 volts. The P6 cam is arranged to operate during each punch cycle according to the timing chart shown in Fig. 19, and the relay 76 is operated as long as the test scoring switch 60 is on, since the cathode of a tube 78 (Fig. 18*b*) connects through the armature **60*a* of switch 60 to −100 volts and since the relay 76 connects between the plate of the tube 78 and ground. Thus, as long as the test scoring switch 60 is in the "on" condition, −100 volts appears on the cathode of the tube 78, thereby energizing the relay 76. When in the test scoring mode, therefore, the relay 76** is energized, the *b* contacts thereof are closed, and when the 6 punch is sensed, the relay 73 is picked by P6.

The hold coil of the relay 73 (Fig. 16) is connected between −48 volts and through the n/c *d* points of a relay 80, through the n/o *a* points of the relay 73 and through the circuit breaker contacts associated with a cam P7 to ground. Thus, the relay 73 is picked by P6 and is held by P7 when a 6 punch in the program card is sensed, provided that the relays 74 and 76 are picked and the relays 71 and 80 are not picked. The relays 71 and 80 are picked, as will be clear, only during read-out.

When the relay 73 picks, a terminal 82 (Fig. 18*a*) is connected through the n/o *c* points thereof, through the n/c *e* points of a relay 83, through the n/c *e* points of a relay 84, through the n/o *b* points of the relay C27 to a terminal 425. Terminal 425 connects through the C–P5 contacts to a terminal 365, which terminal connects through the card lever contacts C–3BU (Fig. 18*b*) to ground. Since the machine is in the autodup mode for a test scoring operation, the relays C27, C28 and 74 are energized and, further, as long as a card is in the bed of the machine, the card lever contacts are operated. Thus, it will be clear that under these conditions the terminal 82 (Fig. 18*a*) is connected to ground during P5 time. This signal is arranged to initiate the operation of the mark converting portion of the test scoring circuits, i.e., it is arranged to control the scanning mechanism to scan the column of answers disposed at the reading head and to response punch sensed answers. In addition, sensed marks are compared with the master card to determine their correctness.

Terminal 82 is connected to the #8 tap of a DS–3 unit 91 (Fig. 20*a*), which unit (see appendix) is an "or" circuit. It should be noted at this time that most of the electronic circuitry utilized herein is portrayed in this manner and that these units are described in the appendix hereto. The #5 and #9 taps of the unit 91 are connected to the #5 tap of a PS–A unit 92 which with a CI–A unit 93 comprises a multivibrator circuit arranged to generate pulses for operating the various neons 15 through 38. One output of this multivibrator circuit is taken from the #7 tap of the unit 93 and is connected through a CF–5 unit 94 to a line 95 which connects to the #6 tap of each of fourteen TR–3 units 96 through 109 (Figs. 20*a* and 20*b*) connected in a conventional ring circuit. The TR–3 unit 96, the "home" trigger, is reset in such a way that the #7 tap thereof is initially low, the #8 tap thereof being initially high. When in this condition the various triggers utilized herein are said to be "on." When the #7 tap is high and the #8 tap is low, however, the trigger is said to be "off." Thus, the trigger 96 is reset in an "on" condition, the triggers 97 through 109 being reset in an "off" condition, and the negative-going edge of each multivibrator pulse appearing on the line 95 is arranged to drive the "on" triggers around the ring in a conventional manner.

The #7 tap of the TR–3 unit 96 is connected through a CF–5 unit 89 and a line 90 to the #3 tap of the DS–3 unit 91. When the unit 96 is off, thereby rendering the #7 tap thereof high, the line 90 is high, maintaining the multivibrator operative until the unit 96 is again turned on. This occurs when the last trigger 109 of the ring is turned off. Thus, the multivibrator is operative to generate thirteen pulses, at the end of which time the line 90 drops, thereby biasing the PS–A unit 92 to prevent further operation.

The #7 tap of each of the triggers 97 through 108 is connected through the corresponding portion of an IN–5 unit 110 through 115 to the #3 and #8 taps or the #7 tap of a corresponding portion of a DS–3 unit 116 through 121, the #7 tap of the unit 109 being connected through an IN–5 unit 122 to the #3 tap of a DS–5 unit 123. In addition to being connected to the various units 116 through 121, the outputs of the various IN–5 units 110 through 115 are connected to the #3 taps of several DS–A units 124 through 135. The #4 and #5 taps of the various units 116 through 121 are connected to the corresponding lines 58–*a* through 58–*l*, as shown in the drawing, and when the input to one of the DS–3 units 116 through 121 goes up, as it does when the corresponding trigger is turned on, the corresponding line 58 rises. Thus, the neons determined by the wiring on the program panel are lit sequentially under control of the multivibrator which operates the various triggers of the ring, each wired neon being arranged to remain lit for the period that its corresponding TR–3 unit is on.

The various DS–A units 124 through 135 comprise three-input "and" circuits and are arranged to control the firing of twelve THY–A units 136 through 147, the #6 tap of each of the units 124 through 135 being connected to the #7 tap of the corresponding THY–A unit. As will become clear, the signal connected to the #7 taps of the various THY–A units conditions the firing of these units, and if a mark is sensed by the photomultiplier tube, the THY–A unit corresponding to the position of the mark is fired, thereby operating a corresponding interposer magnet for controlling the punching operation, as will be described.

It was mentioned earlier that a master card containing the correct answers is provided for comparing the correct answers with those marked by the examinee. The correct answers are punched in the master card which is mounted on an auxiliary program drum driven in unison with the main program drum of the machine. Twelve star wheels are provided for sensing these punches, the contacts 148 through 159 operated thereby being shown in Fig. 16. One side of each of these contacts is connected to a corresponding terminal 160–*a* through 160–*l*, these terminals being connected to the corresponding #9 or #6 tap of the various DS–3 units 116 through 121 (Figs. 20*a* and 20*b*). The other sides of the contacts 148 through 159 are connected in common to a terminal 161. Thus, it will be clear that the terminal 161 goes up each time a neon corresponding to a hole punched in the master card is ignited. As will become clear, it is this signal that is compared with the photomultiplier signal to determine the correctness of an answer.

The output of the photomultiplier 11 (Fig. 21) is connected through two amplifiers 171 and 172 to the control grid of a cathode follower 173, the cathode of which is connected to the control grid of another amplifier 174. The output, i.e., the plate, of the amplifier 174 is coupled to the cathode of a diode 176, the plate of which is connected to the control grid of a cathode follower 177 as well as through a condenser 178 to ground. The condenser 178 is charged by signals passing through the diode 176 and is arranged to retain a charge corresponding to the amplitude of such signals. This condenser is discharged, as will be described later herein, by a signal appearing on the plate of a second diode 179, the cathode of which is also connected to the control grid of the cathode follower 177.

The cathode of the tube 177 is coupled to the control grid of an amplifier 181, the plate of which is coupled to the control grid of another amplifier 182, and signals generated by the photomultiplier are taken from a line 183 connected to the plate of the amplifier 182. The line 183, therefore, is normally high; however, when a signal is applied to the control grid of the amplifier 171, i.e., when a mark is sensed by the photomultiplier tube 11, the line 183 drops.

It should also be noted that the cathode of the cathode follower 177 is connected to the cathode of an amplifier 184, which tube is normally biased below cut-off. The plate of the amplifier 184 is coupled through a cathode follower 185 to the control grid of an amplifier 186, and if the potential of the cathode of the cathode follower 177 drops sufficiently to permit the amplifier 184 to conduct, a line 187 connected to the plate of the amplifier 186 rises. This circuitry is utilized to detect the quality of marks sensed by the photomultiplier tube 11. Thus, if a poor mark is sensed, i.e., a mark which falls below the quality determined by the setting of a potentiometer 188 provided in the grid circuit of the amplifier 184, the cathode of the cathode follower 177 does not drop sufficiently to permit the amplifier 184 to conduct and the line 187 connected to the plate of the amplifier 186 remains low. The line 187, therefore, goes up when, and only when, a mark of good quality is sensed. This signal is utilized to indicate the quality of the marks for controlling the quality punch in the answer card during read-out.

The line 183 is connected to the #8 tap of a CF unit 190 (Fig. 20*a*) which, together with a CF unit 191, comprises a three-input negative "and" gate. The #5 tap of the unit 190 is connected by a line 192 to the #6 tap of an IN–A unit 193, the #3 tap of which connects to the #7 tap of the CI–A unit 93. Thus, during the operation of the multivibrator the pulses taken from the #7 tap of the unit 93 are inverted and differentiated by the IN–A unit 193 and appear on the line 192. These pulses are referred to herein as $T_1$ pulses. It should also be noted at this time that pulses referred to as $T_0$ pulses are taken from a line 194 connected to the #7 tap of an IN–A unit 195 and that these pulses are 90° out of phase with the $T_1$ pulses inasmuch as the multivibrator pulses taken from the #6 tap of the PS–A unit 92 are differentiated and inverted by the unit 195.

The third input to the above mentioned negative "and" gate is to the #5 tap of the unit 191, which tap is connected to the #6 tap of an IN–5 unit 196. Each of the neons 15 through 38 (Fig. 4) has one side connected in common to a terminal 198, which terminal connects through the n/o *d* points (Fig. 20*a*) of the relay 73 and through the n/c *a* points of the relay 80 to the #6 tap of an LS–1 unit 197. The #7 tap of the unit 197 is connected to the #3 tap of the IN–5 unit 196. Thus, when any of the scanning neons is lit, the #5 tap of the unit 191 is down, it being high only while the reference neon is ignited. Since the units 190 and 191 comprise a three-input negative "and" circuit, it will be clear that the #4 tap of the unit 191 and the #3 and #4 taps of the unit 190 drop at $T_1$ time only if a signal appears on the line 183 at a time when one of the neons 15 through 38 is lit.

The #3 and #4 taps of the unit 190 as well as the #4 tap of the unit 191 are connected to a terminal 200. The terminal 200 connects to the #8 tap of a CF–22 unit 201 (Fig. 22*a*), to the #8 tap of a CF–22 unit 202 and to the "all" and "W+R" terminals of the switch 62. The unit 201 is arranged to gate pulses representative of wrong answers, the unit 202 being arranged to gate pulses representative of right answers.

It will be recalled that the common side of the star wheel operated contacts associated with the master card is connected to the terminal 161 (Fig. 16) and that this terminal rises when one of the triggers 97 through 108 corresponding to a punch in the master card is turned on. Thus, the terminal 161 is high when there should be an answer marked on the answer card. The terminal 161 is connected through an LS–1 unit 205 (Fig. 22*a*) to the #5 tap of an IN–22 unit 206 and to the #5 tap of the unit 201. Additionally, the #7 tap of the unit 206 is connected to the #5 tap of the unit 202. It will now be clear that if a signal appears on the terminal, 200 i.e., if a mark is sensed, at a time when the terminal 161 is high, this is indicative of a right answer and a signal will appear on a line 204 to indicate a right answer. Conversely, if the signal on the terminal 200 occurs at a time when the terminal 161 is low, the signal will appear through the gate 201 to a line 203 to indicate a wrong answer. It is in this way that marked answers are compared wtih the master card for scoring purposes.

The line 203 is connected to the W terminal of the switch 62, the line 204 being connected to the R terminal of this switch. Thus, when the switch 62 is in the "all" or "W+R" position, all signals taken from the terminal 200 are connected through the n/c *h* points of the relay 80 to a terminal 207. If, however, the switch 62 is in the W or R position, only those signals corresponding to wrong answers or right answers, respectively, are connected to the terminal 207.

The terminal 207 is connected to the #3 tap of an SS–1 unit 208 (Fig. 20*a*), the #7 tap of which is connected through a CF–5 unit 209 to a line 210 which in turn connects to the #8 tap of each of the aforementioned DS–A units 124 through 135. Thus, when right and/or wrong marks are sensed, depending upon the condition of the switch 62, the #8 tap of each of the units 124 through 135 rises for a short period of time determined by the constants of the SS–1 circuit. The #8 tap of the SS–1 unit 208 is connected through a CF–5 unit 211, through a suitable differentiating circuit and through a DS–3 unit 212 to a line 213 connected to the #7 tap of the unit 212. The unit 212 is an "or" circuit, the second input, i.e., the #6 tap, of which is connected to the line 90 which is high during the operation of the multivibrator as described above. Thus, the #7 tap of the unit 212 is high while each question is being scanned until a signal appears on the terminal 207, at which time the line 213 drops momentarily.

The line 213 is connected to the #7 tap of each of the DS–A units 124 through 135. Referring to the schematic diagram of the DS–A units, it will be seen that the negative-going portion of a signal applied to the #7 tap causes the #6 tap to drop momentarily regardless of the condition of the #3 or #8 taps of these units. This pulse is utilized to discharge a condenser connected between the control grid and ground of each of the THY–A units 136 through 147 (Figs. 20*a* and 20*b*). The #3 and #8 taps of the units 124 through 135 comprise the two inputs of two-input "and" circuits, and if a signal appears on the line 210 during the time when one of the TR–3 units 97 through 108 is off, this signal passes through the corresponding DS–A unit to the #7 tap of the corresponding THY-A unit, thereby charging the condenser connected to the control grid of that unit and conditioning it to fire when the #3 tap thereof is raised.

The #3 tap of each of the various THY–A units 136 through 147 is connected to a line 220, which line goes up at the end of each question since the EOQ pulse taken from the terminal 50 (Fig. 4) is connected through a circuit to be described to the line 220 (Fig. 20a). Thus, while the question is being scanned, the mark sensed is entered into the corresponding THY–A unit 136 through 147, which unit is fired by the EOQ pulse, thereby entering this mark into the proper interposer magnets for controlling the operation of the punch.

The EOQ terminal 50 (Fig. 4) is connected to the #8 tap of a CF–22 unit 223 (Fig. 22*a*), the #3 tap of which is connected to the #4 tap of a DS–3 unit 224. The #5 tap of the unit 223 connects to the #7 tap of a TR–1 unit 225. The unit 225 is reset in an "on" condition at the end of each question and is used to indicate whether or not an answer is punched in the master card for each question being scored. If the master card has an answer punched for a given question, the trigger 225 is turned off since the #3 tap thereof is connected to the #8 tap of the LS–1 unit 205. Thus, if the #7 tap of the unit 225 is high at EOQ, it is an indication that there was an answer to the question, the #7 tap being low if no answer was provided in the master card.

The #4 tap of the CF–22 unit 223 is connected to the R, W, and R+W terminals of the *b* section of the switch 62, the armature of this switch being connected to the #6 tap of the unit 224. The "all" terminal, it should be noted, is not connected to anything and when the switch 62 is in the "all" position, the gate 224 is maintained open due to the provision of the resistor 226 to +V connected to the #6 tap thereof, this gate being open only if the trigger 225 is off while the switch is in any of the other three positions. Thus, the EOQ pulse taken from the terminal 50 is taken from the #7 tap of the unit 224 only if an answer is punched in the master card, while the switch 62 is in the R, W, or R+W position, or during each question whether or not an answer is punched in the master card if the switch 62 is in the "all" position. The #7 tap of the unit 224 is connected through the n/c *f* points of the relay 80 to a terminal 227, this terminal being connected through a CF–10 unit 221 (Fig. 20*a*) to the line 220.

The #5 taps of the various THY–A units 136 through 147 are connected to corresponding terminals 230–*a* through 230–*l*, these terminals being connected through corresponding n/o contacts of a relay 232 (Fig. 18*a*), and when the relay 232 is energized, the #5 taps of the THY–A units 136 through 147 are connected to one side of a corresponding interposer magnet of the Type 26 machine for entering data present in the thyratrons into the interposer magnets for printing and/or punching.

As mentioned earlier, it is desired to maintain the reference neon on whenever the scanning neons are off. It will be recalled that the #7 tap of the LS–1 unit 197 (Fig. 20*a*) is high as long as one of the scanning neons 15 through 38 is on. This tap is connected through a CF–5 unit 235 to one input of a positive "and" gate comprising diodes 236 and 237, the output of which is connected to the #3 tap of an IN–22 unit 238. Since some time is necessary to ignite one neon after the extinguishment of another, the "neon common" signal taken from the #7 tap of the unit 197 is mixed with $T_0$ pulses. These pulses taken from the line 194 are connected through the CF–5 unit 235 to the other diode 237. Thus, $T_0$ pulses are mixed with the neon common pulses and are entered into the unit 238. The #6 tap of the unit 238 is connected to one side of the reference neon, the other side thereof being grounded, and it will now be clear that as long as the scanning neons are lit the reference neon is extinguished, and vice versa.

It will be recalled that the condsener 178 (Fig. 21) is charged when a mark is sensed, thereby controlling the line 183 to rise. As mentioned earlier, the condenser 178 is discharged just prior to each time in which a mark may be sensed until a mark is sensed. As well as being connected to the terminal 200 (Fig. 20*a*) the #4 tap of the unit 191 and the #3 and #4 taps of the unit 190 are connected to the #6 tap of a TR–1 unit 239, the #8 tap of which is connected by a line 240 to the #5 tap of an IN–5 unit 244. The #6 and #7 taps of this unit are connected together to form an "and" circuit, the second input of which is connected to the $T_0$ line 194. The #6 and #7 taps of the unit 244 are connected through the DS–5 unit 123 and through a CI–A unit 246 to a terminal 247. The unit 123 is a three-input "or" circuit which requires all three input taps, #4, #6 and #8, to be down in order for the #7 and #9 taps thereof to be down. Thus, if any one of the input taps is high, the #7 and #9 taps thereof are high.

The #4 tap of the unit 123 is connected to the #6 tap of the IN–5 unit 122, the #3 tap of which is connected to the #7 tap of the TR–3 unit 96. Thus, as long as the unit 96 is off, the #4 tap of the unit 123 is low. This is the condition, it will be recalled, while scanning. The #8 tap of the unit 123 is connected by a line 248 to the #6 and #7 taps of an IN–5 unit 249, which line is high during the latter portion of the EOQ pulse, as will be described. The EOQ terminal 50 connects through an IN–22 unit 250 to the #5 tap of the unit 249 where it is mixed with multivibrator pulses taken from the #6 tap of the unit 92 via a line 251 to the #3 tap of the unit 249. Thus, the line 248 goes up during the second half of the EOQ pulse. It will now be clear that the terminal 247 is high each $T_0$ time until a mark is sensed, at which time it drops until the second half of the EOQ pulse, and that it rises for the duration of the second half of the EOQ pulse. The terminal 247 connects through suitable resistors and through a line 252 (Fig. 21) to the plate of the diode 179, and when the terminal 247 rises as described above, the condenser 178 discharges, thereby controlling the charge and discharge of the condenser in the desired manner.

An important feature of the present invention is the ability of the machine to select one of several marks made on the answer card, this selection being made on the basis of mark quality. A fault of prior machines of this type was the inability to distinguish between poor erasures and good marks, which resulted in erroneous scoring of attempted erasures. This machine is arranged to select only one mark per question for scoring, the best mark as far as quality is concerned.

When a mark is sensed, the condenser 178 (Fig. 21) is charged as described. This results in a signal being applied to the line 183. Due to the A.C. coupling provided in the amplifier circuit, a later mark does not cause a signal to appear on the line 183 unless an increased charge is placed across the condenser 178, i.e., unless the later mark is of high quality. As pointed out, the condenser 178 is discharged by $T_0$ pulses until a mark is sensed, at which time the gate comprising the IN–5 unit 244 (Fig. 20*a*) is closed, thereby maintaining the charge on the condenser 178 (Fig. 21).

It will be recalled that the condensers associated with the #7 taps of the THY–A units 136 through 147 (Figs. 20*a* and 20*b*) are discharged when a mark is sensed, i.e., when a signal appears on the line 183, and that the condenser associated wtih the appropriate THY–A unit is charged immediately thereafter unless another signal appears on the line 183, i.e., unless a better quality mark is sensed prior to EOQ, the interposer magnet associated with the THY–A unit having the charged condenser being energized at EOQ. If, however, a better quality mark is sensed, all THY–A condensers are discharged again and the condenser corresponding to the latter mark is charged. Thus, only the best quality mark is taken for use in the test scoring operation.

Means are provided for indicating whether or not a question has been responded to by the examinee, and for this purpose the #7 tap of the IN–22 unit 250 (Fig. 20*a*) is connected to the #5 tap of a CF–5 unit 255, the #8 tap of which is connected to the $T_1$ line 192. Since the #3 and #4 taps of the unit 255 are connected in common via a line 256 to the #5 tap of a CF unit 258, this tap drops at $T_1$ time during the EOQ pulse since the EOQ pulse and the $T_1$ pulses are mixed in the unit 255. The #5 tap of a CF unit 257 is connected to the line 240 which rises when, and only when, a mark is sensed. Since the units 257 and 258 operate as a negative "and" circuit, it will be clear that the #4 taps thereof drop at EOQ–$T_1$ time only if the trigger 239 is off, i.e., when the #8 tap thereof is low. Since the #4 taps of the units 257 and 258 are connected to the #6 tap of a TR–1 unit 259, it will be clear that this latter unit is turned on at EOQ–$T_1$ time if no mark is sensed for a given question, thereby raising the potential of a terminal 260 since the #8 tap of the unit 259 is connected through a CF–5 unit 261 to the terminal 260. Thus, terminal 260 rises at EOQ–$T_1$ time if no mark is sensed.

Another feature of the present invention, as mentioned earlier herein, is the provision of circuitry for determining the quality of marks that are made. It will be recalled that the line 187 (Fig. 21) is high if the quality of the mark is above a standard determined by the setting of the potentiometer 188, the line 187 being low if the quality falls below this standard. The line 256 (Fig. 20*a*) is connected to the #8 tap of the CF unit 258, the #8 tap of the unit 257 being connected to the line 187. The #8 tap of a CF unit 262 is connected by a line 263 to the #7 tap of the TR–1 unit 239, which tap is high until a mark is sensed, at which time the line 263 is arranged to drop, as described. Thus, if a mark is sensed, the #8 tap of the unit 262 goes down. The #8 tap of unit 258 drops at EOQ–$T_1$ time, and, if the line 187 is low indicating a mark of poor quality, the EOQ–$T_1$ pulse appears on the #3 taps of the units 257, 258 and 262 and is connected to the #6 tap of a TR–1 unit 264 by a line 265. Under these conditions the TR–1 unit 264 is turned on by the EOQ–$T_1$ pulse, thereby raising the potential of a terminal **265*a* since the #8 tap of the unit 264 is connected through a CF–5 unit 266 to the terminal 265*a*. Thus, terminal 265*a*** rises at EOQ–$T_1$ time if a mark of poor quality is sensed.

Various circuits are reset at the end of each question, and for this reason the line 248 is connected to the #8 tap of a CF–10 unit 267. It will be recalled that the line 248 rises during the second half of the EOQ pulse, thereby controlling a line 268 connected to the #3 tap of the unit 267 to rise at this time. This line is connected to a terminal 269, the EOQ reset terminal, as well as to the #3 tap of the TR–1 unit 239. Thus, the unit 239 is reset by the trailing edge of this pulse as are other triggers associated with the terminal 269, as will be mentioned.

A terminal 270 is arranged to be high if no mark is sensed for a given question to determine thereby whether or not any questions are left unanswered. The terminal 270 is connected to the #4 tap of a CF–5 unit 271, the #7 tap of the TR–1 unit 239 being connected to the #5 and #8 taps of the unit 271. Since the #7 tap of the unit 239 is high until a mark is sensed, it will be clear that the terminal 270 is high if no mark is sensed.

Thus far, the description of the means for sensing answers, together with the means for punching these answers in the answer card, has been described. Additionally, the circuits for comparing the marked answers with those punched in the master card to determine the correctness of answers have been discussed. The following description is concerned with the circuits for accumulating scores for grading the tests.

It will be recalled that pulses representative of wrong answers are taken from the line 203 (Fig. 22*a*) and that pulses representative of right answers are taken from the line 204. The line 203 is connected to the #6 tap of a TR–1 unit 280, the line 204 being connected through a DS–3 unit 281, a negative "or" circuit, to the #3 tap of the unit 280. This trigger is reset during the latter portion of the EOQ pulse in an "off" condition, and for this reason the EOQ reset terminal 269 (Fig. 20*a*) is coupled to the #5 tap of the "or" circuit 281 (Fig. 22*a*). Thus, upon occurrence of the EOQ reset pulse the unit 280 is reset. The unit 280 is referred to as the "right/wrong" trigger and its condition indicates whether the answer to the question was right or wrong, it being on if the answer is wrong and off if the answer is right or if no answer is sensed. The potential of the #7 and #8 taps of the right/wrong trigger sets D.-C. levels for controlling the gating of pulses as will be described.

The #8 tap of the unit 280 is connected through a CF–5 unit 282 to a line 283 which is connected to the W terminal, i.e., the "wrong" terminal, of the second counter switch 66 as well as through a suitable condenser to the #6 tap of a DS–3 unit 284. The output of the unit 284 is connected to the #3 tap of an SS–1 unit 285. In a similar manner the #7 tap of the trigger 280 connects through the CF–5 unit 282 to a line 287 which is coupled to the #5 tap of the unit 284. On reset, therefore, the line 283 is low, the line 287 being high. If a wrong answer is received, the condition of the trigger 280 is reversed and the line 287 drops, the line 283 going up at this time. When the line 287 drops, the #3 tap of the SS–1 unit 285 drops, thereby firing this single-shot and causing the #7 tap thereof to rise for a short period of time.

The pulse taken via a line 288 connected to the #7 tap of the SS–1 unit 285 is used to complement the first counter, a gas tube counter to be described. Thus, each time a wrong answer is received, the first counter is complemented. Additionally, if a wrong answer is received for a given question and during that question a right answer is also received, the TR–1 unit 280 is turned off again, thereby causing the line 283 to drop. In this case the SS–1 unit 285 is again fired, thereby re-complementing the counter. It should also be noted that when a wrong answer has been received, thereby causing the generation of a complementing pulse, the first counter is re-complemented at EOQ since the unit 280 is reset at this time. Further description of the use of the complementing and re-complementing signals taken from the line 288 will be given later herein.

The line 287 is additionally connected to the #9 tap of a DS–3 unit 289, which unit is a positive "and" gate. Since the TR–1 unit 280 is reset in a "right" condition, thereby maintaining the #9 tap of the unit 289 high until a wrong answer is received, it is necessary to mix this signal with a "no omit" signal in order to determine if the question was answered correctly or if it was omitted entirely. It will be recalled that the terminal 270 (Fig. 20*a*) is high if there was no response to a question. This terminal is connected via a line 290 (Fig. 22*a*) through an IN–22 unit 291, through a CF–5 unit 292 and through a line 293 to the #5 tap of the unit 289. Since the #5 tap of the unit 289 is high if the answer was not omitted, it being low if there was an omission, the #3 and #8 taps of this unit are high only if the question was answered and was answered correctly. These taps are connected through a CF–10 unit 294 to a line 295 which is connected to the R terminal of the switch 66, this terminal being referred to as the "right" terminal. It should also be noted in this connection that the line 290 is connected to the "omit" terminal of the switch 66. If right answers are to be accumulated in the second counter, the armature of the switch 66 is connected to the R terminal thereof, in which case the line 295 is connected to a line 296. Similarly, if wrong or omit answers are to be accumulated, the armature 66*a* of switch 66 is placed in engagement with the corresponding W or omit terminal, thereby connecting the line 283 or 290, respectively, to the line 296.

The line 296 connects to the #6 tap of a DS–3 unit 297, which unit is a positive "and" gate, and right, wrong, or omit signals, according to the condition of the switch 66, are mixed therein with pulses, the generation of which is to be described next, for gating these pulses into the second counter to accumulate the number of right, wrong or omitted answers.

It will be recalled that when an answer is punched in the master card, the unit 225 is turned off, thereby rendering the #7 tap thereof high and the #8 tap low. The #8 tap is connected to the #5 tap of a CF–22 unit 299, a negative "and" gate, the #8 tap of which is connected to a terminal 300 from which EOQ–$T_1$ pulses are taken (see Fig. 20*a*). Thus, if an answer is punched in the master card, the corresponding EOQ–$T_1$ pulse passes through the unit 299 (Fig. 22*a*) to a line 301 connected to the #3 and #4 taps thereof. The line 301 is connected to the #3 tap of an SS–1 unit 302, the #7 tap of which connects through a CF–10 unit 303 to the #4 and #5 taps of the unit 297. Thus, the #4 tap of the unit 297 goes up during EOQ–$T_1$ time if an answer is punched in the corresponding portion of the master card. This signal is mixed in the unit 297 with the signal taken from the line 296, and pulses corresponding to the number of right answers, wrong answers or omitted answers, depending on the condition of the switch 66, will appear on a line 305*a*, if an answer is provided in the master card, since the #7 tap of the unit 297 is connected through the CF–10 unit 294 to the line 305*a*. The signals taken from the line 305*a* operate the second counter for accumulating the number of right, wrong or omitted answers.

It will be recalled that two counters are provided. The first counter is arranged to accumulate right answers, wrong answers, right answers minus wrong answers, right answers minus ½ wrong answers, right answers minus ⅓ wrong answers, or right answers minus ¼ wrong answers, depending upon the condition of the switch 65. The switch 65 is provided with three sections, having three electrically independent armatures and associated contacts. All three armatures, 65*a*, 65*b* and 65*c*, are ganged for conjoint movement to corresponding sets of contacts labeled R, W, R—W, R—½W, R—⅓W and R—¼W. The *a* section of the switch 65 controls the entry of right answers into counter 1 and for this reason the line 295 is connected to the armature 65*a*. When the switch 65 is in any position but the W position, the signal taken from the line 295 is connected through armature 65*a* of the switch to the #3 tap of the DS–3 unit 224 for controlling the entry of pulses representative of right answers through the unit 297 and through the CF–10 unit 303 to a line 308. The *b* and *c* sections of the switch 65 control the entry of pulses representative of wrong answers onto the line 308 as will be described.

The line 301, which is connected to the #3 and #4 taps of the CF–22 unit 299, is connected to the #8 tap of a CF–22 unit 309, a negative "and" gate. The second input to the unit 309 is taken from the #6 tap of an IN–22 unit 310. As will become clear, the #6 tap of the unit 310 is low if the answer was wrong and if scoring of this answer is not to be inhibited. As mentioned earlier, #4 or #5 punches in the program card inhibit the counting of answers into the first and second counters, respectively, if they occur during the scoring operation. Such punches are arranged to connect ground to two terminals 311 and 312, respectively, through the associated #4 or #5 star wheel contacts, and it will be clear, therefore, that when star wheel #4 operates, a line 313 drops in potential. This line is connected to the #4 tap of the DS–3 unit 289, a positive "and" gate, and the #7 tap of the unit 289 rises when the answer is wrong unless the line 313 is low, i.e., unless any response to the question is to be inhibited, since the line 283 is connected to the second input of the unit 289. Thus, the #7 tap of the unit 289 is high if there is a wrong answer and if there is no 4 punch in the corresponding column of the program card. The #7 tap of the unit 289 is connected through the IN–22 unit 310 to the #5 tap of the unit 309, and it will now be clear that this tap is low only if the answer is wrong and is to be scored.

When the pulse taken from the line 301 is applied to the #8 tap of the unit 309, this pulse passes therethrough to a line 320, provided that the #5 tap thereof is low, and each time the line 320 drops, therefore, it is an indication that a wrong answer was detected and that that answer is to be scored. The line 320 is connected through the n/c *h* contacts of a relay 321 to the #6 tap of each of four TR–4 units 322 through 325 and the pulse passing through the unit 309, therefore, is utilized to drive the ring comprising these triggers. The #7 tap of each of the triggers 322 through 325 is connected to the #8 or #5 tap, as the case may be, of a CF–5 unit 326 or 327. It should be noted that the units 322 through 325 are reset during each card feed cycle, i.e., while the answer card is being fed to the punch station, the unit 322 being reset in such a condition that the #7 and #8 taps thereof are high, the units 323 through 325 being reset such that the #7 and #8 taps thereof are low. This is true since the #5 tap of the trigger 322 and the #4 taps of the triggers 323 through 325 connect to a terminal 328 (Fig. 18b) which is connected through contacts associated with the card feed cam C–CF–5 to —100 volts as described.

When the switch 65 (Fig. 22a) is positioned to count right answers only, the ring comprising triggers 322 through 325 is not utilized, this ring being provided to determine the entry of pulses into the counter corresponding to wrong answers as is desired. When the switch 65 is in the W position, the line 295 is no longer connected to the #3 tap of the unit 224 and the line 283 affixed to the W and R—W terminals of the b section of switch 65 is connected through the armature 65b and through a line 330 to the #6 tap of the DS–3 unit 281, the #4 tap of the unit 281 being connected directly to the line 283. In either the W or R—W position, therefore, a line 332 connected to the #7 tap of the unit 281 rises if the answer is wrong. This line is connected through the "or" circuit 224 to the #9 tap of the "and" circuit 297. Thus, when the switch 65 is in the W position, pulses taken from the #3 tap of the unit 303 indicate wrong answers, and when the switch 65 is in the R—W position, pulses taken from the #3 tap of the unit 303 are indicative of both right and wrong answers, as the case may be.

When the switch 65 is in the R—½W position, the #4 tap of the CF–5 unit 326 is connected through the armature 65b and the line 330 to the #6 tap of the unit 331 as well as through the armature 65c and the n/c j contacts of a relay 420 to the #3 tap of the TR–4 unit 322. With the switch in this condition the ring is connected as a ring of two, the triggers 324 and 325 being unused. Since the trigger 323 is reset with the #7 tap thereof low, it will be clear that the first wrong answer to be scored raises the potential of the #7 tap, thereby causing the #6 tap of the unit 281 to go up at this time. The second wrong answer causes the #7 tap of the trigger 323 to drop, thereby lowering the potential of the #6 tap of the "and" gate 281. Thus, when the switch is in this position, only alternate pulses representative of wrong answers to be scored are counted. In a similar manner, only every third pulse is counted when the switch 65 is in the R—⅓W position. When the switch is in the R—¼W position, all triggers 322 through 325 are utilized, and in this condition the #6 tap of the unit 281 rises for every fourth wrong answer.

It will be recalled that pulses going to the second counter are taken from the line 305a, which line is connected through the n/c i contacts of the relay 80 to the #3 tap of an IN–CF–1 unit 335 (Fig. 22b) as well as through a voltage dividing network to the #6 tap of a DS–3 unit 336. Since the output of the unit 335 is taken from the #8 tap, it will be clear that the signal applied to the #3 tap is inverted. This signal is applied to the #7 tap of a GC–1 unit 337 which comprises the first stage of the second counter. The unit 337 is described in the appendix, and each negative pulse applied to the #7 tap thereof causes the glow to be advanced to the next following digit cathode. Also, when the glow is advanced from the "9" to the "0" digit cathode, a pulse is taken from the #3 tap thereof, which pulse is connected to the #5 tap of the unit 335 and is taken from the #7 tap of this unit to the #4 tap of the unit 336.

When the glow is transferred from one digit cathode to the next under control of pulses applied to the #7 tap of the unit 337, the #3 tap drops from approximately +210 volts to a level in the neighborhood of +40 volts; however, when the glow is being transferred from the "9" to the "0" cathode, the potential of the #3 tap drops from approximately +210 volts to +110 volts. These levels are utilized by the cathode follower portion of the unit 335 to control the level of the #7 tap thereof such that the pulses appearing on the #6 tap of the unit 336 pass therethrough only upon a 9 to 0 transfer. The unit 336 is a positive "and" gate and the level of the #4 tap drops to around —30 volts during the normal glow transfer, it being arranged to drop only to +10 volts during the 9 to 0 transfer. Thus, each tenth pulse applied to the #7 tap of the unit 337 causes a positive pulse to pass through the unit 336 to a line 338 connected to the #7 tap of the unit 336. This pulse is arranged to drive the second stage of the second counter in a similar manner, it being applied through an IN–CF–1 unit 339 to the #7 tap of a GC–1 unit 340 as well as to the #9 tap of the DS–3 unit 336. Carry pulses taken from the unit 340 drive a GC–1 unit 341, each carry being taken from the #3 and #8 taps of the unit 336 and through an IN–IN–1 unit 351 to the #7 tap of the unit 341. In this way the second counter accumulates the number of right answers, the number of wrong answers, or the number of omitted answers, depending upon the condition of the switch 66, and the number of such answers may be determined during the read-out operation as will be described hereinafter. It should be noted that these conditions exist during accumulation due to the provision of —100 volts bias on a terminal 335a which connects to the #6 taps of the units 335 and 339 since the terminal 335a connects through the n/c d points of a relay 399 to —100 volts. The terminal 335a also connects through the n/o d points of the relay 399 to ground and when the relay 399 picks, as it does when reading from counter 2 as will be explained, the bias on the units 335 and 339 is raised sufficiently to permit all pulses appearing on the #3 tap of the unit 335 to pass into each of the GC–1 units 337, 340 and 341.

The first counter comprising three GC–1 units 345 through 347 is operated by signals taken from the line 308 (Fig. 22a) according to the condition of the switch 65. The line 308 is connected through the n/c g contacts of the relay 80 to the #3 tap of an IN–CF–1 unit 348 (Fig. 22b) as well as through a voltage dividing network to the #4 tap of a DS–3 unit 350. Pulses taken from the line 308 operate the first counter in a manner substantially identical with that in which the second counter is operated with the exception that the first counter is provided with a complementing feature to permit subtraction as is desired in the case where wrong answers are to be subtracted from right answers, for example.

It will be recalled that the line 288 connected to the #7 tap of the SS–1 unit 285 (Fig. 22a) rises each time the trigger 280 reverses its condition. These pulses are connected to the #4 tap of the IN–IN–1 unit 351 (Fig. 22b) and are taken from the #8 tap of this unit to the #6 tap of each of the three GC–1 units 345 through 347. The unit 351 is provided to invert the signal developed by the single-shot 285 since the complementing feature of the tube is operated by negative-going pulses applied to the #6 tap thereof. Thus, each pulse taken from the line 308 either adds to or subtracts from the count accumulated in the units 345 through 347 and the condition of these units upon completion of the test scoring operation indicates a score which corresponds to the condition of the switch 65. The method of read-out of this score will be described later.

It should be noted that the #3 tap of the GC–1 unit 347 is connected through an IN–CF–1 and 352 to the #9 tap of a DS–3 unit 353. Thus, the #3 tap of the unit 353 rises each time a carry is indicated by the unit 347. This signal is utilized to control the condition of a trigger 354 which indicates the polarity of the information stored in the first counter. If only a single carry is generated by the unit 347, it should be clear that the number accumulated in the first counter is negative; however, if an even number of carries are generated, the counter balance is positive. For this reason the trigger 354 is reset in a condition which indicates that the number stored in the first counter is positive, at which time the #8 tap thereof is low, thereby maintaining a terminal 355 connected to the #3 tap of a CF–5 unit 356 low.

Thus, the first and all odd-numbered carries taken from the #3 and #8 taps of the unit 353 pass through an IN-6 unit 357 and through the n/c *d* contacts of the relay 71 to the #3 and #6 taps of the trigger 354 and cause this trigger to be turned on, thereby raising the potential of the terminal 355 to indicate a negative counter balance.

As mentioned previously, read-out is initiated by the provision of a 1 punch in the program card. Thus, in the present example a 1 punch is provided in column 38 of the program card, and since counter 2 only is to be read from, a 4 punch is provided in column 39 to suppress readout and reset of counter 1. When the contacts associated with the #1 star wheel are operated, a relay 360 (Fig. 17), the read-out relay, is energized since one side thereof is connected through the n/c *l* points of the relay 80 to a terminal 361, the terminal 361 being connected through the #1 star wheel contacts to ground (see Fig. 18*b*). The other side of the relay 360 (Fig. 17) is connected to the *h* contact of the *a* level of a stepping switch 362, the armature 362*a* of which is connected through the n/o *c* contacts of a relay 363 to a terminal 364. Terminal 364 connects through the P6 contact to the terminal 75 (Fig. 16), which terminal connects to —48 volts when the test scoring switch 60 (Fig. 18*b*) is in the "on" position, as described. Thus, —48 volts appears during P6 time on terminal 364 (Fig. 17) in the present example. The relay 363 (Fig. 18*b*) is energized during test scoring operations as long as an answer card is being processed, since one side thereof also connects to the terminal 75 and the other side connects to the terminal 365 which connects through the C-3BU card lever contacts to ground. Thus, when a 1 punch in the program card is sensed, the relay 360 (Fig. 17) picks.

The stepping switch 362 (Fig. 18*b*) controls read-out operation according to the program card and is normally advanced one contact position during each punch cycle following energization of the relay 360. One side of the switch 362 connects to a terminal 366 which connects through the C-P1 contacts to +V, and the other side connects through the n/o *d* contacts of relay 360 and through the n/c *b* contacts of a relay 367 or the n/o *b* contacts of a relay 368 to the terminal 365. Thus, the stepping switch 362 is energized by C-P1 pulses after relay 360 picks, when relay 367 is deenergized or relay 368 is energized, and this switch is arranged to escape to the next contact position upon termination of C-P1 pulses which energize it. It should be noted at this time that the relays 71 and 80 are energized during read-out, i.e., from the time when the switch 362 leaves its home position until it is returned to this position, since they connect between ground and through the off-home contacts 380 of the switch 362 to the —V terminal 75.

Referring to Fig. 18*b*, the escape magnet circuit connects through the n/c C-22-3 contacts to a terminal 370. When the switch 362 (Fig. 17) is in the home position, terminal 370 connects through the armature 362*b* and through the n/c *f* contacts of the relay 360 to a terminal 371 to complete the normal escape magnet circuit. Additionally, the *h* contact of the *b* section of the switch 362 connects through the n/o *f* contacts of a relay 372 to the terminal 371. Thus, as long as the switch 362 is in its home position and the relay 360 is deenergized or the relay 372 is energized, normal escapements occur, and when relay 360 picks, relay 372 being deenergized, the escape magnet circuit is opened. The relay 372 picks only when an operation referred to as "stacking" is to take place.

In order to utilize the maximum capacity of an answer card, the read-out information is stacked if a 1 punch is provided at the earliest time possible, i.e., if a 1 punch occurs in the same column that corresponds to the last row of answers being scored. Thus, if a 6 or 7 punch occurs in the same column of the program card as a 1 punch, the read-out information is compressed upon read-out. This results in punching the quality, sign and hundreds digit of the contents of the first counter in the same column of the answer card, thereby permitting read-out of both counters plus sign and quality to be made in six columns of the answer card. It should be noted, however, that stacking occurs only if results of both counters are to be read out and if the machine is set to response punch.

One side of the relay 372 is connected through the n/o *e* contacts of the relay 360 to the —48 volt terminal 75, the other side of this relay being connected through the n/c *a* contacts of relay 71, through the response punch switch 61 and through the n/o *f* contacts of the relay 73 to ground. The relay 73, it will be recalled, is picked by a 6 or a 7 punch and it will be clear that a 6 or a 7 punch in the same column as the 1 punch picks relay 372 as long as the response punch switch 61 is in the "on" position.

In the present example the relay 372 does not pick, and when relay 360 picks, the circuit between terminals 370 and 371 is opened, thereby preventing an escapement of the answer card. At this time column 37 of the answer card is at the punch station, the responses to questions 39 and 40 having been punched in column 36 prior to escapement to column 37. When the relay 80 picks, as it does during read-out, a terminal 376 is connected through the n/o *c* points of this relay to the terminal 371. Normally, the punch clutch is inoperative when the escape magnet circuit (Fig. 18*b*) is opened, since relay C-22 is not picked and the #4 contacts thereof are open, thereby opening the punch clutch circuit to ground. When terminal 371 is connected to terminal 376, however, as when relay 80 picks, the punch clutch is maintained operative as long as relays C-27, C-28 and 74 are energized, even though the C-22-4 points open, since the control grid of tube C-7 connects through the n/o contacts of relay 74 to terminal 376, through the n/o *c* contacts (Fig. 17) of relay 80 to terminal 371, through the n/c C-24-3 points (Fig. 18*b*), through the n/c C-25-4 points, through the n/o C-27-3 points to a terminal 377, and through the armature 60*b* (Fig. 17) of the test scoring switch 60 to terminal 365. Thus, during read-out the punch clutch is operative as long as relays C-27 and 74 are picked. As will become clear, these relays do not drop out until the relay 367 picks, as will be described.

At the end of the punch cycle associated with the escapement of the program card to column 38, the various armatures of the switch 362 escape to the corresponding #1 contacts. At this time a terminal 381, connected to the #1 contact of the *e* section of the switch 362, is connected through the armature 362*e* to the terminal 365. The terminal 381 is additionally connected to one side of the relay 83 (Fig. 16). Thus, the relay 83 is picked by a P6 pulse after the switch 362 escapes to the #1 position. When this occurs, the *a* and *b* contacts of relay 83 are transferred, thereby connecting the quality indication terminal 265*a* (Fig. 20*a*) therethrough to terminals 385 and 386 (Fig. 16), which terminals connect to the #3 and #7 taps, respectively, of the THY-A unit 147 (Fig. 20*b*). It will be recalled that the terminal 265*a* rises at EOQ-$T_1$ time if mark quality is below the desired standard. Thus, when switch 362 escapes to position #1, the #12 interposer magnet is picked if the quality of any mark corresponding to answers 1 through 40 is of poor quality. Under these conditions a 12 punch is made in column 37 of the answer card during the corresponding punch cycle.

At the end of the punch cycle associated with the quality punch the switch 362 (Fig. 17) escapes to the #2 position. Since relay 372 is not energized, as explained above, the terminal 370 is again connected to the terminal 371 through the armature 362*b*, through the #2 contact of the *b* section of the switch 362 and through the n/c *f* contacts of relay 372, thereby reestablishing the escape magnet circuit to cause the program card to escape to column 39 and to cause the answer card to escape to column 38. Only one escapement is made, however, since upon escapement the switch 362 escapes to the #3 position, thereby reopening the circuit between terminals 370 and 371.

When the program card escapes to column 39, the contacts associated with the #4 star wheel close (Fig. 16) thereby grounding a terminal 387. The terminal 387 connects through the n/o *j* points (Fig. 17) of the relay 80 to one side of a relay 388, the other side of this relay being connected through the n/c *d* contacts of the relay 372 to the #3 contact of the *a* section of the switch 362, through the armature **362*a*** and through the n/o *c* points of the relay 363 to the terminal 364. Thus, when the 4 punch in column 39 of the program card is sensed, the following P6 pulse picks relay 388. This relay is held through its own *e* and *h* contacts until the switch 362 returns to the home position and, as will become clear, it is this relay that controls the suppression of read-out and reset of counter 1.

When switch 362 is in the #3 position, the terminal 365 is connected through the armature **362*e* of switch 362** to the #3 contact associated therewith, this contact being connected through the parallelly arranged n/c *g* contacts of relay 388 or the n/o *b* contacts of relay 390 to a terminal 389. Terminal 389 connects to one side of the relay 84 (Fig. 16) and when the switch 362 (Fig. 17) is in the #3 position, and either relay 388 is deenergized or relay 390 is energized, the relay 84 (Fig. 16) is picked. This relay controls the entry of the sign of the data in counter 1 into the interposer magnet #11 since, when picked, the terminal 355 is connected through the *a* and *b* points thereof to terminals 392 and 393, respectively, which terminals connect to the #3 and #7 taps, respectively, of the THY–A unit 146 (Fig. 20*b*). The terminal 355 (Fig. 16) is high, as explained earlier, when the sign of counter 1 is negative, thereby energizing the #11 interposer magnet if counter 1 is negative. In the present example, however, the #11 interposer magnet is not picked regardless of the sign of counter 1 since the circuit between terminal 389 (Fig. 17) and the #3 contact of the *e* section of the switch 362 is open, thereby preventing energization of the relay 84. Thus, when appropriate, the sign of the answer is punched in the answer card while the stepping switch is in position #3.

When switch 362 escapes to position #4, the relay 73 (Fig. 16) is picked by a P7 pulse and is held by a P6 pulse, since the terminal 72 (Fig. 17) is then connected through the armature **362*f* of switch 362 to a terminal 395 which connects through the P7 contacts (Fig. 16) to ground. (It should be noted that the hold coil of relay 73** is not energized, since the *d* contacts of the relay 80 are opened at this time.) Additionally, while the switch 362 is in the #4 position, the escape magnet circuit is open in the present example, since relay 388 is energized, thereby opening the *k* contacts thereof.

The #4, #5 and #6 positions of the switch 362 (Fig. 17) are associated with read-out from counter 1, and when reading from counter 1 a relay 396 is energized during each P6 time while the stepping switch is in one of these positions. This is true since the #4, #5 and #6 contacts of the *a* section of the stepping switch 362 are connected in common to one side of the relay 396, the other side of this relay being connected to the n/c *e* contacts of a relay 397, through the n/c *e* contacts of a relay 398 and through the n/c *e* contacts of the relay 388 to ground. Thus, in the present example the relay 396 is not picked since the relay 388 is energized, thereby opening the *e* contacts thereof and disconnecting one side of the relay 396 from ground.

The conditions outlined above remain substantially the same until the stepping switch is advanced to place the armatures thereof in contact with the corresponding #7 contacts, at which time a relay 399 is energized. This relay is connected between the #7, #8 and #9 contacts of the *a* section of the switch 362 and through the n/c *g* contacts of a relay 400 to ground. As will become clear, the relay 400 is picked by a 5 punch and is thus picked only when it is desired to suppress read-out from counter 2. Thus, unless read-out from counter 2 is to be suppressed, the relay 399 is picked when the stepping switch is advanced to the #7 position and remains picked during each P6 time as long as the stepping switch is in the #7, #8 or #9 position.

The #7 contact of the *b* section of the stepping switch connects through the n/c *j* contacts of the relay 400 and through the n/c *j* contacts of ther elay 388 to the terminal 371. Thus, when the stepping switch is in the #7 position, it will be clear that the escape magnet circuit between the terminals 370 and 371 remains open in the present example since the relay 388 is energized at this time, thereby preventing an escapement. Of further note, the #7, #8 and #9 contacts of the *f* section of the stepping switch 362 are connected through the n/c *d* contacts of the relay 390 to the terminal 72. Thus, the relay 73 is energized during P6 time as long as the stepping switch is in the #7, #8 or #9 position since the relay 390 is not energized. As will become clear, the relay 390 is picked only during a score converting operation. Thus, since relays 83 and 84 (Fig. 16) are not picked and since relay 73 is picked, terminal 82 (Fig. 18*a*) is connected through the n/o *c* contacts of the relay 73, through the n/c *e* contacts of the relay 83, through the n/c *e* contacts of the relay 84, through the n/o C–27–2 contacts and through the contacts associated with the cam C–P5 to terminal 365, thereby initiating the mark converting operation as described previously, since when the terminal 82 is connected to ground the #8 tap of the DS–3 unit 91 (Fig. 20*a*) is grounded, thereby initiating the operation of the multivibrator comprising the PS–A unit 92 and the CI–A unit 93.

Read-out is accomplished by entering 10 pulses into the appropriate counter. These pulses are derived by the above mentioned multivibrator unit. The #6 tap of the unit 92 is connected to the #5 tap of an IN–5 unit 403, a negative "and" gate, the #3 tap of which connects to the #7 tap of an SS unit 404. The SS unit 404 is operated to raise the #7 tap thereof and thus close the gate 403 when the #3 tap drops. This tap connects to the #5 tap of the DS–A unit 132 (Fig. 20*b*) and this latter tap drops when the trigger 105 is turned off. Thus, on the tenth pulse generated by the multivibrator the SS unit 404 (Fig. 20*a*) is operated. This permits the passage of only 10 pulses through the gate 403 to a terminal 405. The terminal 405 connects through a CF–5 unit 406 (Fig. 22*b*) and through the n/o *c* contacts of relay 399 to the #3 tap of the unit 335 (the input to the second counter), as well as through the n/o *c* contacts of the relay 396 and through the n/c *c* contacts of the relay 398 to the #3 tap of the unit 348 (the input to the first counter) and, depending upon the condition of the relays 399, 396 and 398, pulses taken from terminal 405 are entered into the first and/or second counter.

Read-out signals are taken from the #5 taps of the GC–1 units, the "0" digit cathodes, and it will be clear that the signals taken from the #5 taps are the tens complement of the data stored therein. The ring comprising triggers 97 through 106 (Figs. 20*a* and 20*b*) is driven sequentially to operate in the order for energizing the interposer magnets in the order 9, 8, 7, etc. through 0. Thus, when the signal is taken from the #5 tap of one of the GC–1 units (Fig. 22*b*), i.e., when the "0" digit cathode rises, the ring is in condition to pick the interposer magnet corresponding to the number stored in that unit. Assume, for example, that the glow is on the "7" digit cathode of one of the GC–1 units upon completion of accumulation. During read-out it takes three pulses to advance the glow to the "0" digit cathode, which pulses drive the ring in a manner to turn the trigger 99 (Fig. 20*a*) on, thereby raising the potential of the #3 tap of the DS–A unit 126. Thus, the read-out signal is taken from the #5 tap of the GC–1 unit while the trigger 99 is on. This signal is coupled to the terminal 227 for controlling the entry of the number into the #7 interposer magnet since the #5 taps of the various GC–1 units connect to terminals 408 through 413, as shown in the drawing, which connect to the #4, #5, #6, #7, #8 and #9 contacts, respectively, of the *c* section of the switch 362 (Fig. 17) and since the armature 362*c* connects through the n/o *f* contacts of relay 80 to terminal 227.

The terminal 408 and the #4 contact of the *c* section of the switch 362 correspond to the hundreds digit of the first counter, terminals 409 and 410 corresponding to the tens and units digits, respectively, of the first counter, and the terminals 411, 412 and 413 correspond to the hundreds, tens and units digits, respectively, of the second counter. Thus, read-out from each stage of each counter is controlled by the switch 362. (It should be noted that during read-out terminal 227 is disconnected from the #7 tap of the DS–3 unit 224 (Fig. 22*a*) to prevent accumulation into the counter, since the *f* contacts of the relay 380 are opened throughout read-out.) Thus, the contents of the second counter are entered into the interposer magnets as the switch 362 is advanced through the #7, #8 and #9 positions.

When the stepping switch (Fig. 17) is in the #7 position, the escape magnet circuit is reopened, as mentioned previously, and since the answer card is still positioned with column 38 at the punch station, the hundreds digit of the contents of counter 2 is punched in column 38. When the switch 362 escapes to the #8 position, the circuit between terminals 370 and 371 is again completed, thereby permitting escapement for punching the tens digit of counter 2 in column 39 of the answer card, since the relay 400 is not energized at this time. The #8 and #9 contacts of the *b* level of the switch 362 are common, and it will be clear, therefore, that the units digit of counter 2 is punched in column 40. Further escapements are prevented until the switch 362 is in its home position, since the #10 contact of the *b* section thereof is floating. When the switch 362 is in the #10 position, the trip coil of the relay 360 is energized, thereby returning the contacts thereof to normal. Also, the terminal 365 is connected through the armature 362*e* of switch 362 to a terminal S which connects to one side of the coil of switch 362 (Fig. 18*b*), thereby energizing it and causing it to escape to the home position, at which time the relay 388 (Fig. 17) drops out.

The counters (Fig. 22*b*) are reset by opening the +150 volt circuit to the #8 taps of the corresponding GC–1 units and by grounding the corresponding #5 taps. This causes the glow to be transferred to the "0" digit cathodes. For this purpose the terminals 408, 409 and 410, connected to the #5 taps of the GC–1 units associated with the first counter, are connected through the parallelly arranged n/o *j*, *k* and *l* contacts of a relay 415 and through the n/c *c* contacts of the relay 388 to ground. Similarly, the terminals 411, 412 and 413, connected to the #5 taps of the GC–1 units associated with counter 2, are connected through the parallelly arranged n/o *g*, *h* and *i* contacts, respectively, of relay 415 and through the n/c *e* contacts of the relay 400 to ground. The #8 taps of the GC–1 units associated with counter 1 are normally returned to +150 volts through the n/c *f* contacts of the relay 415, which contacts are in parallel with the n/o *b* contacts of the relay 388, and the #8 taps of the GC–1 units associated with counter 2 are normally returned to +150 volts through the n/c *e* contacts of the relay 415, these contacts being arranged in parallel with the n/o *d* contacts of the relay 400.

Reset of counters 1 and 2 is suppressed, it will be recalled, by providing a 4 or a 5 punch, respectively, in the program card. Additionally, reset is called for by the provision of a 1 punch in the column following the 1 punch which calls for read-out. During read-out a 4 punch picks relay 388 (Fig. 17), as explained, to suppress read-out and reset of counter 1. Similarly, a 5 punch picks relay 400 to suppress read-out and reset of counter 2. The provision of a second 1 punch picks a relay 416 which causes relay 415 to be picked when the stepping switch 362 reaches the #10 position. This is true since one side of the relay 415 connects through the n/o *l* points of relay 80 to the terminal 361 and since the relay 415 connects through the n/o *d* points of the relay 416 to the #10 contact of the *a* section of switch 362. Thus, when relay 415 picks, the #8 taps of the GC–1 units (Fig. 22*b*) associated with both counters are disconnected from ground unless the corresponding relay 388 or 400 (Fig. 17) is energized for suppressing reset of either counter. Additionally, picking of relay 415 grounds the #5 taps of all GC–1 units unless corresponding relay 388 or 400 is picked. In this way, the counters are reset when programmed to return the glow to the "0" digit cathode. If not reset on read-out, the 10 pulses supplied during read-out return the glow to the digit cathodes where they existed prior to read-out, and upon resumption of the scoring operation further accumulation may be made into the counters.

After the units digit is punched in column 40 of the answer card, as explained, and after the switch 362 is returned to its home position, the program and answer cards escape in the normal autodup fashion until the 6 punch in column 44 of the program card is sensed. At this time, the lower half of the card is scanned, as previously described, and the results are punched into column 44 of the answer card as well as entered into the counters. The remaining answers are scored and the results punched in a similar fashion until the 1 and 2 punches in column 74 of the program card are sensed by the program star wheels.

When the 1 punch is sensed the relay 360 (Fig. 17) picks, as described earlier, thereby initiating the operation of the switch 362. Operation is the same as that previously described until the switch 362 reaches the #3 position, at which time the quality indication has been punched in column 73, if appropriate, and the answer card has escaped to column 74. When the switch 362 reaches the #3 position, the escape magnet circuit is opened. Additionally, the sign relay 84 (Fig. 16) is picked, if appropriate, since the terminal 365 (Fig. 17) connects through the armature 362*e*, through the #3 contact associated with this armature and through the n/c *g* contacts of the relay 388 to the terminal 389, terminal being connected to one side of the relay 84 (Fig. 16). (Relay 388 is not picked since no 4 punch *is* provided in the program card.) When this occurs, terminal 355 is connected to terminals 392 and 393 which connect to the #3 and #7 taps of the THY–A unit 146 associated with the #11 interposer magnet. Terminal 355 and thus terminals 392 and 393 are high when the result stored in counter 1 is negative, as explained earlier, and if negative, an 11 punch is made in column 74. When the program card escaped to column 75, as it did when the switch 362 was in the #2 position, the contacts associated with the #2 star wheel made. (It should be noted that the #2 and #3 star wheels read one column later than the other star wheels. These contacts remain closed until the next escapement. If the result stored in counter 1 is positive, the relay 390 and a relay 420 are picked when the switch 362 is in the #3 position since a terminal 421 is connected through the #2 star wheel contacts to ground as well as through the armature 64*a* of the score conversion switch 64, through the relays 390 and 420, through the n/c *a* points of the relay 400, through the n/c *d* points of the relay 422, through the n/c *d* points of the relay 372, through the #3 contact and armature 362*a* of the switch 362 and through the n/o *c* contacts of the relay 363 to the terminal 364. The relay 422 is picked if counter 1 is negative and prevents the score conversion operation, in this case, by preventing the picking of the score conversion relays 390 and 420.

It will be recalled that the terminal 355 (Fig. 22*b*) is high when counter 1 is negative. This terminal connects to the #3 and #7 taps of an RD–1 unit 423 (Fig. 17), the #4 tap of which connects through the winding of the relay 422 to +150 volts. The #9 tap of the RD–1 unit 423 connects to a terminal 424 which connects through the n/o *f* contacts of the relay 84 (Fig. 18*a*) to a terminal 425, which terminal connects through the contacts of the C–P5 cam to terminal 365. As explained earlier, terminal 365 connects to ground during the test scoring operation. Thus, if counter 1 is negative, relay 422 (Fig. 17) picks, thereby preventing the score conversion operation.

One side of the relay 416 connects through the n/o *f* contacts of the relay 420 to a line 424*a*. Similarly, one side of the relay 400 connects through the n/o *k* contacts of the relay 80 and through the n/o *e* contacts of the relay 420 to the line 424*a*. The other side of each of these relays is common and connects through the n/c *d* contacts of the relay 372 to the #3 terminal of the *a* level of the stepping switch 362. The line 424*a* connects to the #1 and #3 contacts of the *f* level of the stepping switch 362, the armature of which is connected to the terminal 395 which is grounded during P7 time. Thus, the relays 416 and 400 pick when the relays 420 and 390 pick.

The relays 416 and 400 are maintained energized through their own contacts, one side of the relay 416 being connected through the n/o *c* contacts thereof to ground and the other side being connected through the n/o *b* contacts and through the off-home contacts of the switch 362 to —48 volts. Similarly, one side of the relay 400 is connected through the n/o *k* contacts of the relay 80 and through its own n/o *g* contacts to ground, the other side thereof being connected through its own n/o *h* contacts and through the off-home contacts 380 of the stepping switch 362 to —48 volts. It should be noted that when the relay 400 picks, its n/c *a* contacts are opened; however, the n/o *a* contacts of the relay 390 are transferred at this time, and this completes a circuit for the energization of the relays 390 and 420. Thus, if counter 1 is positive, the relays 390 and 420 pick and hold until the stepping switch reaches the home position.

When the stepping switch 352 escapes to the #4 position, the answer card is positioned with column 74 at the punch station, the sign having been punched in this column previously, if appropriate. At this time, the escape magnet circuit between the terminals 370 and 371 is completed, since the relay 388 was not picked and since the relay 372 is not picked, there being no stacking operation at this time. Additionally, the relay 396 is picked, since a circuit is completed from the terminal 364 through the n/o *c* contacts of the relay 363, through the armature 362*a* and #4 contact of the *a* section of the switch 362, through the relay 396, through the n/c *e* points of the relay 397, through the n/c *e* points of the relay 398 and through the n/c *e* points of the relay 388 to ground. This relay, it will be recalled, controls read-out from counter 1. The relay 73 (Fig. 16) is also picked, as described earlier, since the terminal 72, connected to one side thereof, connects through the armature 362*f* (Fig. 17) of the switch 362 to the terminal 395, when the switch 362 is in the #4 position. When the relay 73 (Fig. 16) picks, it will be recalled, the pulses are entered into the counters for controlling read-out, and since the armature 362*c* (Fig. 17) is in engagement with the #4 contact of the *c* level of the stepping switch 362, the hundreds digit is read from counter 1 and the signal representative thereof is entered into the interposer magnets as described earlier. During the ensuing escapement the hundreds digit of the contents of counter 1 is punched into column 75 of the answer card. In a similar manner, the tens digit and units digit of the contents of counter 1 are punched into column 76 and 77 of the answer card since the escapement magnet circuit is completed when the armature 362*b* is in the #5 and #6 positions.

When the switch 362 escapes to the #6 position, it will be noted that the relay 367 picks since a circuit is completed from the terminal 365 through the armature 362*e*, through the #6 contact of the *e* level of the switch 362 and through the coil of the relay 367 to one side of the n/o *c* contacts of the relay 420, the other side of these contacts being connected to the —48 volt terminal 75. The relay 420 is picked at this time since a score conversion operation is to take place as described. When relay 367 picks, the circuit between the terminal 365 and one side of the stepping switch coil 362 (Fig. 18*b*) is opened, since the *b* contacts of the relay 367 are opened. Thus, further escapements of the stepping switch are prevented until the relay 368 picks, at which time the *b* contacts thereof close and complete the circuit between the terminal 365 and through the *d* contacts of the relay 360 to one side of the stepping switch 362.

Additionally, the holding circuit for the relays C–27, C–28 and 74 is opened since a terminal 430, connected through the autoskip autoup switch, through the points C–24–4, through the points C–25–6 to the control grid of the tube C–5, is disconnected from the terminal 365, the terminal 430 being connected through the test scoring switch armature 60*c* (Fig. 17) and through the n/c *a* contacts of the relay 367 to the terminal 365. This circuit remains open until the relay 368 picks since the "on" contact of the *c* section of the test scoring switch 60 also connects through the n/o *a* contacts of the relay 368 to the terminal 365. Thus, when the relay 367 picks, the stepping switch is deenergized and the punch clutch circuit is opened, thereby preventing further punch cycles after the completion of the punch cycle already initiated. This permits the units digit of the contents of counter 1 to be punched in column 77 of the answer card. It is at this time that the score conversion operation is initiated.

When the relay 74 (Fig. 18*b*) drops out, the relay 398 picks since this relay is connected between the —48 volt terminal 75 and the terminal 365 through the n/c *b* contacts of the relay 74 and through the n/o *d* contacts of the relay 367. Thus, one punch clutch cycle after the relay 367 picks, the relay 398 picks, thereby transferring its various contacts. The terminal 77, which is at —100 volts during the test scoring operation, as described earlier, is connected through the card feed cam C–CF–5 to a terminal 328. These contacts are arranged to open during each card feed cycle for resetting the various triggers associated with this terminal, but they are closed during the scoring operation. The terminal 328 connects through a matrix of contacts (Fig. 22*a*) to a terminal 432 (Fig. 22*b*), which terminal is connected to the #4 tap of a TR–1 unit 433. In the present example the circuit through the various contacts between the terminals 328 and 432 is opened when the relay 420 picks and is maintained open until the relay 398 picks. When relay 398 picks, terminal 328 connects through the n/o *b* contacts thereof and through the n/c *d* contacts of the relay 415 to the terminal 432, the relay 415 being deenergized during the test scoring operation since it is not energized until the stepping switch 362 reaches the #10 position, as described.

When the relay 398 picks, the #4 tap of the TR–1 unit 433 is again connected to —100 volts, thereby permitting future operation of this trigger by the application of negative-going pulses to the #3 tap thereof. Thus, the trigger 433 is reset in an "on" condition, with the #8 tap thereof high when relay 398 picks. This tap is connected through the CF–5 unit 406, through the n/o *d* contacts of the relay 398 and through the n/o *b* contacts of the relay 360 to the control grid of a tube 435. An escape magnet 436 is connected between the plate of the tube 435 and +V. As explained earlier, the relay 360 is picked during the score conversion operation, and when the relay 398 picks, the #3 tap of the CF–5 unit 406 connects directly to the control grid of the tube 435, thereby energizing the escape magnet 436.

Score conversion is accomplished on a table look-up basis. Four drums 437 through 440 (Fig. 16) are provided with cards punched according to the desired conversion scheme, these drums having star wheels associated therewith and being of a type similar to the program drums utilized in the Type 26 machine. Twelve star wheels are associated with each drum and the drums are driven by the escape magnet 436 (Fig. 22*b*) to escape one column at a time while the control grid of the tube 435 is high, i.e., while relays 360 and 398 are picked. A stepping switch 441 is also driven by the escape magnet 436 to escape one contact position during each escapement. A contact 442, the home contact of switch 441, connects to a tap 443 on a voltage-dividing network, a tap 444 of which connects through the n/c *b* contacts of the relay 360 to the control grid of tube 435. The armature of the switch 441 connects to ground and, assuming the relay 360 is deenergized, i.e., that the *b* contacts thereof are in the condition shown in the drawing, the escape magnet is energized unless the armature of switch 441 is in the home position, since the divider network is arranged to maintain the grid of tube 435 sufficiently high to permit conduction at these times. When the armature of switch 441 is in the home position, however, tap 443 is grounded, thereby cutting off tube 435. It is in this way that the switch 441 and the drums 437 through 440 are returned to their home position when relay 360 drops out, i.e., when read-out is completed.

Switch 441 has 80 contacts, only a few being shown in the drawing, in addition to the home contact 442. Alternate contacts are connected together for grounding one of two lines 445 or 446 depending upon the position of the armature. Assuming that the switch 441 is in the home position and that the drums 437 through 440 are positioned such that the various star wheels thereof are at column 0 of the score conversion cards associated therewith, it will be clear that when the relay 398 picks, as described above, relay 360 having been picked previously, the escape magnet 436 is energized to cause the armature of switch 441 to escape to successive contacts, thereby alternately grounding lines 445 and 446, and to cause the drums 437 through 440 to escape in unison therewith until the #8 tap of the trigger 433 drops. At this time, tube 435 is cut off to prevent further escapement.

The lines 445 and 446 connect to the #3 taps of corresponding SS–1 units 447 and 448, respectively. The #7 tap of the unit 447 connects of the #5 tap of a CF–5 unit 449, the #7 tap of the unit 448 being connected to the #8 tap of the unit 449. The #3 and #4 taps of the unit 449 connect to the #3 tap of a DS–3 unit 450, the #5 and #9 taps of which connect to the #4 tap thereof. The #8 tap of the unit 450 connects to the #4 tap of a CF–5 unit 452. The #4 tap of the unit 452 is low when the TR–4 unit 322 is such that the #7 and #8 taps thereof are high, since the #7 tap of the unit 322 is connected through the IN–22 unit 291 to the #5 tap of the CF–5 unit 452. The #6 tap of the unit 450 is connected to the #3 tap of the CF–5 unit 406 (Fig. 22*b*), which tap, it will be recalled, is high upon the initiation of the score conversion operation.

The signal taken from the #7 tap of the unit 450 (Fig. 22*a*) is utilized to control the operation of a multivibrator comprising a CI–A unit 454 and a PS–A unit 455, which units operate to generate pulses in a manner similar to that described in connection with the units 92 and 93 (Fig. 20*a*) utilized in the mark converting circuits. The output of the multivibrator comprising the units 454 and 455 (Fig. 22*a*) is connected through an IN–22 unit 456 to the #3 tap of a CI–A unit 457 (Fig. 22*b*), the #6 tap of which connects through the n/o *c* contacts of the relay 398 to the input to the first counter. The #6 tap of the CI–A unit 457 also connects through the n/o *f* contacts of the relay 367 to a terminal 454*a* which connects to the #6 tap of each of the TR–4 units 322 through 325 (Fig. 22*a*).

Each time one of the lines 445 or 446 is grounded, as it is when the switch 441 is advanced through the various contact positions thereof, a short positive pulse is generated by the corresponding SS–1 unit 447 or 448, which pulse is taken from the #3 or #4 tap of the unit 449 and the #5 and #9 taps of the unit 450 to the #4 tap of the unit 450. If the #6 tap of the unit 450 is high, i.e., if the #8 tap of the TR–1 unit 433 (Fig. 22*b*) is high, the #7 tap of the unit (Fig. 22*a*) is high, thereby initiating the operation of the multivibrator unit comprising units 454 and 455. The pulses taken from the output of the multivibrator unit go to counter 1, as mentioned above, and additionally to the #6 tap of each of the aforementioned triggers 322 through 325 for driving this ring in the conventional manner. The first pulse operates the trigger 322 to lower the potential of the #7 tap thereof and thus to raise the potential of the #8 tap of the DS–3 unit 450. This tap remains high until the trigger 322 is again in a condition such that the #7 tap thereof is high, i.e., until four pulses have been generated by the multivibrator unit. Since that portion of the unit 450 associated with the #3 and #8 taps thereof is an "or" gate, when the potential of the #8 tap is high, the potential of the #4 tap of the unit 450 is maintained high, thereby permitting the multivibrator to continue to operate after termination of the pulse generated by either the SS–1 unit 448 or the SS–1 unit 447. Thus, each time the switch 441 (Fig. 22*b*) escapes to a new contact a single shot pulse is applied to the #3 tap of the unit 450 (Fig. 22*a*) and this results in the generation of four pulses entered into the first counter.

The output of the first counter, i.e., the #7 tap of the IN–6 unit 357 (Fig. 22*b*), is connected through the n/o *c* contacts of the relay 367 to the #3 tap of the TR–1 unit 433 and when the first counter overflows, the negative-going pulse taken from the #7 tap of the unit 357 is coupled through the *c* points of the relay 367 to the #3 tap of the TR–1 unit 433 for turning this trigger off, thereby lowering the potential of the #8 tap thereof. When the #8 tap of the unit 433 drops, the #6 tap of the unit 450 (Fig. 22*a*) drops, thereby turning off the multivibrator unit comprising the units 454 and 455 to prevent additional pulses from being entered into the first counter. It should be noted that when the relay 398 picks, the #4 tap of the complementing unit 284 is coupled to ground. This pulse fires the SS–1 unit 285 to cause a complementing operation of counter 1. Counter 1 is therefore complemented just prior to the entry of the read-out pulses therein. Thus, when a number of pulses equal to the number stored in counter 1 have been entered therein, the multivibrator comprising units 454 and 455 is turned off and the ring comprising triggers 322 through 325 is shut down.

It will be recalled that each time the switch 441 (Fig. 22*b*) escapes to the next successive contact position, four pulses are entered into counter 1 and that when there is a carry from counter 1, a number of pulses will have been entered therein corresponding to the number stored in counter 1. The #3 tap of the unit 326 (Fig. 22*a*) is connected to the #3 and #7 taps of an RD–1 unit 460 (Fig. 22*b*). Similarly, the #4 tap of the unit 326 (Fig. 22*a*) is connected to the #3 and #7 taps of an RD–1 unit 461 (Fig. 22*b*); the #3 tap of the unit 327 (Fig. 22*a*) is connected to the #3 and #7 taps of an RD–1 unit 462 (Fig. 22*b*); and the #4 tap of the unit 327 (Fig. 22*a*) is connected to the #3 and #7 taps of an RD–1 unit 463 (Fig. 22*b*). The #9 taps of the RD–1 units 460 through 463 connect in common through the n/o *c* contacts of the relay 368 to ground.

The relay 368 is picked when the TR–1 unit 433 is turned off, i.e., when there is a carry from counter 1. This is true since the #7 tap of the unit 433 connects to the #5 tap of an RD–1 unit 464, the #4 tap of the unit 464 being connected through the relay 368 to +150 volts. The #9 tap of the unit 464 connects through the n/o *b* contacts of the relay 420 and through the n/c *b* contacts of the relay 415 to ground. Thus, on the score conversion operation the relay 368 picks when the TR–1 unit 433 is turned off. This results in connecting the #9 taps of the RD–1 units 460 through 463 to ground. The #4 taps of the RD–1 units 460 through 463 connect to one side of a corresponding relay 465 through 468, the other sides of these relays being connected to +150 volts. It should now be clear that one of the relays 465 through 468 is picked when relay 368 is picked according to the condition of the ring comprising the triggers 322 through 325. Thus, assuming that the ring is in a condition such that the #7 tap of the trigger 323 is high, the #3 and #7 taps of the RD–1 unit 463 are high, thereby causing the relay 468 to be picked.

The relays 465 through 468 are associated with the corresponding score conversion drums 437 through 440 (Fig. 16) respectively, and when one of these relays is picked, the corresponding score conversion drum is placed in the circuit since one side of the star wheel contacts associated therewith is connected through the various points of this relay to one of 12 lines 470 through 481. The lines 470 through 473 connect to one side of the n/o *b*, *c*, *d* and *e* contacts, respectively, of a realy 482; the lines 474 through 477 connect to one side of the n/o *b*, *c*, *d* and *e* contacts, respectively, of a relay 483; and the lines 478 through 481 connect to one side of the n/o *b*, *c*, *d* and *e* contacts, respectively, of a relay 484. One side of each of the relays 482 through 484 is connected to the #9, #8 or #7 contact, respectively, of the *e* level of the stepping switch 362 (Fig. 17), the other sides of these relays being connected in common through the n/o *c* contacts of the relay 420 to −48 volts. Thus, it will be clear that during the score conversion operation the relay 367 is picked when the switch 362 is in the #6 position, the relay 484 is picked when the switch 362 is in the #7 position, the relay 483 is picked when the switch is in the #8 position, and the relay 482 is picked when the switch 362 is in the #9 position. The relays 482, 483 and 484 control read-out of the hundreds digit, the tens digit and the units digit, respectively, of the converted score, as will become clear.

When the stepping switch 362 is in the #7 position, the relay 484 is energized, thereby connecting the lines 478 through 481 (Fig. 16) to one side of each of four corresponding relays 485 through 488, respectively, which relays are decoding relays. The other side of each of these relays is connected to the terminal 364 which, it will be recalled, connects through the P6 cam contact and through the n/o *b* contact of the relay 76 to −48 volts. Thus, the relays 485 through 488 are picked by appropriate P6 pulses.

The converted score is stored on the drums 437 through 440 in a four-bit, binary coded decimal form and the relays 485 through 488 are utilized for decoding this data to its decimal equivalent for punching and/or printing the converted score on the answer card. For this purpose, the terminal 425 (Fig. 18*a*), which connects through the C–P5 cam to terminal 365, is connected through the parallelly arranged n/o *a* contacts of the relays 482 through 484 to one side of a matrix of points of the relays 485 through 488. The other side of this matrix connects to the corresponding interposer magnets. Thus, the interposer magnets corresponding to the state of energization of the relays 485 through 488 are picked by P5 pulses when the appropriate relay 482 through 484 is energized for entering the converted and decoded score into the appropriate interposer magnet at the proper time. It should be noted that each escapement of the drums 437 through 440 corresponds to four different converted scores and the appropriate score is selected under control of the ring comprising the triggers 322 through 325 (Fig. 22*a*) since these triggers control the energization of the relays 465 through 468 (Fig. 22*b*) as described. Thus, the converted score stored in the cards mounted on the drums 437 through 440 corresponding to the number stored in counter 1 is entered into the interposer magnets for punching in columns 78, 79 and 80 of the answer card.

When the stepping switch 362 (Fig. 17) escapes to the #10 position, the latch trip coil of the relay 360 is energized, thereby releasing the various contacts of this relay. Additionally, the relay 415 is energized since the *d* contacts of the relay 416 are transferred. This results in resetting both counters 1 and 2 in the manner described previously. Also, it should be noted that the stepping switch is advanced to its home position since the #10 contact of the *e* section of the switch 362 connects through the stepping switch coil to the terminal 366.

When counter 1 is negative, an 11 punch is entered in the card when the stepping switch is in the #3 position. To read out the contents of counter 1 if it is negative, it is necessary to complement this counter and to add 1 to the counter to change the results from the nines complement to the tens complement form. These operations occur when relay 422 picks, i.e., when the stepping switch is in the #3 position. The #4 tap of the DS–3 unit 284 (Fig. 22*a*) connects through the n/o *a* contacts of the relay 422, as well as through the n/o *a* contacts of the relay 398, to ground and when the relay 422 picks, the #4 tap of the unit 284 drops, thereby firing the SS–1 unit 285 and complementing counter 1. Additionally, the #3 tap of the IN–22 unit 456 connects through the n/c *c* points of the relay 422 and through a resistor 495 to +150 volts. This tap also connects through the n/o *c* points of the relay 422 and through a resistor 496 to −100 volts. When the relay 422 picks, the #3 tap of the unit 456 drops in potential at a rate depending upon the time constant of the resistor 496 and a condenser 491 connected between the #3 tap of the unit 456 to ground. When the #3 tap of the unit 456 drops, the #6 tap thereof rises, thereby raising the potential of the input to counter 1, after a delay, since the *b* contacts of the relay 422 are transferred at this time. This causes the entry of the additional 1 into counter 1. It should be noted that the delay provided by the aforementioned R-C circuit is sufficient to permit completion of the complementing operation prior to the entry of the 1 into the counter. Thus, when counter 1 is negative, it is complemented and 1 is added into it to change it from its nines complement form to its true form, thereby permitting read-out of the negative balance in counter 1.

As mentioned above, when counter 1 is negative, this counter is complemented and 1 is added thereto prior to read-out thereof. After read-out counter 1 is left in this condition, if not reset, since 10 pulses are entered into each stage thereof. If not reset, i.e., if counter 1 contains a subtotal, it is necessary to convert the data in counter 1 to its nines complement form prior to further accumulation therein. For this reason the #10 contact of the *f* level of switch 362 (Fig. 17) connects through the n/c *f* contacts of relay 388 and through the n/c *c* contacts of reset relay 415 to the #9 tap of the RD–1 unit 423. The armature 362*f* connects throught the P7 contacts to ground and if counter 1 is negative, relay 422 is picked by a P7 pulse provided that relays 388 and 415 are not picked and provided further that counter 1 is not reset. This results in complementing counter 1 and adding a 1 therein, as described above. In this way a negative balance in counter 1 is returned to nines complement form.

From the above description it will now be clear that scores are accumulated according to the condition of the various switches for recording on the answer card.

It was mentioned earlier herein that an operation referred to as "stacking" takes place when a 1 punch is provided at the earliest time possible, i.e., when a 1 punch occurs in the same column of the program card that corresponds to the last row of answers being scored. Additionally, stacking occurs under these conditions only if the machine is response punching, i.e., only if switch 61 is on. Thus, if a 6 or a 7 punch in the program card occurs in the same column as a 1 punch and if switch 61 is on, the read-out information is compressed and the quality, sign and hundreds digit of the contents of the first counter are punched in the same column of the answer card, thereby permitting read-out of both counters plus the sign and quality to be made in six columns of the answer card. The relay 372 (Fig. 17) is the relay which controls stacking and, if picked, stacking takes place.

One side of the relay 372 is connected through the n/c *a* contacts of the relay 71, through the *a* section of the response punch switch 61 and through the n/o *f* contacts of the relay 73 to the terminal 365. The other side of the relay 372 connects through the n/o *e* contacts of the relay 360 to the —48 volt terminal 75. Relay 73 is picked by either 6 or 7 punches, and it will now be clear that if a 6 or a 7 punch occurs in the same column as a 1 punch while response punching, the relay 372 is picked. This relay is held until relay 360 is unlatched, i.e., until the stepping switch reaches the #10 position, since it is held through its own n/o *b* contacts.

In order to illustrate the stacking operation, assume that the answer card is in position to read the last mark and that column 39 is at the punch station. While the last mark is being read, the 1 punch picks relay 360 and, as described above, also picks relay 372. Since the relay 372 picks, its *f* contacts are transferred, thereby maintaining the circuit between the terminal 370 and the terminal 371 to permit normal escapement of the answer card and program drum. On the ensuing escapement the last mark is punched in column 40 of the answer card, at which time the stepping switch escapes to the #1 contact. Since the #1 and *h* contacts of the *b* section of the switch 362 are connected together, it will be clear that terminal 370 remains connected to terminal 371 when the stepping switch is in this position.

As explained earlier, the quality is read when the stepping switch is in engagement with the various #1 contacts thereof and upon the next escapement the quality is punched in column 41. Coincident with this escapement the stepping switch moves into engagement with the #2 contact thereof, at which time the escape magnet circuit is opened since the relay 372 is energized, thereby opening the *f* contacts thereof, and since neither the relay 388 nor the relay 400 is picked. (Relays 388 and 400 are picked by 4 and 5 punches, respectively, for suppressing read-out from one or the other counter. Since stacking is necessary only if both counters are to be read out, it is assumed that neither of these relays is picked at this time.) When the stepping switch escapes to the #3 position, the sign is read into the #11 interposer magnet, if appropriate, and is punched in column 41 during the following punch cycle. The next following escapement of the stepping switch maintains the escape magnet circuit open since the relay 400 is not picked, as explained above, and since the relay 375 is picked. At this time the hundreds digit of the contents of the first counter is read into the corresponding interposer magnet and is punched into column 41.

When the stepping switch escapes to the #5 contact, the escape magnet circuit is again completed since terminal 370 connects through the n/c *j* contacts of the relay 388 to terminal 371. At this time the tens digit of the contents of counter 1 is read and following the next escapement it is punched into column 42 of the answer card. Coincident with this escapement the stepping switch escapes to the #6 contact, at which time the units digit of the contents of counter 1 is read. In a similar manner, the units digit of the contents of counter 1 is punched into column 43 of the answer card. The hundreds, tens and units digits of the contents of counter 2 are punched into columns 44, 45 and 46, respectively, in a similar manner since the escape magnet circuit between the terminals 370 and 371 is maintained closed during this time. It will now be clear that where limited space is available the results stored in the two counters of the invention may be punched into six columns instead of eight.

*Appendix*

Various of the electronic components utilized within the machine of the invention have been shown in the drawings merely as blocks and the blocks have been labeled to indicate the type of component represented thereby. The detailed circuitry of each such block is shown in the corresponding Figures 23 through 43 of the drawings. Each of the letter designations shown in the blocks denotes the function of the component in addition to acting as a reference to the detailed circuitry, and it follows that cathode followers are labeled with the letters "CF." Similarly, inverters are labeled with the letters "IN" and single-shot multivibrators are labeled with the letters "SS," etc. Since each of the units represented by the various blocks is well known in the art, only a brief general description of its function is given here.

The GC–1 unit (Fig. 23), a gas tube counter, is utilized in the counter circuits of the invention. This tube is similar to that disclosed in the U.S. application for Letters Patent Serial No. 396,804, filed December 8, 1953, now Patent No. 2,782,336. The GC–1 unit is reset in a "0" condition, i.e., is reset to establish a glow discharge between the "0" digit cathode and the anode thereof, by rendering the #5 tap more negative than the #8 tap, the #5 tap being connected to the "0" digit cathode and the #8 tap being connected to the remaining digit cathodes. Thereafter, transfer to successive digit cathodes is accomplished by pulsing the #7 tap with negative-going pulses. Each time there is a 9 to 0 transfer, i.e., each time the glow discharge is transferred from the "9" digit cathode to the "0" digit cathode, the #3 tap drops in potential since this tap is connected to the "9 to 0" transfer cathode. Complementing is accomplished, as described in the aforementioned specification, by pulsing the #6 tap, thereby transferring the glow discharge to a digit cathode corresponding to the nines complement of the digit cathode whereon it originally was established. Thus, ten pulses applied to the #7 tap of the GC–1 unit are necessary to return the glow discharge to the "0" digit cathode, and it will be clear that when the glow discharge is advanced from the "9" digit cathode to the "0" digit cathode, a pulse is taken from the #3 tap, which pulse is representative of a carry.

The LS–1 unit (Fig. 24), a signal-level restorer unit, has two input taps, i.e., the #3 and #6 taps thereof, the #7 and #8 taps being output taps. Selection of input and output taps is made according to the desired circuit parameters, and it will be clear that signals applied to the #3 or #6 tap are taken from the #7 or #8 tap in the same phase and at a level determined by the selection of taps.

Figure 25:
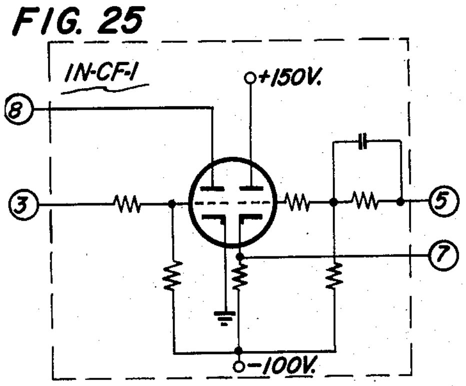

The IN–CF–1 unit shown in Fig. 25 is a dual purpose unit and includes an inverter portion and a cathode follower portion. The #5 tap serves as the input to the cathode follower portion, the #7 tap being the output thereof. The #3 tap serves as the input tap to the inverter portion of the IN–CF–1 unit, and the #8 tap as the output tap. The load for the inverter portion is supplied by the circuitry with which it is associated.

Figure 26:
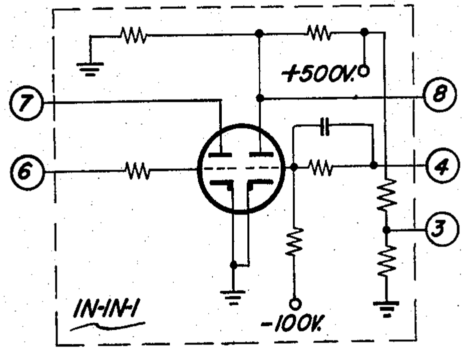

The IN–IN–1 unit shown in Fig. 26 comprises a dual inverter unit, the right hand portion of which is provided with a load, the left hand portion being without a load resistor since it is provided by the circuitry with which it is associated. The #4 and #6 taps serve as input taps, the #8 and #7 taps, respectively, being the output taps of those sections.

Figure 27:
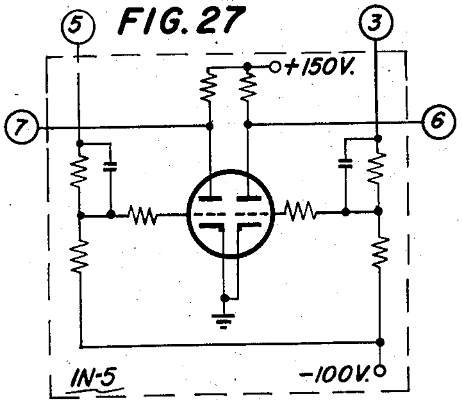

Fig. 27 illustrates an IN–5 unit, also a dual inverter, having input taps #3 and #5 and output taps #6 and#7, respectively.

Figure 28:
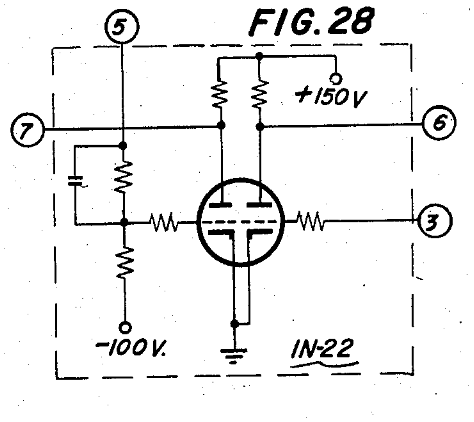

The IN–22 unit disclosed in Fig. 28 is another dual inverter unit having input taps #3 and #5 and output taps #6 and #7, respectively.

Figure 29:
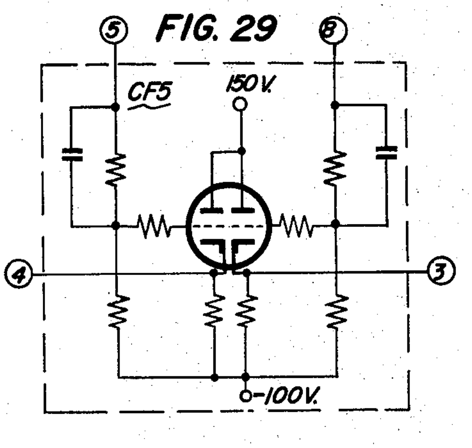
Figure 30:
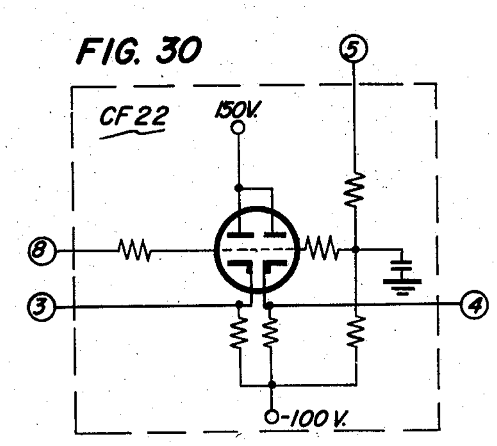
Figure 42:
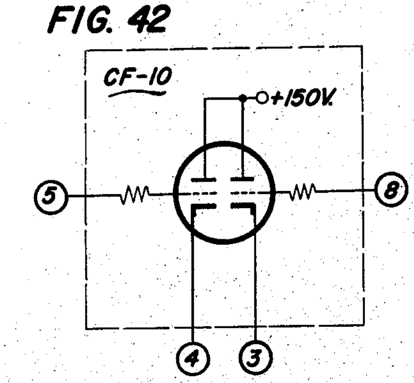
Figure 43:
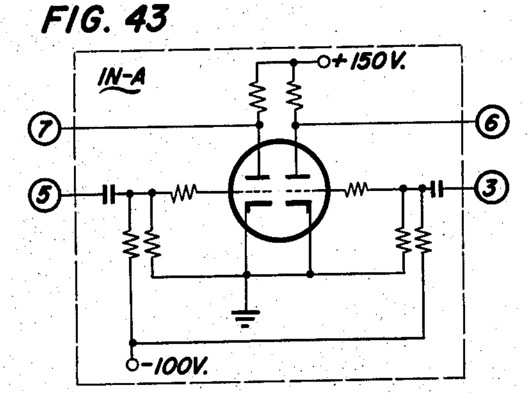

Figs. 29, 30 and 42 disclose dual unit cathode follower circuits, identified as CF–5, CF–22 and CF–10, respectively. Each of these units has the #8 and #5 taps as input taps, the #3 and #4 taps thereof being the output taps, and it will be clear, for example, that signals applied to the #8 tap of one of these units are taken from the corresponding #3 tap thereof in the same phase.

Figure 31:
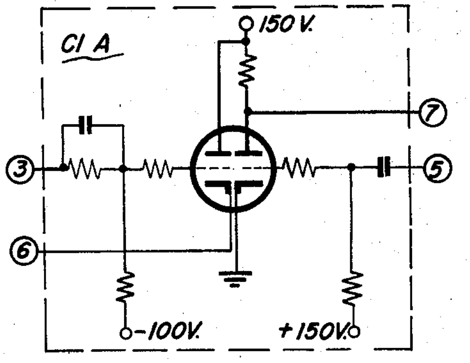
Figure 32:
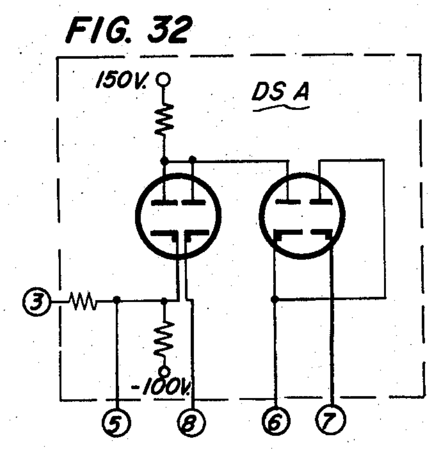

The CI–A unit shown in Fig. 31 includes an inverter portion and a cathode follower portion, the inverter portion being associated with the #5 and #7 taps, the input and output taps respectively thereof. The #3 tap is the input tap to the cathode follower portion, the #6 tap being the output tap thereof. It should be noted that no load is provided for this latter portion, it being supplied by the circuitry with which it is associated.

The DS–A unit (Fig. 32) is utilized to reset as well as to condition the various THY–A units associated with the interposer magnets. The #7 tap of the DS–A unit is used to reset the THY–A units since when a negative pulse is applied to this tap, the #6 tap drops regardless of the condition of the #3, #5 or #8 taps thereof, thereby discharging the condenser connected to the #7 tap of the corresponding THY–A unit. The #3 and #8 taps of the DS–A unit comprises two inputs which are arranged as an "and" circuit. When both of these inputs are high, the #6 tap thereof rises, thereby charging the aforementioned condenser to condition the THY–A units to fire at the appropriate time.

Figure 33:
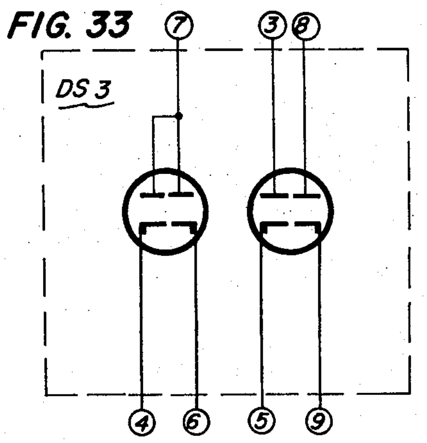
Figure 34:
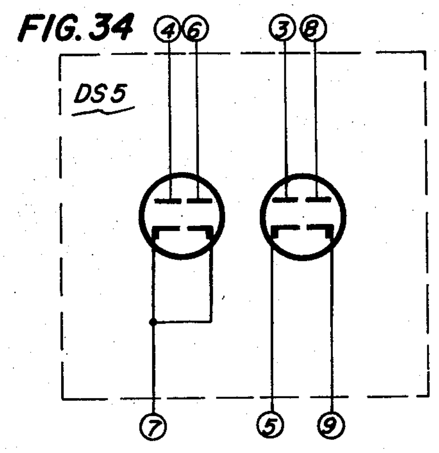

The DS–3 unit shown in Fig. 33 comprises four diodes connected as shown. This unit serves as either an "and" or an "or" circuit, depending upon connections made thereto. This is true also of the DS–5 unit shown in Fig. 34.

The PS–A unit (Fig. 35), together with the CI–A unit (Fig. 31), comprises a multivibrator unit, as discussed earlier in the specification, which unit is operative to generate pulses as long as the #5 tap of the PS–A unit is high. The feedback necessary to operate the multivibrator unit is taken from the #7 tap of the CI–A unit to the #3 tap of the PS–A unit. Thus, as long as the #5 tap of the PS–A unit is high, the multivibrator is operative to generate pulses at a frequency determined by the time constants of the R-C network associated with the #3 tap of this unit.

Figures 35, 36, 37, 38, 39, 40, 41:
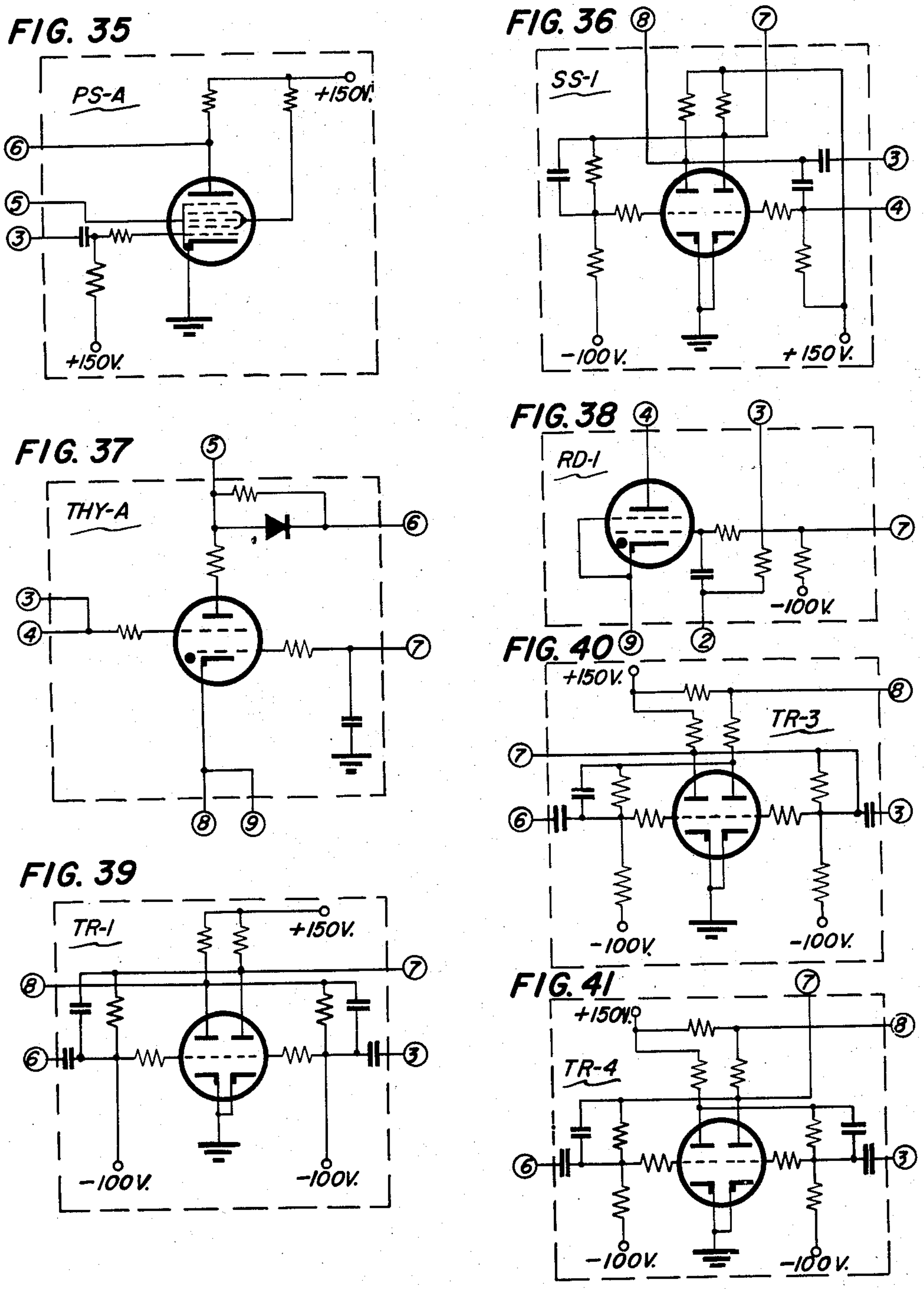

Referring to Fig. 36, an SS–1 unit, a single-shot multivibrator, is shown, which unit has input taps #3 and #4 and output taps #7 and #8. Negative-going pulses applied to the #3 or #4 tap cause the unit to reverse its condition of stability for a predetermined period, and the resulting signal is taken from the #7 or #8 tap, depending upon the desired phase.

The THY–A unit (Fig. 37) is utilized for energizing interposer magnets. This unit is conditioned to fire by charging the condenser associated with the #7 tap thereof. When this condenser is charged, assuming that the #8 and #9 taps are grounded, a pulse on the #3 and #4 taps causes the thyratron to conduct, thereby picking the associated interposer magnet.

The RD–1 unit shown in Fig. 38 is utilized to energize a relay connected between the #4 tap thereof and a positive potential, and signals applied to the #2, #3 or #7 tap thereof cause the tube to fire, thereby energizing the associated relay, provided that the #9 tap thereof is grounded.

Figs. 39, 40 and 41 disclose conventional trigger circuits, a TR–1 unit being shown in Fig. 39, a TR–3 unit being shown in Fig. 40 and a TR–4 unit being shown in Fig. 41. The #3 and #6 taps comprise the input taps to each of these units, the #7 and #8 taps being the output taps, and it will be clear that these triggers are operated to reverse their condition of stability by suitable negative-going pulses being applied to the #3 or #6 tap thereof.

An IN–A unit (Fig. 43) includes two inverters having input taps #3 and #5, respectively, which correspond to output taps #6 and #7, and signals applied to the #3 tap, for example, are taken from the #6 tap inverted in form.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a test scoring machine, means for sequentially scanning a plurality of mark positions of a record, said means being arranged to sense marks in scanned mark positions and adapted to sequentially generate signals corresponding in amplitude to the quality of sensed marks, means responsive to the occurrence of signals connected thereto for determining the positions of the corresponding sensed marks, and means under control of the amplitude of generated signals for selectively connecting said generated signals to said position determining means whereby mark positions are determined according to the quality of the marks.

2. A test scoring device for determining according to quality the location of one of several marks disposed in a plurality of selected mark positions, comprising means for sequentially scanning said mark positions, sensing means associated with said scanning means and responsive to scanned marks for generating signals corresponding in amplitude to the quality thereof, means responsive to said scanning means and to a generated signal connected thereto for indicating the location of the corresponding mark, means connecting a first of said generated signals to said location indicating means, and means under control of the amplitude of said first generated signal for rendering said connecting means inoperative to connect subsequent signals of lesser amplitude to said location indicating means, whereby the condition of said indicating means upon completion of said scan determines the location of the best quality mark.

3. A mark selecting device comprising means for scanning marks, means responsive to scanned marks for generating signals representative of the quality thereof, means for gating said signals, means for indicating said marks in response to gated signals, means for entering gated signals in said indicating means according to said marks, means responsive to gated signals for setting said indicating means prior to the entry therein of the corresponding gated signal, said gating means being operative to gate successive signals only if representative of marks of better quality than preceding marks, and means responsive to the condition of said indicating means upon completion of said scanning operation for determining the best quality mark.

4. A device for determining according to quality the location of one of several marks disposed in a plurality of selected mark positions, comprising means for sequentially scanning said mark positions, said means being responsive to marks for generating signals representative of the quality and location thereof, means responsive to signals entered therein for indicating the location of marks corresponding thereto, means for gating generated signals into said indicating means, means controlled by gated signals for resetting said indicating means prior to the entry therein of the corresponding signals, said gating means being operative to gate a signal representative of a first mark, and means for rendering said gating means inoperative to gate successive signals representative of marks of poorer quality than said first mark, whereby upon completion of said scan said indicating means indicates the location of the best quality mark in said scanned mark positions.

5. A device for determining the quality of sensed marks comprising means for scanning a plurality of predetermined mark positions, said means being operative to sense marks in scanned mark positions for generating signals corresponding to the quality of sensed marks, means responsive to said signals for indicating the quality of sensed marks, said means being operable to indicate whether the quality of sensed marks lies above or below a predetermined standard, means for presetting said indicating means to indicate a mark above said standard prior to scanning said mark positions, means for operating said indicating means to indicate marks below said standard after scanning said mark positions, and means responsive to signals representative of marks above said standard for rendering said operable means inoperative, whereby the absence of marks above said standard is determined.

6. In combination, means for sequentially scanning a predetermined number of discrete positions on a record, said means being arranged to sense marks in said positions and to generate first signals corresponding to the quality thereof, means for indicating the quality of sensed marks, said means having a first condition indicative of marks below a predetermined standard and a second condition indicative of marks above said standard, means for setting said indicating means in said second condition prior to said scanning operation, said means being responsive to a second signal for reversing the condition thereof, and means for generating said second signal after said scanning operation, said means being rendered inoperative in response to a first signal representative of a mark above said predetermined standard, whereby said indicating means determines the presence of a mark above said standard in one of said predetermined positions.

7. In combination, means for sequentially illuminating a plurality of mark positions, said means comprising a plurality of independent light sources each of which is associated with one of said mark positions, means common to all of said positions for sensing light reflected from said positions, an auxiliary light source cooperating with said sensing means and independent of said positions for maintaining the intensity of light reaching said sensing means constant in the absence of a mark in one of said positions, and means for operating said auxiliary light source when no one of said plurality of independent light sources is operative, whereby variations in light reaching said sensing means determine said marks.

8. A device for determining marks disposed in one or more of a plurality of predetermined positions on a record, comprising a plurality of light sources for independently illuminating said positions, a light sensitive device common to all of said positions for sensing light reflected therefrom, means for sequentially operating said light sources for sequentially illuminating said positions during spaced intervals of time, said sensing means being arranged to generate signals in response to sensed light variations, and means for illuminating said sensing means between said intervals for maintaining the intensity of light reaching said sensing means constant in the absence of marks, whereby said marks are determined.

9. A device for determining marks disposed in one or more of a plurality of predetermined positions of a record, comprising first means for independently and sequentially illuminating said predetermined positions, means common to all of said predetermined positions for sensing light reflected therefrom, said sensing means being arranged to generate signals according to variations in light sensed, and second means for illuminating said sensing means when none of said predetermined positions are illuminated, said second means being arranged to illuminate said sensing means an amount corresponding to the illumination thereof by light reflected from one of said predetermined positions in the absence of a mark, whereby variations in the signal generated by said sensing means determine marks in said predetermined positions.

10. A device for determining the location of marks disposed in one or more of a plurality of mark receiving positions, comprising a sensing station, means for positioning said mark receiving positions at said sensing station, first means associated with said sensing station for independently and sequentially illuminating said mark receiving positions, said sensing station including means for sensing light reflected from said mark receiving positions, and a second means for illuminating said light sensing means when said first illuminating means is ineffective, said second means being arranged to illuminate said light sensing means according to light reflected from unmarked positions when said positions are illuminated and said light sensing means being responsive to light changes for generating signals representative of mark locations.

11. A test scoring machine comprising means for scanning a record having a plurality of mark receiving positions, said means including a sensing station operable to scan a column of said record disposed thereat for determining marks in said column and means for advancing said record column by column past said sensing station, means for interpreting sensed marks for recording said interpretations on said record in columns corresponding thereto, means for determining a plurality of patterns of mark receiving positions, means responsive to a control signal for selecting predetermined patterns for controlling said sensing station to scan selected mark positions in columns at said sensing station according to selected patterns, and means responsive to a second control signal for perating said sensing station when selected columns are disposed thereat, whereby marks in selected mark positions on said record are interpreted.

12. A device for determining positions of marks on a record having a plurality of mark positions, comprising means for selecting mark positions to be scanned, means for sequentially scanning selected mark positions, said scanning means including means for sequentially illuminating selected mark positions and means for sensing light reflected from said mark positions, said sensing means being responsive to variations in reflected light due to the presence of marks in scanned positions for generating signals, and means controlled by said scanning means and said signals for determining positions of said marks.

13. In a test scoring machine means for sequentially scanning a plurality of mark positions of a record, said means being arranged to sense marks in scanned mark positions and adapted to sequentially generate signals corresponding in amplitude to the quality of sensed marks, means responsive to the occurrence of signals connected thereto for determining the positions of the corresponding sensed marks, gating means normally operative to connect generated signals to said position determining means, and means responsive to the amplitude of a first of said gated signals for rendering said gating means inoperative to gate subsequent signals of lesser amplitude, said gating means remaining operative to gate subsequent signals of greater amplitude, whereby mark positions are determined according to the best quality mark.

References Cited in the file of this patent

UNITED STATES PATENTS

| | | |
|---|---|---|
| 2,294,734 | Bryce | Sept. 1, 1942 |
| 2,569,829 | Rabenda | Oct. 2, 1951 |
| 2,600,817 | Victoreen | June 17, 1952 |
| 2,620,978 | Carroll et al. | Dec. 9, 1952 |
| 2,717,460 | Stibitz | Sept. 13, 1955 |
| 2,720,360 | Luhn | Oct. 11, 1955 |

UNITED STATES PATENT OFFICE

CERTIFICATE OF CORRECTION

Patent No. 2,944,734 July 12, 1960

Harold F. Martin

It is hereby certified that error appears in the printed specification of the above numbered patent requiring correction and that the said Letters Patent should read as corrected below.

Column 4, line 9, for "cooperates" read -- cooperate --; line 34, for "mulitplier" read -- multiplier --; column 10, line 1, for "ampilfier" read -- amplifier --; lines 68 and 69, for "terminal, 200 i. e.," read -- terminal 200, i. e., --; line 74, for "appear" read -- pass --; column 12, line 46, for "condsener" read -- condenser --; column 22, line 13, for "ther elay" read -- the relay --; column 24, line 63, for "wheels ." read -- wheels.) --; column 25, line 48, for "352" read -- 362 --; column 26, line 4, for "column" read -- columns --; line 26, for "autoup" read -- autodup --; column 28, line 15, after "unit" insert -- 450 --; column 29, line 30, for "realy" read -- relay --; column 30, line 65, for "throught" read -- through --; column 34, line 33, before "generated" insert -- said --; line 60, for "setting" read -- resetting --; column 35, line 27, for "operable" read -- operating --; line 47, for "lor" read -- for --; column 36, line 45, for "perat- ing" read -- operating --.

Signed and sealed this 27th day of December 1960.

(SEAL)
Attest:

KARL H. AXLINE
Attesting Officer

ROBERT C. WATSON
Commissioner of Patents